US012801329B2

(12) United States Patent
Chalmers et al.

(10) Patent No.: US 12,801,329 B2
(45) Date of Patent: Nov. 17, 2026

(54) SYSTEMS AND METHODS OF TRANSFERRING PRESENTATION OF CONTENT BETWEEN A FIRST ELECTRONIC DEVICE AND A SECOND ELECTRONIC DEVICE

(71) Applicant: Apple Inc., Cupertino, CA (US)

(72) Inventors: Devin W. Chalmers, Oakland, CA (US); Austin P. Sousa, Mountain View, CA (US); Giancarlo Yerkes, San Francisco, CA (US); William D. Lindmeier, San Francisco, CA (US); Manuel C. Clement, Felton, CA (US); Rahul Nair, Hayward, CA (US); Luis R. Deliz Centeno, Fremont, CA (US); Tony Kobayashi, Berkeley, CA (US); Thomas G. Salter, San Francisco, CA (US); Christopher I. Word, San Francisco, CA (US); Shai Messingher Lang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/298,674

(22) Filed: Aug. 13, 2025

(65) Prior Publication Data

US 2026/0086758 A1 Mar. 26, 2026

Related U.S. Application Data

(60) Provisional application No. 63/784,833, filed on Apr. 7, 2025, provisional application No. 63/699,754, filed on Sep. 26, 2024.

(51) Int. Cl.
*G06F 3/14* (2006.01)
*G06F 3/04815* (2022.01)
(Continued)

(52) U.S. Cl.
CPC ........ *G06F 3/1454* (2013.01); *G06F 3/04815* (2013.01); *G06F 3/04886* (2013.01);
(Continued)

(58) Field of Classification Search
CPC ............... G06F 3/1454; G06F 3/04815; G06F 3/04886; G06T 15/00; G06T 2200/24; H04S 7/302; H04S 2400/11
See application file for complete search history.

(56) References Cited

U.S. PATENT DOCUMENTS 11,758,329 B2 * 9/2023 Laaksonen ............... H04R 3/12 340/4.42
2015/0205106 A1 * 7/2015 Norden ................... G06F 3/012 345/7
(Continued)

FOREIGN PATENT DOCUMENTS

CN 118435158 A 8/2024

OTHER PUBLICATIONS

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Nov. 18, 2025], 2 pages.
(Continued)

*Primary Examiner* — Antonio Xavier
(74) *Attorney, Agent, or Firm* — Kubota & Basol LLP

(57) ABSTRACT

Some examples of the disclosure are directed to systems and methods for transferring presentation of content between a first electronic device and a second electronic device of a computing system. In some examples, while first content is presented on the first electronic device in a three-dimensional environment, the computing system detects, via one or more input devices of the second electronic device, a first input. In some examples, accordance with a determination
(Continued)

that the first input satisfies one or more first criteria, the computing system transfers presentation of the first content from the first electronic device to the second electronic device. In some examples, transferring the presentation of first content from the first electronic device to the second electronic device includes ceasing to present the first content on the first electronic device and presenting the first content on the second electronic device.

18 Claims, 42 Drawing Sheets

(51) Int. Cl.
*G06F 3/04886* (2022.01)
*G06T 15/00* (2011.01)
*H04S 7/00* (2006.01)

(52) U.S. Cl.
CPC .............. *G06T 15/00* (2013.01); *H04S 7/302* (2013.01); *G06T 2200/24* (2013.01); *H04S 2400/11* (2013.01)

(56) References Cited

U.S. PATENT DOCUMENTS

| | | | |
|---|---|---|---|
| 2018/0101994 | A1 | 4/2018 | Da Veiga et al. |
| 2021/0011556 | A1* | 1/2021 | Atlas ..................... G06T 19/006 |
| 2021/0191600 | A1* | 6/2021 | Lemay .................... G06F 3/013 |
| 2021/0193084 | A1* | 6/2021 | Deliz Centeno ....... G09G 5/373 |
| 2021/0326094 | A1* | 10/2021 | Buerli ................. G06F 3/04815 |
| 2022/0374136 | A1* | 11/2022 | Chang ................... G06F 3/0488 |
| 2024/0273838 | A1 | 8/2024 | Palangie et al. |

OTHER PUBLICATIONS

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 18, 2025], 2 pages.

Drawing and painting in VR by using a graphics tablet as virtual paper, Reddit [online]. Reddit, Aug. 1, 2012. Available online at <https://www.reddit.com/r/oculus/comments/1wsdlv/drawing_and_painting_in_vr_by_using_a_graphics/>, [Retrieved from Internet on Nov. 18, 2025], 6 pages.

Continuity features and requirements for Apple devices, Apple [online]. Apple, Sep. 15, 2025. Available online at <https://support.apple.com/en-us/108046>, [Retrieved from Internet on Nov. 19, 2025], 10 pages.

Use Continuity to connect your Mac, iPhone, iPad, and Apple Watch, Apple [online]. Apple, Oct. 24, 2022. Available online at <https://support.apple.com/en-us/108046>, [Retrieved from Internet Dec. 23, 2022], 4 pages.

Using a tablet for touch control, with VR headset on. (demo vid), DCS [online]. DCS, Jun. 12, 2020. Available online at <https://forum.dcs.world/topic/237992-using-a-tablet-for-touch-control-with-vr-headset-on-demo-vid/>, [Retrieved from Internet Jan. 2, 2024], 9 pages.

Edmiston, Taylor et al. "Touch-Enabled Input Devices for Controlling Virtual Environments", 12th IFAC Symposium on Analysis, Design, and Evaluation of Human-Machine Systems, Aug. 11-15, 2013, Las Vegas, NV, US, 8 pages.

Extended European Search Report received for European Patent Application No. 25204597.6, mailed on Feb. 9, 2026, 11 pages.

* cited by examiner

SYSTEMS AND METHODS OF TRANSFERRING PRESENTATION OF CONTENT BETWEEN A FIRST ELECTRONIC DEVICE AND A SECOND ELECTRONIC DEVICE

CROSS REFERENCE TO RELATED APPLICATIONS

This application claims the benefit of U.S. Provisional Application No. 63/784,833, filed Apr. 7, 2025, and U.S. Provisional Application No. 63/699,754, filed Sep. 26, 2024, the contents of which are herein incorporated by reference in their entireties for all purposes.

FIELD OF THE DISCLOSURE

This relates generally to systems and methods of transferring the presentation of content between electronic devices of a computing system.

BACKGROUND OF THE DISCLOSURE

Some computer graphical environments provide two-dimensional and/or three-dimensional environments where at least some objects displayed for a user's viewing are virtual and generated by a computer.

SUMMARY OF THE DISCLOSURE

Some examples of the disclosure are directed to systems and methods for transferring the presentation of content between a first electronic device and a second electronic device of a computing system. In some examples, while first content is presented in a three-dimensional environment via the one or more first displays, the computing system detects, via one or more input devices of the second electronic device, a first input. For example, the first input is a touch input, such as a swiping touch gesture, detected on a touch-sensitive display of the second electronic device. In some examples, in accordance with a determination that the first input satisfies one or more first criteria, the computing system causes presentation of the first content to be transferred from the first electronic device to the second electronic device. In some examples, transferring presentation of the first content from the first electronic device to the second electronic device includes the first content ceasing to be presented via the one or more first displays on the first electronic device and the first content being presented via the one or more second displays on the second electronic device.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
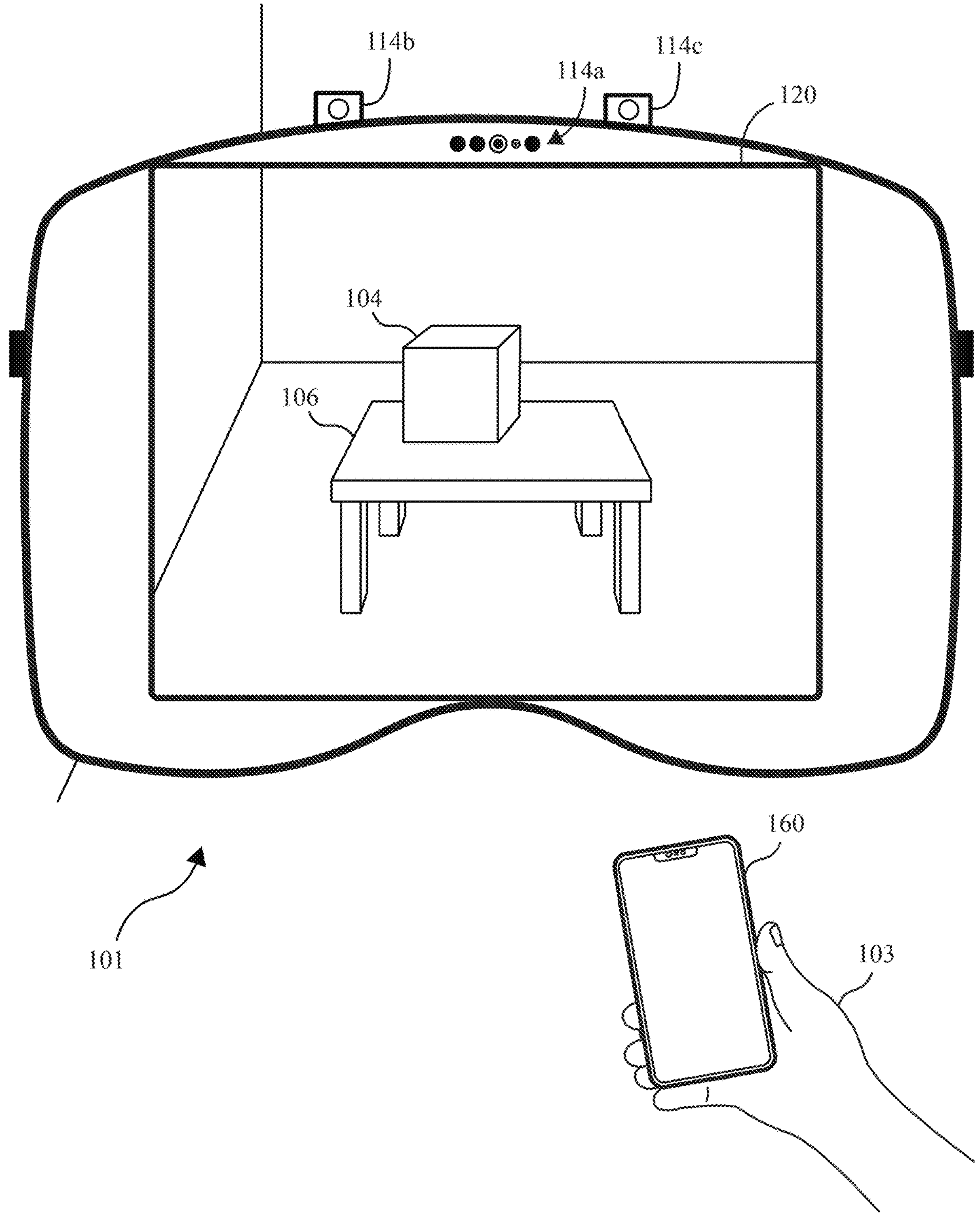
FIG. 1 illustrates an extended reality environment according to some examples of the disclosure.

Some examples of the disclosure are directed to systems and methods for transferring the presentation of content between a first electronic device and a second electronic device of a computing system. In some examples, while first content is presented in a three-dimensional environment via the one or more first displays, the computing system detects, via one or more input devices of the second electronic device, a first input. For example, the first input is a touch input, such as a swiping touch gesture, detected on a touch-sensitive display of the second electronic device. In some examples, in accordance with a determination that the first input satisfies one or more first criteria, the computing system causes presentation of the first content to be transferred from the first electronic device to the second electronic device. In some examples, transferring presentation of the first content from the first electronic device to the second electronic device includes the first content ceasing to be presented via the one or more first displays on the first electronic device and the first content being presented via the one or more second displays on the second electronic device.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset defined relative to the user, and instead has a position and orientation defined relative to the three-dimensional environment.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2A. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIGS. 2A-2B). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114*b* and 114*c*. While a single display 120 is shown, it should be appreciated that display 120 may include a stereo pair of displays. In some examples, display 120 is a passive display that outputs content (e.g., images and/or video) rendered by a second electronic device, such as electronic device 160 described below.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, the electronic device 101 may be configured to communicate with a second electronic device, such as a companion device. For example, as illustrated in FIG. 1, the electronic device 101 may be in communication with electronic device 160. In some examples, the electronic device 160 corresponds to a mobile electronic device, such as a smartphone, a tablet computer, a smart watch, or other electronic device. Additional examples of electronic device 160 are described below with reference to the architecture block diagram of FIG. 2B. In some examples, the electronic device 101 and the electronic device 160 are associated with a same user. For example, in FIG. 1, the electronic device 101 may be positioned (e.g., mounted) on a head of a user and the electronic device 160 may be positioned near electronic device 101, such as in a hand 103 of the user (e.g., the hand 103 is holding of the electronic device 160), and the electronic device 101 and the electronic device 160 are associated with a same user account of the user (e.g., the user is logged into the user account on the electronic device 101 and the electronic device 160). Additional details regarding the communication between the electronic device 101 and the electronic device 160 are provided below with reference to FIGS. 2A-2B.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device. A virtual option/affordance presented in a three-dimensional environment that may be targeted for selection may also be referred to as a selectable option herein.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2A:
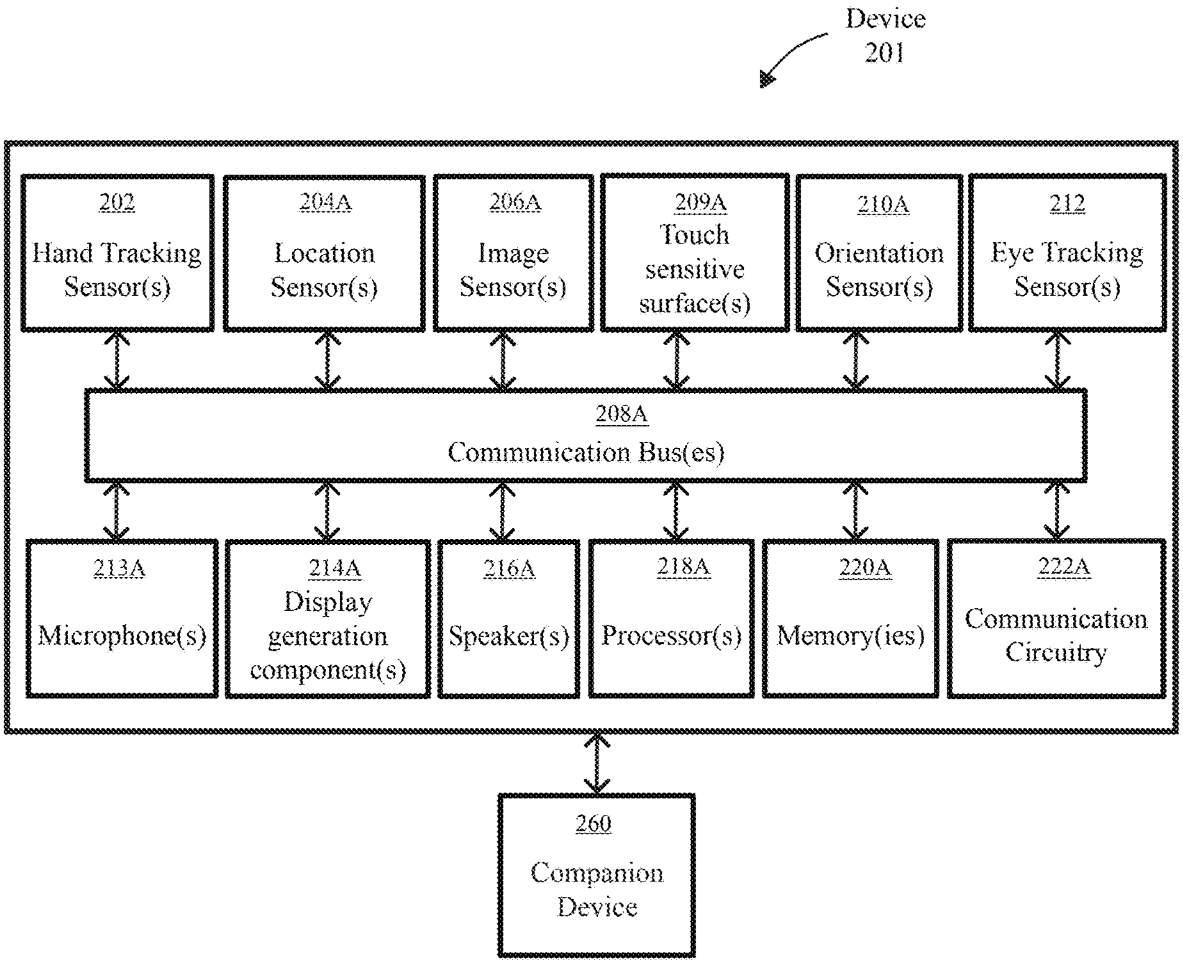
FIGS. 2A-2B illustrate block diagrams of example architectures for electronic devices according to some examples of the disclosure.
Figure 2B:
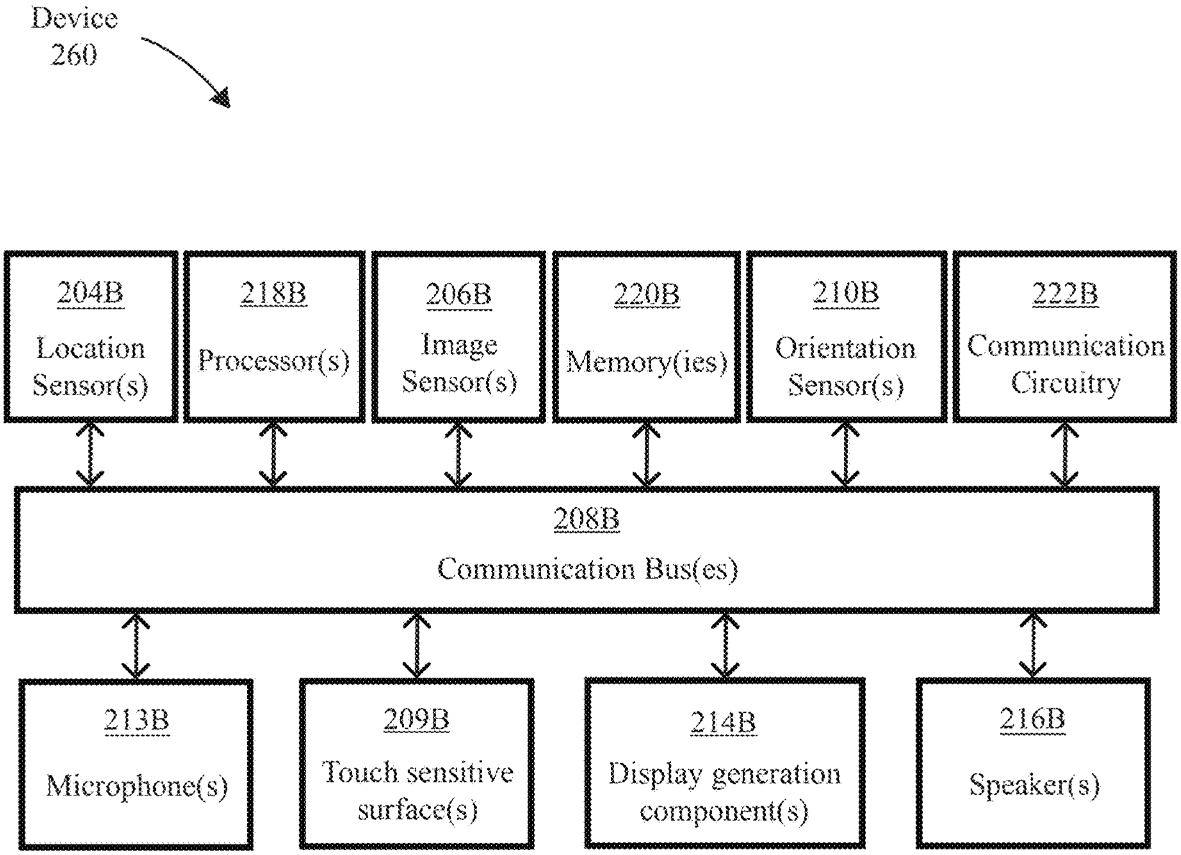

FIGS. 2A-2B illustrate block diagrams of example architectures for electronic devices 201 and 260 according to some examples of the disclosure. In some examples, electronic device 201 and/or electronic device 260 include one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1. In some examples, electronic device 260 corresponds to electronic device 160 described above with reference to FIG. 1. Electronic device 201 and electronic device 260 optionally form and/or are included in a computing system.

As illustrated in FIG. 2A, the electronic device 201 optionally includes various sensors, such as one or more hand tracking sensors 202, one or more location sensors 204A, one or more image sensors 206A (optionally corresponding to internal image sensors 114*a* and/or external image sensors 114*b* and 114*c* in FIG. 1), one or more touch-sensitive surfaces 209A, one or more motion and/or orientation sensors 210A, one or more eye tracking sensors 212, one or more microphones 213A or other audio sensors, one or more body tracking sensors (e.g., torso and/or head tracking sensors), one or more display generation components 214A, optionally corresponding to display 120 in FIG. 1, one or more speakers 216A, one or more processors 218A, one or more memories 220A, and/or communication circuitry 222A. One or more communication buses 208A are optionally used for communication between the above-mentioned components of electronic devices 201. Additionally, as shown in FIG. 2B, the electronic device 260 optionally includes one or more location sensors 204B, one or more image sensors 206B, one or more touch-sensitive surfaces 209B, one or more orientation sensors 210B, one or more microphones 213B, one or more display generation components 214B, one or more speakers 216B, one or more processors 218B, one or more memories 220B, and/or communication circuitry 222B. One or more communication buses 208B are optionally used for communication between the above-mentioned components of electronic device 260. The electronic devices 201 and 260 are optionally configured to communicate via a wired or wireless connection (e.g., via communication circuitry 222A, 222B) between the two electronic devices. For example, as indicated in FIG. 2A, the electronic device 260 may function as a companion device to the electronic device 201.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

In some examples, processor(s) 218A, 218B include one or more general processors, one or more graphics processors, and/or one or more digital signal processors. In some examples, memory 220A or 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A and/or 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, electronic devices 201 and 260 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with each of electronic devices 201 and 260 or external to each of electronic devices 201 and 260 that is in communication with each of electronic devices 201 and 260).

In some examples, electronic device 201 includes one or more controllable tinting layers, where each controllable tinting layer may be configured to filter an adjustable amount of light (e.g., light having a particular wavelength or range of wavelengths). The one or more tinting layers may be used to at least partially block a user's view of the physical environment and enhance a virtual image displayed using an optical see-through display. In some examples, the tinting layers are integrated into display generation component 214A. In some examples, the tinting layers are separate from the display generation component 214A. In some examples, one of the controllable tinting layers may include a frosted glass layer that can be controlled to scatter an adjustable amount of incident light. Alternatively, in some examples, electronic device 201 may not include a separate controllable tinting layer. For example, the tinting functionality may be integrated into display generation component 214A (e.g., integrated in the other layers of display generation component 214A).

Electronic devices 201 and 260 optionally includes image sensor(s) 206A and 206B, respectively. Image sensors(s) 206A, 206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A, 206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A, 206B also optionally include one or more cameras configured to capture movement of physical objects in the real-world environment. Image sensor(s) 206A, 206B also optionally include one or more depth sensors configured to detect the distance of physical objects from electronic device 201, 260. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201, 260 uses CCD sensors, event cameras, and depth sensors in combination to detect the physical environment around electronic device 201, 260. In some examples, image sensor(s) 206A, 206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201, 260 uses image sensor(s) 206A, 206B to detect the position and orientation of electronic device 201, 260 and/or display generation component(s) 214A, 214B in the real-world environment. For example, electronic device 201, 260 uses image sensor(s) 206A, 206B to track the position and orientation of display generation component(s) 214A, 214B relative to one or more fixed objects in the real-world environment.

In some examples, electronic devices 201 and 260 include microphone(s) 213A and 213B, respectively, or other audio sensors. Electronic device 201, 260 optionally uses microphone(s) 213A, 213B to detect sound from the user and/or the real-world environment of the user. In some examples, microphone(s) 213A, 213B includes an array of microphones (a plurality of microphones) that optionally operate in tandem, such as to identify ambient noise or to locate the source of sound in space of the real-world environment.

In some examples, electronic devices 201 and 260 include location sensor(s) 204A and 204B, respectively, for detecting a location of electronic device 201A and/or display generation component(s) 214A and a location of electronic device 260 and/or display generation component(s) 214B, respectively. For example, location sensor(s) 204A, 204B can include a global positioning system (GPS) receiver that receives data from one or more satellites and allows electronic device 201, 260 to determine the device's absolute position in the physical world.

In some examples, electronic devices 201 and 260 include orientation sensor(s) 210A and 210B, respectively, for detecting orientation and/or movement of electronic device 201 and/or display generation component(s) 214A and orientation and/or movement of electronic device 260 and/or display generation component(s) 214B, respectively. For example, electronic device 201, 260 uses orientation sensor(s) 210A, 210B to track changes in the position and/or orientation of electronic device 201, 260 and/or display generation component(s) 214A, 214B, such as with respect to physical objects in the real-world environment. Orientation sensor(s) 210A, 210B optionally include one or more gyroscopes and/or one or more accelerometers.

In some examples, electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some examples, hand tracking sensor(s) 202 and/or eye tracking sensor(s) 212 are implemented together with the display generation component(s) 214A. In some examples, the hand tracking sensor(s) 202 and/or eye tracking sensor(s) 212 are implemented separate from the display generation component(s) 214A. In some examples, electronic device 201 alternatively does not include hand tracking sensor(s) 202 and/or eye tracking sensor(s) 212. In some such examples, the display generation component(s) 214A may be utilized by the electronic device 260 to provide an extended reality environment and utilize input and other data gathered via the other sensor(s) (e.g., the one or more location sensors 204A, one or more image sensors 206A, one or more touch-sensitive surfaces 209A, one or more motion and/or orientation sensors 210A, and/or one or more microphones 213A or other audio sensors) of the electronic device 201 as input and data that is processed by the processor(s) 218B of the electronic device 260. Additionally or alternatively, electronic device 201 optionally does not include other components shown in FIG. 2B, such as location sensors 204B, image sensors 206B, touch-sensitive surfaces 209B, etc. In some such examples, the display generation component(s) 214A may be utilized by the electronic device 260 to provide an extended reality environment and the electronic device 260 utilize input and other data gathered via the one or more motion and/or orientation sensors 210A (and/or one or more microphones 213A) of the electronic device 201 as input.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206A are positioned relative to the user to define a field of view of the image sensor(s) 206A and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic devices 201 and 260 are not limited to the components and configuration of FIGS. 2A-2B, but can include fewer, other, or additional components in multiple configurations. In some examples, electronic device 201 and/or electronic device 260 can each be implemented between multiple electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201 and/or electronic device 260, is optionally referred to herein as a user or users of the device.

Attention is now directed towards examples of a computing system transferring the presentation of virtual content between a first electronic device (e.g., corresponding to electronic devices 101 and/or 201) and a second electronic device (e.g., corresponding to electronic devices 160 and/or 260). For example, the computing system comprises the first electronic device and the second electronic device (e.g., the first electronic device is in communication with the second electronic device, such as described with reference to FIGS. 1 and/or FIGS. 2A-2B).

The below described methods and processes for transferring the presentation of content between a first electronic device and a second electronic device provides a user of the computing system with efficient methods for controlling at which device of the computing system virtual content is presented, which improves user interaction and battery life of the devices of the computing system (e.g., by avoiding presenting the virtual content on one or more devices of the computing system at which the user does not intend to view the virtual content).

FIGS. 3A-3K illustrate a computing system transferring the presentation of content between a first electronic device and a second electronic device in response to one or more user inputs according to some examples of the disclosure. In some examples, the computing system includes a first electronic device 301 (e.g., having one or more characteristics of electronic device 101 and/or 201) and a second electronic device 306 (e.g., having one or more characteristics of electronic device 160 and/or 260). In some examples, first electronic device 301 is in communication with second electronic device 306 (e.g., second electronic device 306 is an auxiliary and/or companion device in communication with first electronic device 301).

As shown in FIGS. 3A-3K, first electronic device 301 includes image sensors 314*a* to 314*c* (e.g., having one or more characteristics of image sensors 114*a* to 114*c* and/or image sensor(s) 206). In some examples, image sensors 314*a* to 314*c* are configured to detect one or more objects of a physical environment (e.g., having one or more characteristics of a real-world environment and/or a physical environment described above). In some examples, image sensors 314*a* to 314*c* are configured to detect movement of one or more portions (e.g., hands, head, and/or eyes) of a user and/or attention (e.g., gaze) of a user. Optionally, first electronic device 301 does not include image sensors 314*a* to 314*c*. For example, first electronic device 301 is not configured to detect one or more objects of a physical environment, one or more portions of a user, and/or attention of the user (e.g., the computing system detects user inputs and/or one or more objects of the physical environment using one or more input devices of second electronic device 306). Further, as shown in FIGS. 3A-3K, first electronic device 301 includes a display 320 (e.g., having one or more characteristics of display 120 and/or display generation component(s) 214A) and second electronic device 306 includes a display 308 (e.g., having one or more characteristics of display generation component(s) 214B). In some examples, display 320 includes multiple display generation components (e.g., first electronic device 301 is a head-mounted display including two stereo displays). Display 320 is optionally a passive display that presents content (e.g., image and/or video content) rendered by second electronic device 306. In some examples, display 308 is a touch-sensitive display. For example, display 308 includes a display generation component (e.g., having one or more characteristics of display generation component 214B) and a touch-sensitive surface (e.g., having one or more characteristics of touch-sensitive surface 209B) that form a touch-sensitive display (e.g., a touch screen integrated with second electronic device 306 and in communication with first electronic device 301 and second electronic device 306). For example, display 308 is configured to detect one or more touch inputs (e.g., the touch gesture represented by touch positions 310*a* to 310*b* in FIG. 3A).

In FIGS. 3A-3K, an environment 300 is visible via display 320. In some examples, environment 300 is a three-dimensional environment that is presented to a user of first electronic device 301 via display 320. In some examples, environment 300 is an extended reality (XR) environment having one or more characteristics of an XR environment described above. For example, from a current viewpoint of a user of first electronic device 301, one or more virtual elements (e.g., video content 304) are presented in environment 300 while one or more physical objects (e.g., real-world window 302) from a physical environment of the user are visible (e.g., through video passthrough or optical see-through of the physical environment).

Figure 3A:
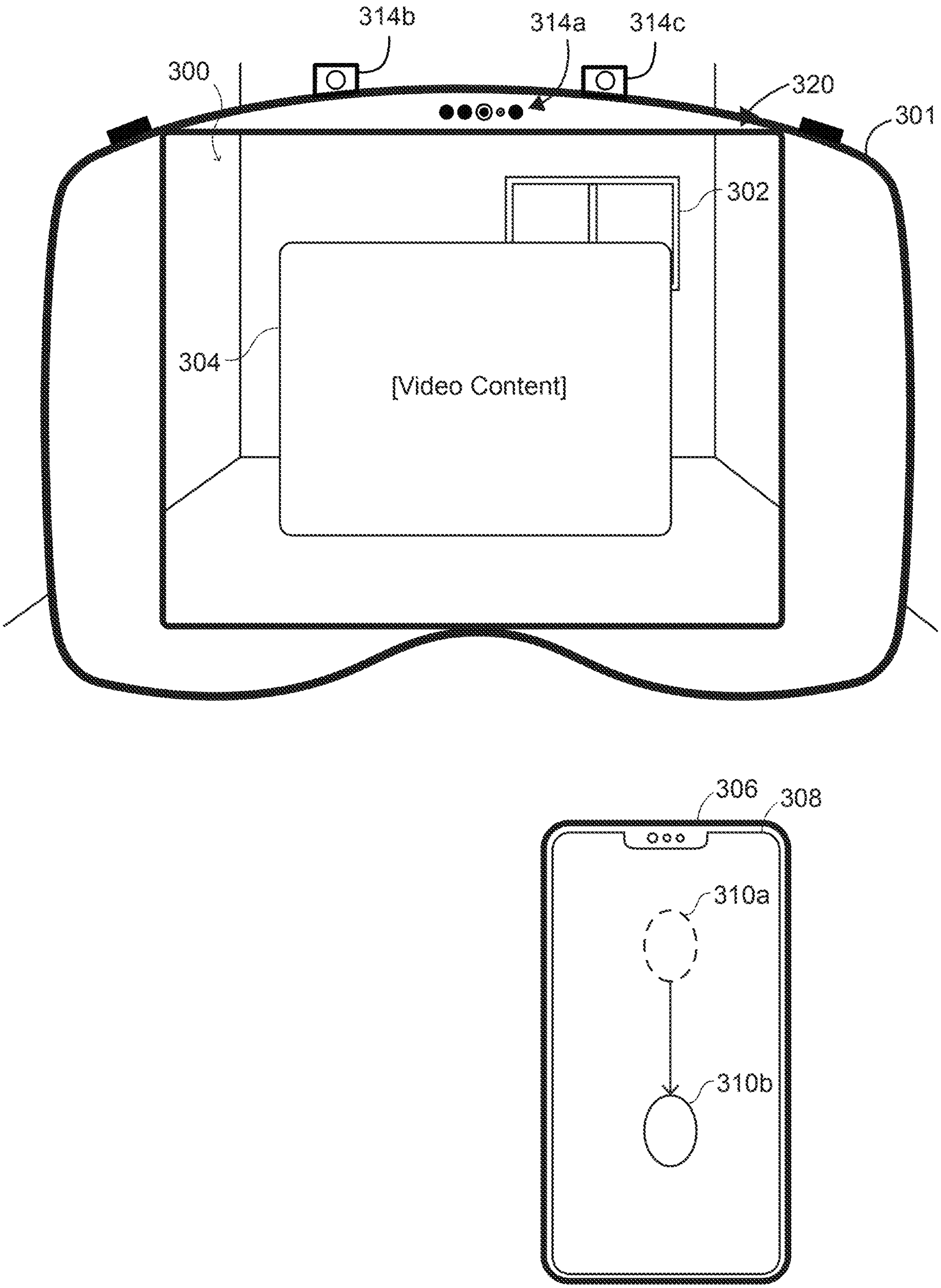
FIGS. 3A-3K illustrate a computing system transferring the presentation of content between a first electronic device and a second electronic device in response to one or more user inputs according to some examples of the disclosure.

FIG. 3A illustrates first electronic device 301 presenting video content 304 in environment 300. In some examples, video content 304 corresponds to media that is presented within a virtual window and/or virtual object in environment 300. In some examples, video content 304 includes video and audio content (e.g., the computing system causes playback of video content 304 in environment 300, including outputting audio associated with video content 304 via one or more audio output devices of first electronic device 301). For example, video content 304 is a movie, TV show, a live broadcast (e.g., associated with a streaming service), or an online video (e.g., associated with a social media and/or video sharing service). It should be appreciated that in some examples, the computing system maintains the playback of video content 304 (e.g., including output of audio associated with video content 304) throughout the examples shown and described with reference to FIGS. 3A-3K.

In some examples, first electronic device 301 presents video content 304 at a head-locked and/or tilt-locked orientation (e.g., as described above). Alternatively, in some examples, first electronic device 301 presents video content 304 at a body-locked, world-locked, and/or tilt-locked orientation. Video content 304 is optional rendered by second electronic device 306 and displayed on first electronic device 301 via display 320 (e.g., display 320 is a passive display).

As shown in FIG. 3A, while first electronic device 301 presents video content 304 in environment 300, second electronic device 306 does not present video content 304. Optionally, while first electronic device 301 presents video content 304, second electronic device 306 operates in a power-saving state. In some examples, in the power-saving state, second electronic device 306 operates display 308 in an inactive state. For example, operating display 308 in the inactive state includes turning off display 308 (e.g., forgoing display of content on display 308). For example, operating display 308 in the inactive state includes reducing the refresh rate of display 308. For example, operating display 308 in the inactive state includes reducing the brightness, color, and/or saturation of content presented by display 308. In some examples, while operating in the power-saving state, second electronic device 306 is configured to detect touch inputs at display 308 (e.g., the touch gesture represented by touch position 310*a* to 310*b*). Operating second electronic device 306 in a power-saving state while video content 304 is presented on first electronic device 301 conserves computing resources and conserves battery life of the computing system by avoiding active operation of display 308 when the user of the computing system intends to view video content 304 on first electronic device 301.

Figure 3B:
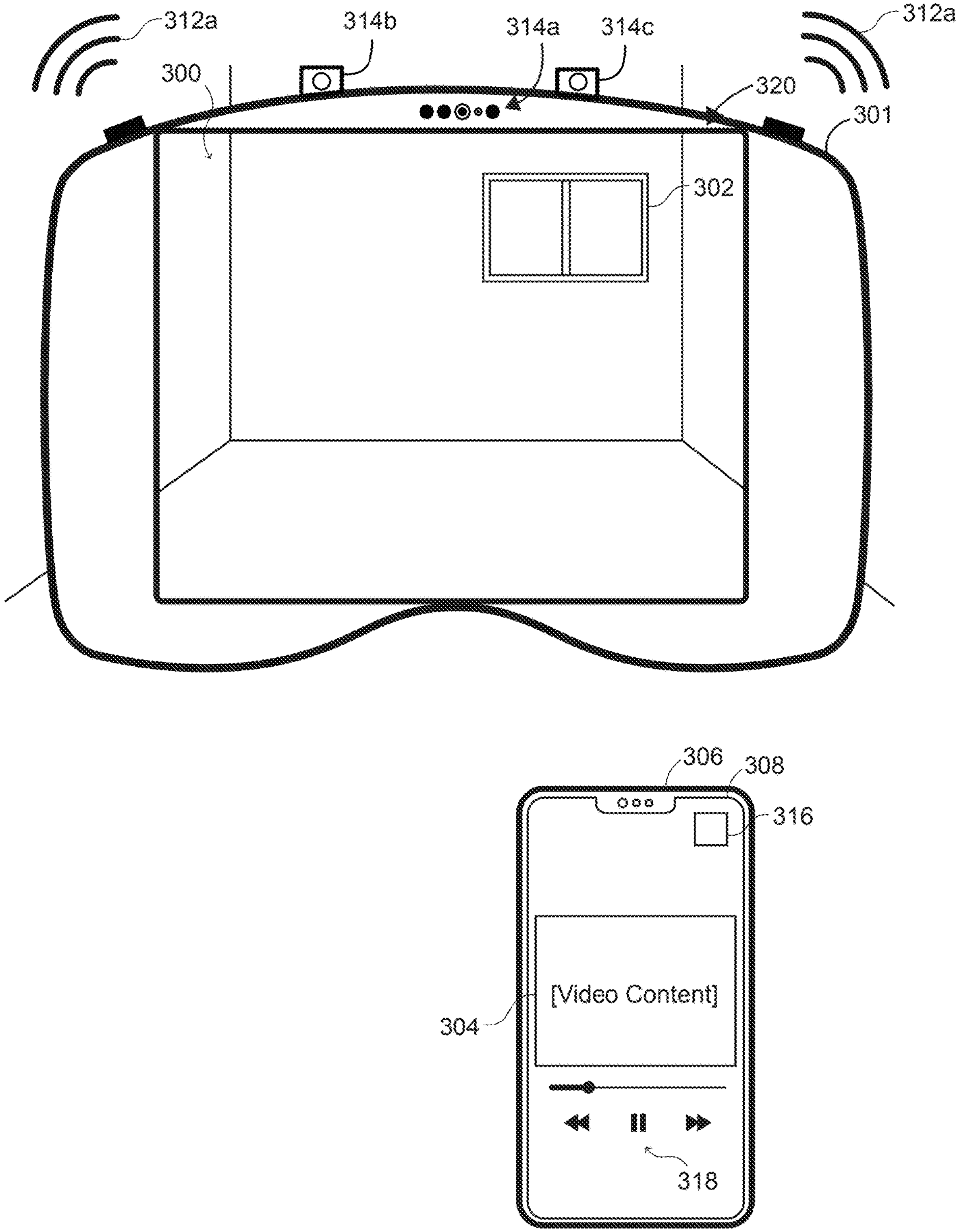

In FIG. 3A, a touch gesture is detected at second electronic device 306. In some examples, the touch gesture corresponds to a swipe gesture (e.g., a downward swipe) detected from touch position 310*a* to touch position 310*b*. For example, the touch gesture is performed by an object (e.g., a finger of a user of second electronic device 306 and/or a stylus). In some examples, in accordance with a determination that the touch gesture detected at second electronic device 306 satisfies one or more criteria, the computing system transfers video content 304 from first electronic device 301 to second electronic device 306 (e.g., as shown in FIG. 3B). For example, the one or more criteria include a criterion that is satisfied when the touch gesture corresponds to a respective type of gesture. For example, the respective type of gesture is a swipe gesture (e.g., including a particular (e.g., defined) direction (e.g., downward), speed, and/or duration). For example, the respective type of gesture is a tap gesture (e.g., a multi-tap gesture, or a tap-and-hold gesture of a particular (e.g., defined) duration (e.g., 0.1, 0.2, 0.5, 1, 2, 5, or 10 seconds)). In some examples, the respective type of gesture is a system-defined gesture (e.g., a default gesture that is assigned to controlling the transfer of content between devices of the computing system (e.g., stored in a memory of one or more devices of the computing system)). In some examples, the respective type of gesture is a user-defined gesture (e.g., a gesture that is created and/or assigned by a user for controlling the transfer of content between devices of the computing system (e.g., stored in and/or associated with a user-profile on one or more devices of the computing system)). In some examples, the one or more criteria include a criterion that is satisfied when a respective type of touch gesture is detected on a particular touch region of display 308 of second electronic device 306 (e.g., as shown and described with reference to display 508 of second electronic device 506 in FIGS. 5A-5D). In some examples, in accordance with a determination that the touch gesture detected at second electronic device 306 does not satisfy the one or more criteria, the computing system forgoes transferring the presentation of video content 304 from first electronic device 301 to second electronic device 306 (e.g., and optionally performs a different operation, as shown and described with reference to FIGS. 3D-3E). By establishing one or more criteria that require satisfaction for transferring the presentation of video content 304 from first electronic device 301 to second electronic device 306, the computing system ensures that the user intends to transfer video content 304 to second electronic device 306 prior to performing the transfer, which reduces errors in user interaction and conserves computing resources associated with correcting (e.g., through additional user inputs) the unintended transfer of video content 304.

Alternatively, in some examples, second electronic device 306 presents (via display 308) a virtual element that is selectable to transfer video content 304 from first electronic device 301 to second electronic device 306 (e.g., the virtual element has one or more characteristics of selectable option 316 shown and described with reference to FIG. 3B). For example, in response to detecting a touch input corresponding to selection of the virtual element, the computing system transfers video content 304 from first electronic device 301 to second electronic device 306.

FIG. 3B illustrates the computing system transferring the presentation of video content 304 from first electronic device 301 to second electronic device 306 in response to the touch gesture detected at second electronic device 306 in FIG. 3A. For example, the computing system transfers video content 304 from being presented (e.g., displayed) on first electronic device 301 (e.g., via display 320) to being presented (e.g., displayed) on second electronic device 306 (e.g., via display 308) in FIG. 3B in accordance with a determination that the touch gesture detected by second electronic device 306 in FIG. 3A satisfies the one or more criteria described above (e.g., the computing system determines that the touch gesture corresponds to a downward swipe gesture detected at second electronic device 306). As shown in FIG. 3B, transferring the presentation of video content 304 from first electronic device 301 to second electronic device 306 includes ceasing to present, via display 320, video content 304 on first electronic device 301 (e.g., in environment 300) and displaying, via display 308, video content 304 on second electronic device 306. In some examples, presenting video content 304 on first electronic device 301 includes rendering video content 304 using second electronic device 306 (e.g., second electronic device 306 sends images and/or video associated with video content 304 to first electronic device 301), and transferring the presentation of video content 304 from first electronic device 301 to second electronic device 306 includes ceasing to send images and/or video associated with video content 304 from second electronic device 306 to first electronic device 301 (e.g., and presenting video content 304 on second electronic device 306 via display 308).

In some examples, transferring the presentation of video content 304 from first electronic device 301 to second electronic device 306 includes presenting a transition. In some examples, the transition includes an animation presented on first electronic device 301 and/or second electronic device 306. For example, presenting the animation includes ceasing to present video content 304 gradually (e.g., over a period of time (e.g., 0.1, 0.2, 0.5, 1, 2, 5, or 10 seconds)) in environment 300 (e.g., by fading out (e.g., decreasing the opacity of) video content 304 in environment 300). Additionally, or alternatively, for example, presenting the animation includes gradually presenting video content 304 on second electronic device 306 (e.g., after ceasing to present video content 304 on first electronic device 301 (e.g., by fading in (e.g., increasing the opacity of) video content 304 at display 308)). For example, presenting the animation includes cross fading the presentation of video content 304 between first electronic device 301 and second electronic device 306 (e.g., by fading out (e.g., decreasing the opacity of) the presentation of video content 304 on display 320 while concurrently fading in (e.g., increasing the opacity of) the presentation of video content 304 on display 308). Additionally, or alternatively, for example, presenting the animation includes moving video content 304 in environment 300 (e.g., from a current viewpoint of a user of first electronic device 301) toward a location in environment 300 corresponding to second electronic device 306 (e.g., second electronic device 306 is located downward from the current viewpoint of the user of first electronic device 301, and transferring the presentation of video content 304 includes moving video content 304 downward toward the location of second electronic device 306). Additionally, or alternatively, for example, presenting the animation includes moving the display location of video content 304 on display 308 (e.g., in a direction corresponding to the movement of video content 304 presented by first electronic device 301 in environment 300 (e.g., downward toward the center of display 308)). Additionally, or alternatively, for example, presenting the animation includes changing a size of video content 304 in environment 300 and/or on display 320 (e.g., the computing system decreases a size of video content 304 in environment 300 (e.g., until first electronic device 301 ceases to present video content 304 in environment 300) and/or increases a display size of video content 304 on display 308 (e.g., until second electronic device 306 presents video content 304 at a full size)). In some examples, the animation includes one or more characteristics of the animation shown and described with reference to FIG. 3I.

In some examples, as shown in FIG. 3B, the transfer of video content 304 from first electronic device 301 to second electronic device 306 includes an audio output, schematically represented by sound waves 312*a* in FIG. 3B. For example, the audio output is performed at one or more audio output devices of first electronic device 301 (e.g., having one or more characteristics of speaker(s) 216A described with reference to FIG. 2A). For example, the audio output is performed at one or more audio output devices in communication with first electronic device 301 (e.g., headphones (e.g., wireless headphones)). For example, the audio output provides audio feedback to the user of the computing system that content is being transferred between first electronic device 301 and second electronic device 306 (e.g., the audio output is independent and/or separate from audio output associated with the playback of video content 304).

Additionally, or alternatively to causing audio to be output indicating the transfer of content from first electronic device 301 to second electronic device 306, the computing system causes one or more characteristics of the output of the audio associated with the playback of video content 304 to be changed. For example, transferring video content 304 from first electronic device 301 to second electronic device 306 includes changing a spatial location of the audio associated with video content 304 in environment 300 (e.g., changing the location at which the audio associated with video content 304 emanates from in environment 300 from the perspective of a user of first electronic device 301). For example, in FIG. 3A, the audio associated with video content 304 emanates from a location corresponding to the virtual window that video content 304 is presented within in environment 300, and in FIG. 3B, the audio associated with video content 304 emanates from a location in environment 300 corresponding to second electronic device 306. In some examples, when changing the output location of the audio associated with video content 304, first electronic device 301 transitions the output. For example, first electronic device 301 transitions the output of the audio associated with video content 304 by fading out (e.g., reducing the volume of) the audio at the initial location of video content 304 in environment 300 and, serially or concurrently, fading in (e.g., increasing the volume of) the audio at the new location in environment 300 corresponding to second electronic device 306 (e.g., first electronic device 301 transitions the audio output until the audio reaches a final volume (e.g., a volume level after which the volume is no longer increased, which is optionally the volume at which the audio was output prior to the transition)). In some examples, transitioning the output of the audio associated with the playback of video content 304 includes spatially expanding or reducing the audio (e.g., by changing the three-dimensional size of the audio and/or by changing the sound stage of the audio). Additionally, or alternatively, transferring video content 304 from first electronic device 301 to second electronic device 306 includes transitioning from outputting the audio from first electronic device 301 to outputting the audio from second electronic device 306 (e.g., as shown and described with reference to FIGS. 3G-3H). Additionally, or alternatively, transferring video content 304 from first electronic device 301 to second electronic device 306 includes providing haptic feedback at second electronic device 306.

In some examples, and as used herein, the system is able to output spatial audio with different sized sound stages. Respective simulated sound stages have corresponding virtual speaker layouts associated therewith; as used herein, "sound stage" refers to a respective layout of virtual speakers, including a number and/or position of virtual speakers used to present spatial audio. In some examples, sound stages simulate spatial audio playback in differently-sized rooms and/or with differently-sized speaker setups. For example, a large sound stage is spatial audio that sounds like it is playing in a movie theater with spatial audio speakers positioned a relatively large distance from the user of the first electronic device 301. As another example, a medium sound stage is spatial audio that sounds like it is playing in a home theater with spatial audio speakers positioned a smaller distance from the user of the first electronic device 301 compared to the simulated speaker distance associated with the large sound stage. Additionally or alternatively, in some examples, the medium sound stage sounds like the audio is playing on fewer simulated speakers than the number of simulated speakers of the large sound stage. As another example, a small sound stage is spatial audio that sounds like it is playing from a more localized source than the medium sound stage, such as a stereo speaker arrangement positioned at the location of the visual content associated with the audio content. In some examples, the small sound stage includes fewer simulated speakers, simulated speakers positioned closer to each other, and/or simulated speakers closer to the user compared to the simulated speakers for the medium sound stage and/or the large sound stage.

In some examples, transferring the presentation of video content 304 from first electronic device 301 to second electronic device 306 includes maintaining a playback state of video content 304. For example, while second electronic device 306 detects the touch gesture represented by touch positions 310*a* to 310*b* in FIG. 3A, video content 304 is played back in environment 300, and transferring the presentation of video content 304 to second electronic device 306 includes maintaining playback (e.g., continuing to play back) video content 304 on second electronic device 306. Alternatively, in some examples, transferring the presentation of video content 304 from first electronic device 301 to second electronic device 306 includes pausing playback of video content 304 (e.g., second electronic device 306 resumes playback of video content 304 in response to detecting selection of one or more selectable options included in playback controls 318 shown in FIG. 3B).

In FIG. 3B, second electronic device 306 presents video content 304 concurrently with one or more virtual elements. For example, in FIG. 3B, video content 304 is presented with playback controls 318 (e.g., including a plurality of selectable options for controlling playback of video content 304). In some examples, video content 304 is presented with an option that is selectable to transfer video content 304 from second electronic device 306 to first electronic device 301. For example, as shown in FIG. 3B, video content 304 is presented with selectable option 316. In some examples, selectable option 316 is presented by second electronic device 306 as an affordance (e.g., including text and/or an icon to visually indicate that selection of selectable option 316 will cause video content 304 to be transferred from second electronic device 306 to first electronic device 301).

Figure 3C:
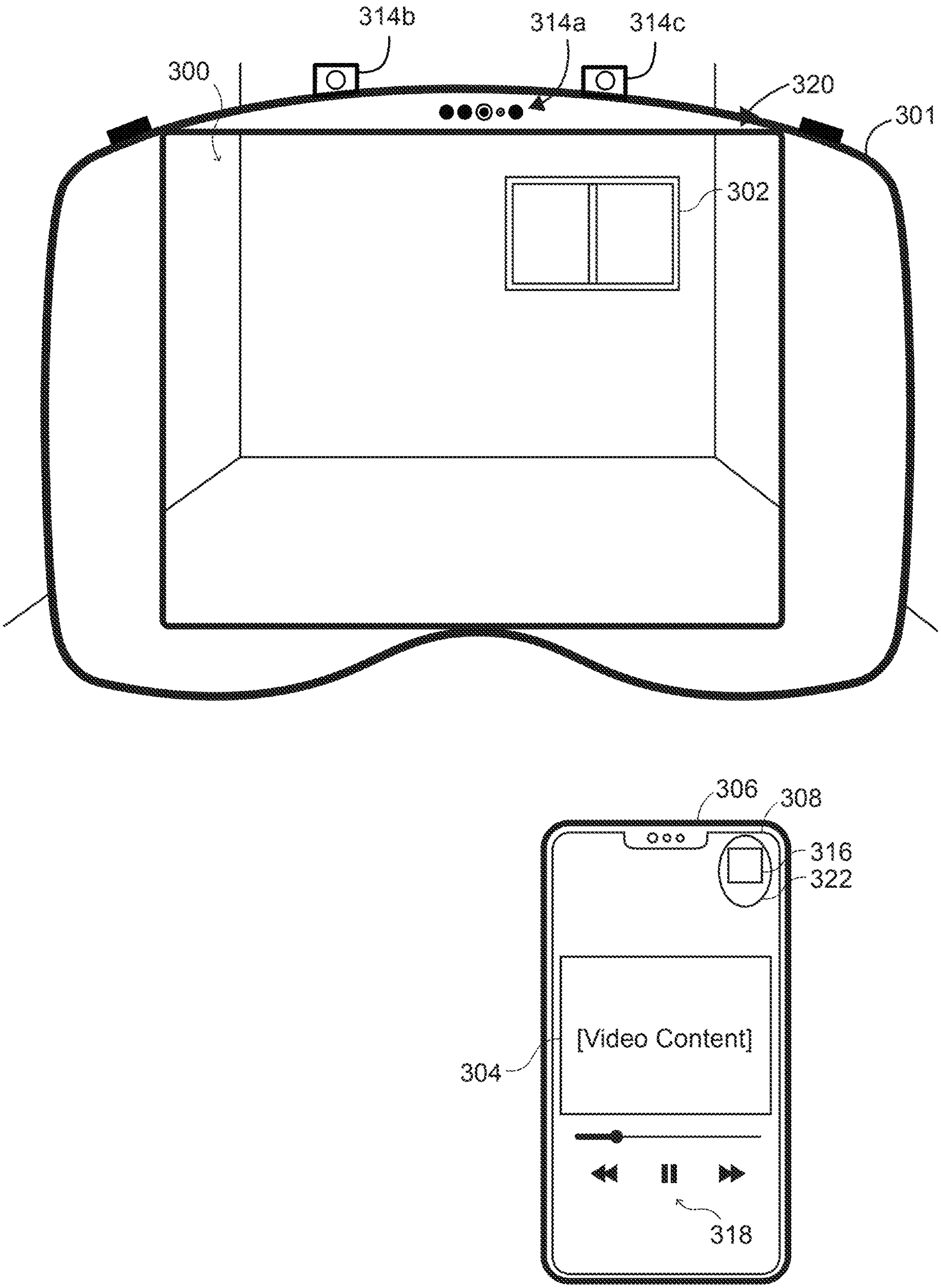

FIG. 3C illustrates second electronic device 306 detecting a touch input 322 corresponding to selection of selectable option 316. For example, touch input 322 is a tap input detected at a location of display 308 corresponding to selectable option 316. In some examples, touch input 322 corresponds to a request to transfer video content 304 from second electronic device 306 to first electronic device 301. Alternatively, in some examples, the request to transfer video content 304 from second electronic device 306 to first electronic device 301 includes a touch gesture that satisfies one or more second criteria for transferring the presentation of respective content from second electronic device 306 to first electronic device 301 (e.g., a touch gesture that includes a respective type of gesture (e.g., an upward swipe, such as the touch gesture shown and described with reference to FIG. 4G)). Alternatively, in some examples, the request to transfer video content 304 from second electronic device 306 to first electronic device 301 includes an input detected on first electronic device 301 that satisfies one or more second criteria for transferring the presentation of respective content from second electronic device 306 to first electronic device 301 (e.g., the input includes an air gesture and/or selection of a selectable option presented in environment 300).

Figure 3D:
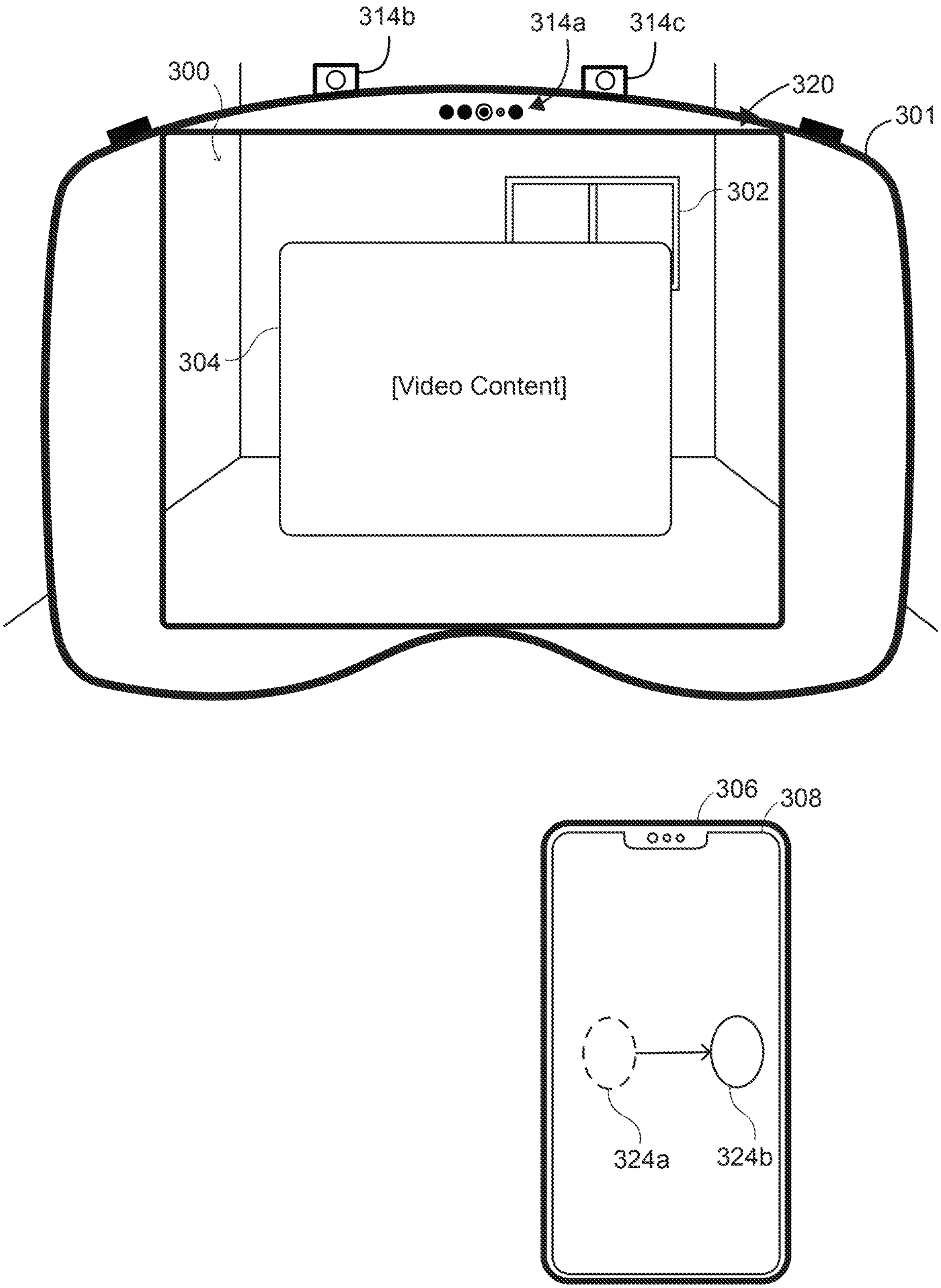

In some examples, in response to touch input 322, the computing system transfers video content 304 from second electronic device 306 to first electronic device 301 in FIG. 3D. For example, transferring the presentation of video content 304 from second electronic device 306 to first electronic device 301 includes one or more characteristics of transferring the presentation of video content 304 from first electronic device 301 to second electronic device 306 as described above (e.g., the computing system presents a transition, animation, and/or audio output while transferring the presentation of video content 304 from second electronic device 306 to first electronic device 301). In some examples, transferring the presentation of video content 304 from second electronic device 306 to first electronic device 301 includes presenting video content 304 in environment 300 at the same position first electronic device 301 presented video content 304 from prior to transferring the presentation of video content 304 to second electronic device 306 (e.g., the position of video content 304 shown in FIG. 3A) (e.g., the same position corresponds to a location and/or orientation (e.g., relative to environment 300 and/or relative to the current viewpoint of the user of first electronic device 301)). Transferring the presentation of video content 304 from second electronic device 306 to first electronic device 301 optionally includes providing an audio output having one or more characteristics of the audio output shown and described with reference to FIG. 3B (e.g., the audio output includes changing the spatial location of the audio associated with video content 304 from a location associated with second electronic device 306 to a different location in three-dimensional environment 300).

FIG. 3D illustrates second electronic device 306 detecting a touch gesture (represented by touch positions 324*a* to 324*b*). For example, the touch gesture shown in FIG. 3D is a different type of touch gesture from the touch gesture shown in FIG. 3A (e.g., the touch gesture shown in FIG. 3A that satisfies the one or more criteria for transferring the presentation of video content 304 is a vertical swipe gesture (e.g., a downward swipe), and the touch gesture shown in FIG. 3D is a horizontal swipe gesture (e.g., a rightward swipe)). In some examples, the touch gesture shown in FIG. 3D does not satisfy the one or more criteria for transferring the presentation of video content 304 from first electronic device 301 to second electronic device 306 (e.g., the computing system does not transfer video content 304 in response to the touch gesture detected in FIG. 3D because the touch gesture does not satisfy the one or more criteria for transferring the presentation of video content 304).

Figure 3E:
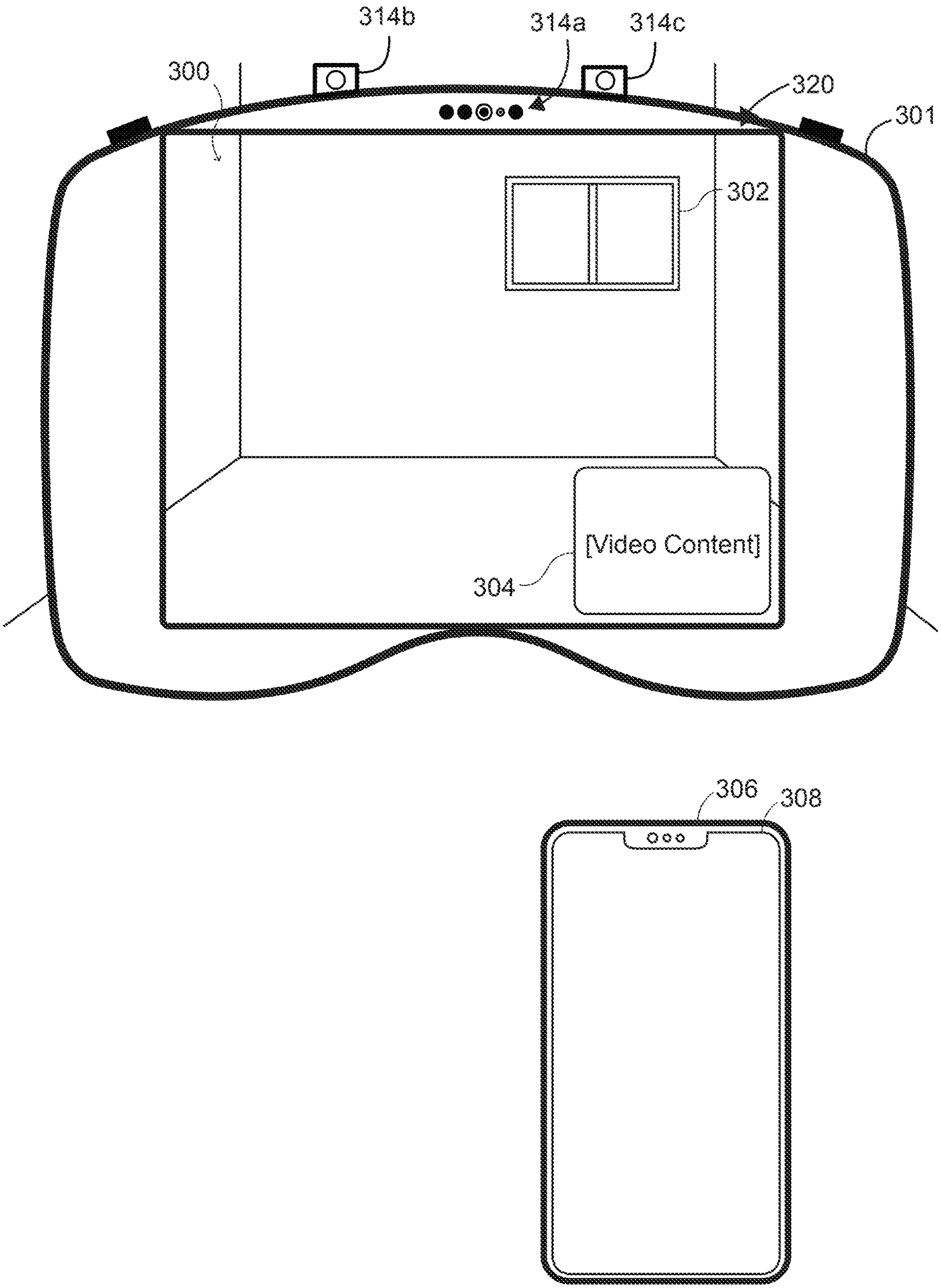

In some examples, in accordance with a determination that the touch gesture detected at second electronic device 306 satisfies one or more second criteria, different from the one or more criteria for transferring the presentation of video content 304 described above (e.g., with reference to FIG. 3A), the computing system performs an operation different from transferring the presentation of video content 304 from first electronic device 301 to second electronic device 306 (e.g., the operation includes modifying the presentation of video content 304 in environment 300, as shown and described with reference to FIG. 3E). For example, the one or more second criteria are satisfied when the touch gesture corresponds to a second respective type of gesture, different from the respective type of gesture shown and described with reference to FIG. 3A. For example, the second respective type of gesture is a swipe gesture including a different direction than the respective type of gesture (e.g., the second respective type of gesture is a horizontal swipe gesture, and the respective type of gesture is vertical swipe gesture). For example, the second respective type of gesture is a tap gesture, and the first respective type of gesture is a swipe gesture (or the first respective type of gesture is a tap gesture, and the second respective type of gesture is a swipe gesture). In some examples, the second respective type of gesture is a system-defined gesture (e.g., a default gesture that is assigned for performing the operation in environment 300 that is stored in a memory of one or more devices of the computing system). In some examples, the second respective type of gesture is a user-defined gesture (e.g., a gesture that is created and/or assigned by a user for performing the operation in environment 300 (e.g., stored in and/or associated with a user-profile on one or more devices of the computing system)). In some examples, in accordance with a determination that the touch gesture detected at second electronic device 306 does not satisfy the one or more second criteria, the computing system forgoes performing the operation (e.g., and/or performs a different type of operation). Assigning different types of operations (e.g., transferring the presentation of video content 304 or different operation (e.g., modifying the presentation of video content 304 as shown in FIG. 3E)) to different types of gestures detected at second electronic device 306 ensures a user intends to perform a respective type of operation prior to performing the operation, which reduces errors in interaction and conserves computing resources associated with correcting errors.

FIG. 3E illustrates the computing system modifying the presentation of video content 304 in environment 300 in response to the touch gesture detected at second electronic device 306 in FIG. 3D. For example, the computing system modifies the presentation of video content 304 in environment 300 in FIG. 3E in accordance with a determination that the touch gesture detected at second electronic device 306 in FIG. 3D satisfies the one or more second criteria described above (e.g., modifying the presentation of video content 304 corresponds to the operation performed in accordance with the determination that the touch gesture satisfies the one or more second criteria as described above). In some examples, modifying the presentation of video content 304 includes presenting video content 304 in a picture-in-picture presentation. For example, first electronic device 301 decreases a size of the presentation of video content 304 in environment 300 (e.g., compared to the size of video content 304 shown in FIG. 3D). For example, first electronic device 301 offsets the presentation of video content 304 and/or moves video content 304 to a new location in environment 300 (e.g., from the current viewpoint of the user of first electronic device 301). In some examples, presenting video content 304 in the picture-in-picture presentation includes maintaining a playback state of video content 304 (e.g., continuing to play back video content 304 in environment 300). In some examples, modifying the presentation of video content 304 includes presenting an animation in environment 300 of video content 304 transitioning to the picture-in-picture state (e.g., by gradually (e.g., over a period of time, such as 0.1, 0.2, 0.5, 1, 2, 5, or 10 seconds) decreasing the size and/or moving video content 304 in environment 300). In some examples, presenting video content 304 in the picture-in-picture presentation includes providing an audio output (e.g., having one or more characteristics of the audio output shown and described with reference to FIG. 3B). For example, the audio output includes changing a spatial location of video content 304 from the location of video content 304 in environment 300 shown in FIG. 3D to the location of video content 304 in environment 300 shown in FIG. 3D.

In some examples, in response to the computing system detecting a third respective type of gesture at second electronic device 306 while first electronic device 301 presents video content 304 in the modified state, first electronic device 301 ceases to present video content 304 the picture-in-picture state. For example, the third respective type of gesture is different from the second respective type of gesture (e.g., the third respective type of gesture includes a swipe gesture in the opposite direction (e.g., leftward) as the second respective type of gesture). For example, ceasing to present video content 304 in the picture-in-picture state includes presenting video content 304 in the state shown in FIG. 3D (e.g., with the size and/or at the location prior to detecting the touch gesture that satisfied the one or more second criteria for modifying the presentation of video content 304 in environment 300). For example, in response to detecting the third respective type of gesture, first electronic device 301 increases a size and/or moves video content 304 in environment 300 (e.g., to the size and/or position shown in FIG. 3D).

Figure 3F:
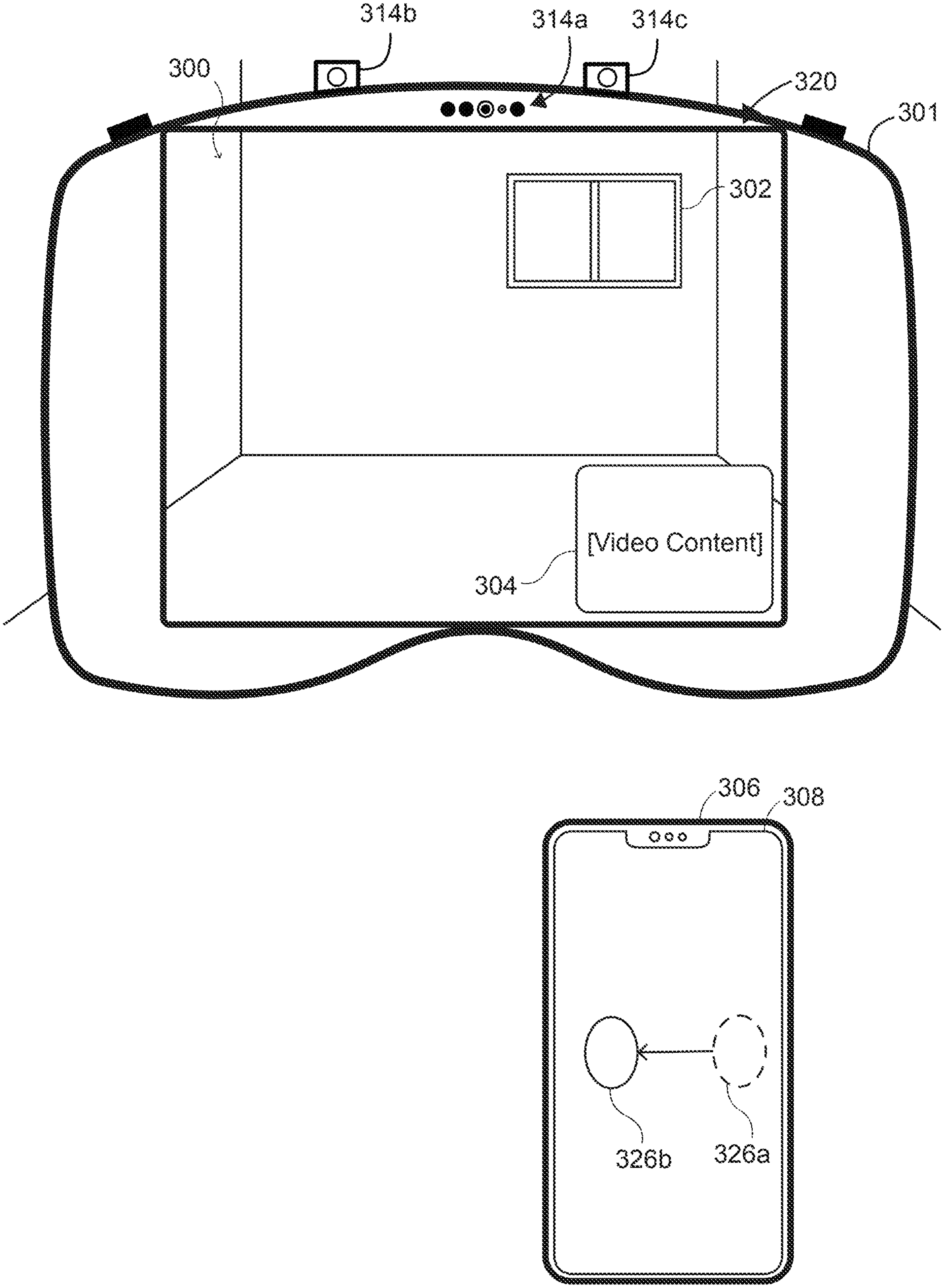
Figure 3G:
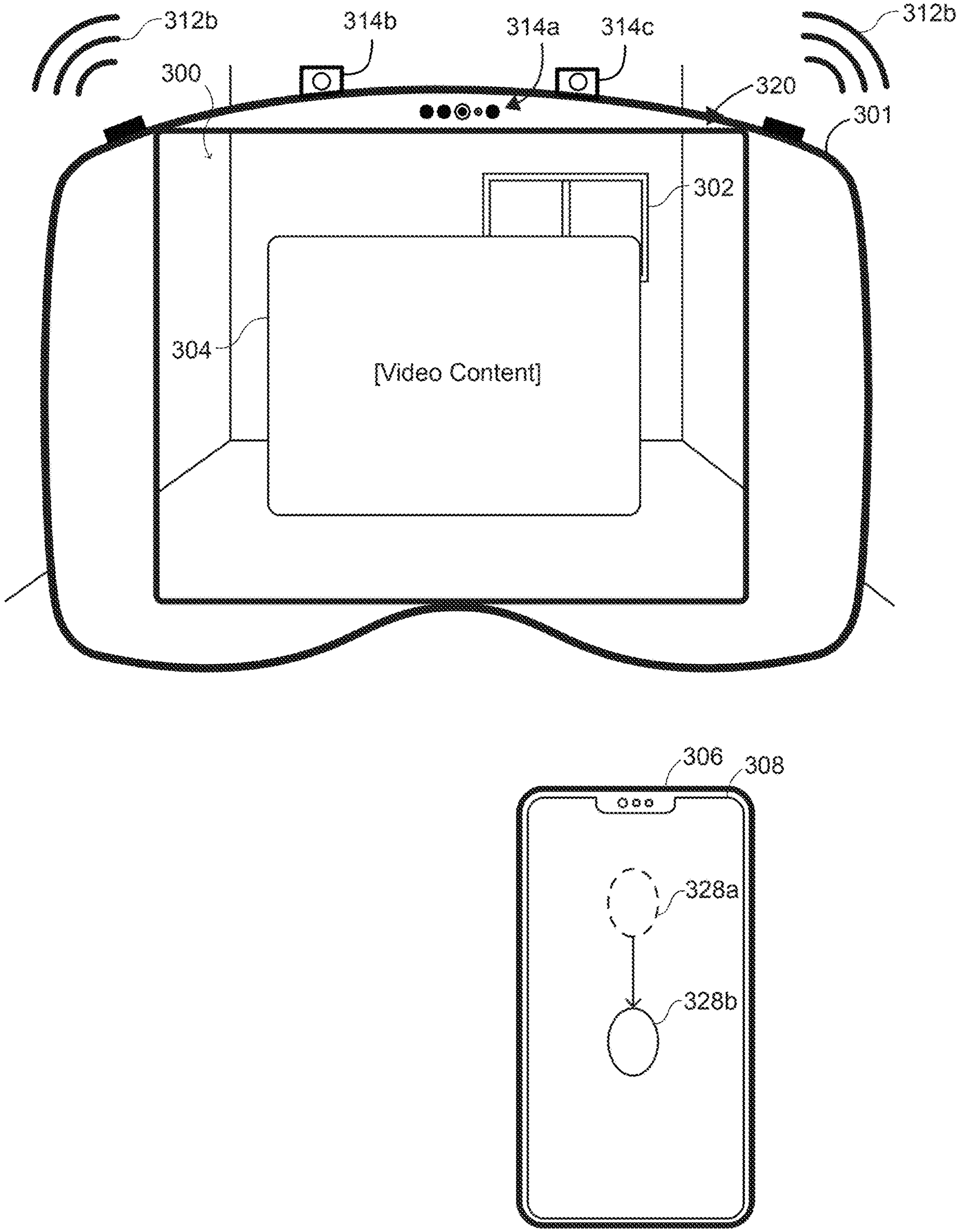

FIG. 3F illustrates second electronic device 306 detecting a touch gesture (represented by touch positions 326*a* to 326*b*) corresponding to a third respective type of gesture (e.g., as described above). For example, the touch gesture includes a horizontal swipe gesture that is in a different direction (e.g., an opposite direction) from the second respective type of gesture shown and described with reference to FIG. 3D. In some examples, the touch gesture shown in FIG. 3F corresponds to a request to transition the presentation of video content 304 in environment 300 from the picture-in-picture state (shown in FIGS. 3E-3F) to an increased presentation size (e.g., as shown in FIGS. 3A-3D). In some examples, in response to detecting the touch gesture shown in FIG. 3F, the computing system causes video content 304 to be displayed, via display 320, with an increased presentation size in environment 300, as shown in FIG. 3G. Transitioning the presentation of video content 304 from the picture-in picture state in FIG. 3F to the increased presentation size in FIG. 3G optionally includes changing one or more characteristics of the output of audio associated with the playback of video content 304 (e.g., changing the spatial location of the audio and/or the sound stage to correspond to the change in location and/or size of video content 304 from the picture-in-picture state to the increased presentation size).

FIG. 3G illustrates the computing system detecting a touch gesture at second electronic device 306. In some examples, the touch gesture is a swipe gesture (e.g., a downward swipe) detected from touch position 328*a* to touch position 328*b*. The touch gesture detected at second electronic device 306 in FIG. 3G optionally has one or more characteristics of the touch gesture detected at second electronic device 306 in FIG. 3A. In some examples, the touch gesture shown in FIG. 3G satisfies the one or more criteria for transferring video content 304 from first electronic device 301 to second electronic device 306 as described above. In some examples, in accordance with a determination that the touch gesture satisfies the one or more criteria for transferring video content 304 from first electronic device 301 to second electronic device 306, the computing system causes video content 304 to be displayed at second electronic device 306, as shown in FIG. 3H.

In some examples, transferring video content 304 from first electronic device 301 to second electronic device 306 includes transferring the output of audio associated with the playback of video content 304 from one or more first audio output devices of (e.g., included in and/or in communication with) first electronic device 301 to one or more second audio output devices of (e.g., included in and/or in communication with) second electronic device 306. For example, as shown in FIG. 3G, while the computing system presents, at first electronic device 301, video content 304 in environment 300, the computing system causes audio (represented by sound waves 312*b*) to be output via one or more first audio output devices of first electronic device 301 (e.g., speaker(s) 216A described above). Further, for example, as shown in FIG. 3H, while the computing system presents video content 304 at second electronic device 306 (e.g., after the computing system causes video content 304 to be transferred from first electronic device 301 to second electronic device 306), the computing system causes audio (represented by sound waves 312*c*) to be output via one or more second audio output devices of second electronic device 306 (e.g., speaker(s) 216B described above). In some examples, transferring the output of the audio associated with the playback of video content 304 from first electronic device 301 to second electronic device 306 includes transitioning the output of the audio from the one or more first audio output devices of first electronic device 301 to the one or more second audio output devices of second electronic device 306 (e.g., as shown and described with reference to FIG. 3I). Alternatively, transferring video content 304 from first electronic device 301 to second electronic device 306 includes maintaining output of audio associated with the playback of video content 304 via the one or more first audio output devices of the first electronic device 301. For example, while video content 304 is transferred, the computing system causes one or more characteristics of the output of audio associated with the playback of video content 304 to be changed via the one or more first audio output devices of first electronic device 301 (e.g., as described above with reference to the transfer of video content 304 from first electronic device 301 to second electronic device 306 in FIGS. 3A-3B).

Figure 3H:
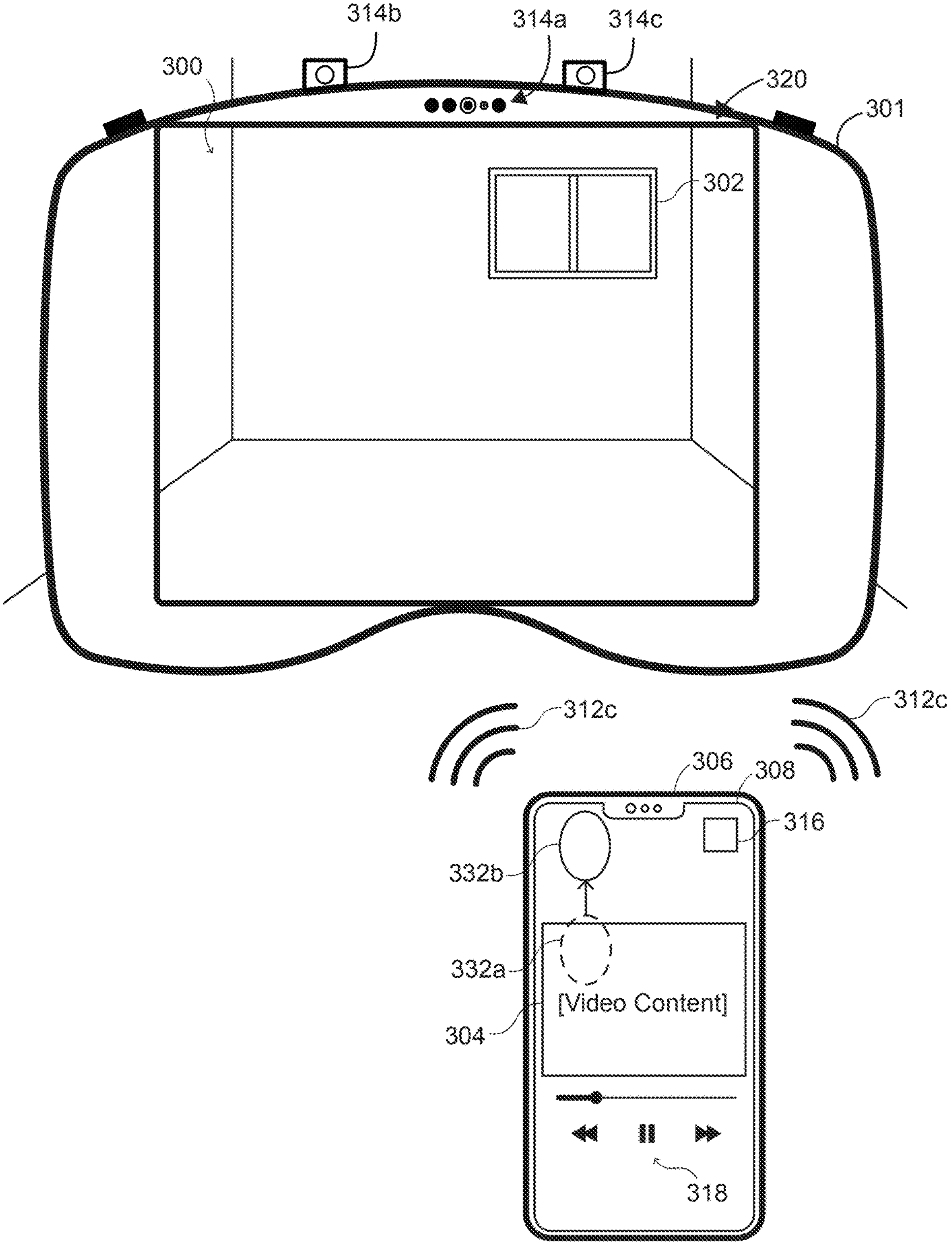

In some examples, transitioning outputting the audio with first electronic device 301, such as in FIG. 3G, to outputting the audio with the second electronic device 306, such as in FIG. 3H, includes playing a transition effect using first electronic device 301 and/or second electronic device 306. For example, the system uses a cross-fading effect to transition the audio output from the first electronic device 301 to the second electronic device 306. The cross-fading effect optionally includes gradually reducing the output volume of the audio playing with first electronic device 301 while gradually increasing the output volume of the audio playing with second electronic device 306. The system can similarly transition from playing audio with the second electronic device 306 to playing audio with the first electronic device 301 with a cross-fading effect by gradually decreasing the volume of the audio output with the second electronic device 306 while gradually increasing the volume of the audio output with the first electronic device 301.

As another example, the system outputs a spatial audio transition that sounds like the audio is moving from the audio location(s) in FIG. 3G to the audio location(s) in FIG. 3H using the first electronic device 301. For example, in FIG. 3G, the first electronic device 301 plays spatial audio that sounds like it is playing from the location at which the first electronic device 301 displays the video content 304 and, in FIG. 3H, the second electronic device 306 plays the audio content of the video content 304 from the location of the second electronic device 306. Additionally or alternatively, in some examples, the first electronic device 301 plays spatial audio that sounds like it is playing from the location of the second electronic device 306 while the second electronic device 306 presents the visual content of video content 304 in FIG. 3H. In some examples, in response to transferring the video content 304 from the first electronic device 301, such as in FIG. 3G, to the second electronic device 306, such as in FIG. 3H, the system plays spatial audio that sounds like the audio content of video content 304 is moving from the audio output location of FIG. 3G to the audio output location of FIG. 3H. In some examples, in response to transferring the video content 304 from the third electronic device 306, such as in FIG. 3H, to the first electronic device 301, such as in FIG. 3G, the system plays spatial audio that sounds like the audio content of video content 304 is moving from the audio output location of FIG. 3H to the audio output location of FIG. 3G.

In some examples, the system uses the first electronic device 301 to play the transition that sounds like the audio is moving. In some examples, the first electronic device 301 estimates or infers the location of the second electronic device 306; for example, the first electronic device 301 infers that the second electronic device 306 is located at an angle normal to the user's face and below the user's head by a respective angle. As another example, the system determines the location of the second electronic device 306 using one or more sensors of the first electronic device 301 and/or one or more sensors of the second electronic device 306. The first electronic device 301 optionally uses the estimated, inferred, and/or determined location of the second electronic device 306 to output spatial audio, such as the audio transition that simulates movement of the audio and/or the audio of video content 304 being presented with second electronic device 306 in FIG. 3H, that sounds like it is coming from second electronic device 306 and/or moving to (or from) the location of the second electronic device 306.

In FIG. 3H, the computing system detects a touch gesture (represented by touch positions 332*a* to 332*b*) that satisfies one or more second criteria for transferring the presentation of video content 304 from second electronic device 306 to first electronic device 301 (e.g., optionally different from the one or more criteria for transferring the presentation of video content 304 from first electronic device 301 to second electronic device 306). In some examples, the one or more second criteria for transferring the presentation of video content 304 from second electronic device 306 to first electronic device 301 have one or more characteristics of the one or more second criteria for transferring virtual keyboard 422 from second electronic device 406 to first electronic device 401 described with reference to FIG. 4G. In some examples, the computing system causes the presentation of video content 304 to transfer from second electronic device 306 to first electronic device 301 in response to detecting a touch gesture at second electronic device 306 that satisfies the one or more second criteria for transferring video content 304 from second electronic device 306 to first electronic device 301 or in response to detecting a touch input corresponding to selection of selectable option 316. In some examples, in response to detecting the touch gesture that satisfies the one or more second criteria for transferring the presentation of video content 304 from second electronic device 306 to first electronic device 301, the computing system causes the presentation of video content 304 to be transferred from second electronic device 306 to first electronic device 310, as shown in FIGS. 3I-3J.

Figure 3I:
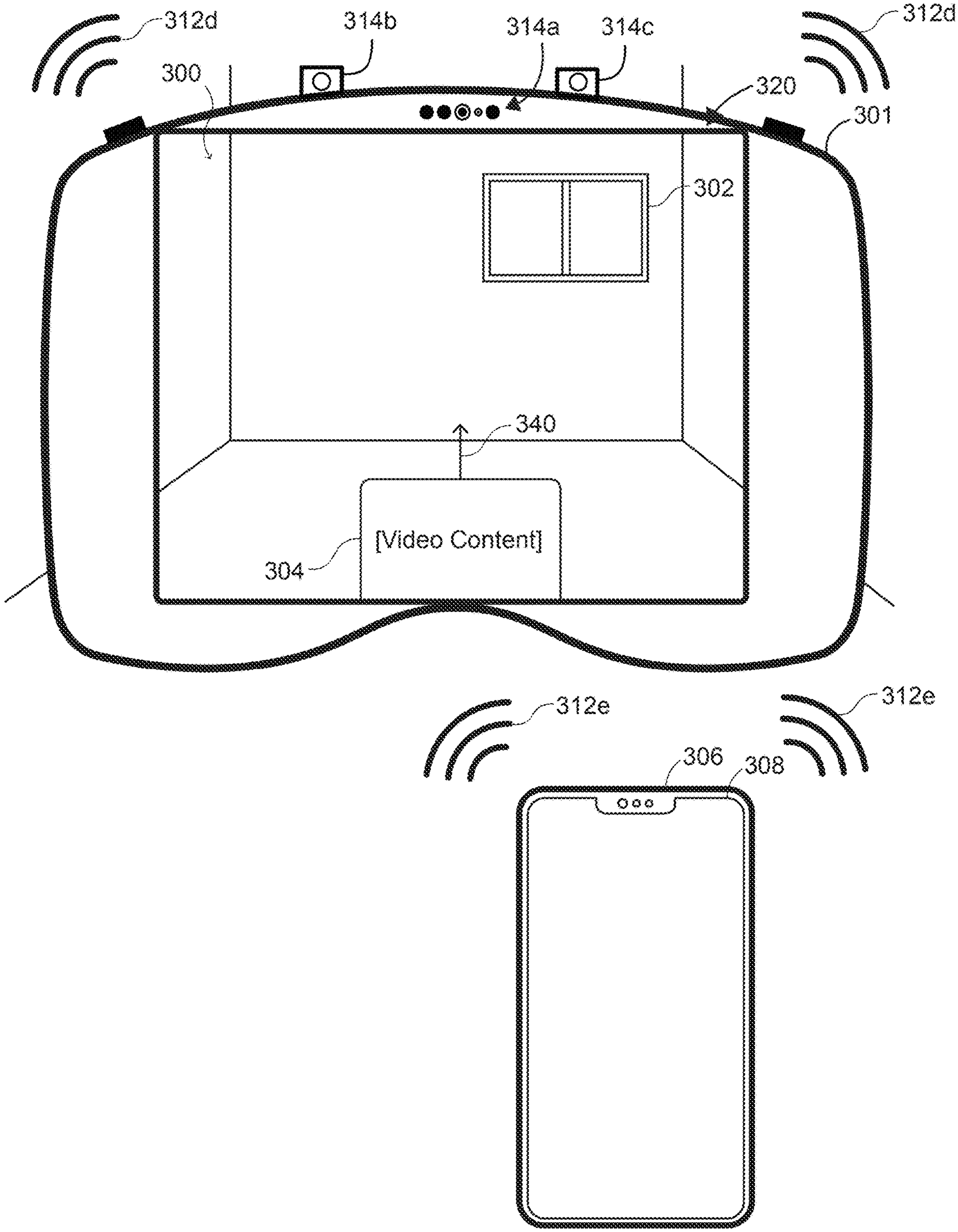
Figure 3J:
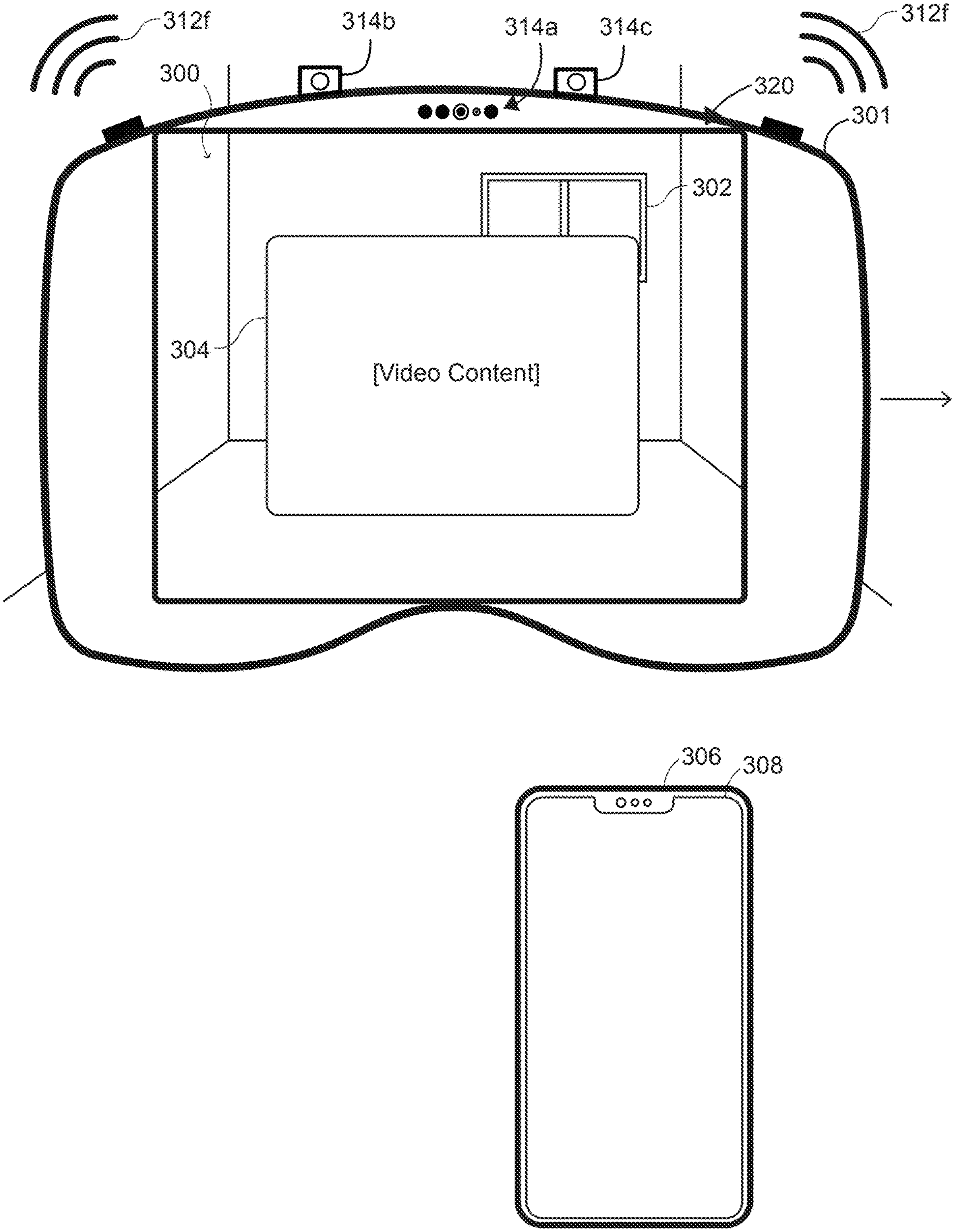

FIGS. 3I-3J illustrate the computing system transitioning the presentation of video content 304 from second electronic device 306 to first electronic device 301 in response to detecting the touch gesture in FIG. 3H. In some examples, as shown in FIG. 3I, transitioning the presentation of video content 304 from second electronic device 306 to first electronic device 301 includes presenting an animation. In some examples, the animation has one or more characteristics of the animation described above with reference to the transfer of the presentation of video content 304 shown from FIG. 3A to FIG. 3B. In some examples, the animation includes presenting movement of video content 304. For example, while a user performs an upward swipe gesture on second electronic device 306 (e.g., the touch gesture shown in FIG. 3H), the computing system causes the presentation location of video content 304 to move upward on display 308 (e.g., until second electronic device 306 ceases to present video content 304 via display 308). For example, as shown in FIGS. 3I-3J, and optionally concurrently with and/or after moving the presentation location of video content 304 on display 308, the computing system causes movement of video content 304 to be presented, via display 320, in environment 300 (e.g., movement of video content 304 from a lower portion of the field of view of the user to a center of the field of view of the user). In FIG. 3I, the movement of video content 304 in environment 300 is schematically represented by arrow 340.

Additionally, or alternatively to presenting movement of video content 304 during the animation, the computing system causes a change in presentation size of video content 304. For example, while a user performs an upward swipe gesture on second electronic device 306 (e.g., the touch gesture shown in FIG. 3H), the computing system causes the presentation size of video content 304 to decrease on display 308 (e.g., until second electronic device 306 ceases to present video content 304 via display 308), optionally while causing the presentation location of video content 304 to move upward, as described above. For example, as shown in FIGS. 3I-3J, the computing system causes an increase in presentation size of video content 304 in environment 300 (e.g., concurrently with and/or after decreasing the presentation size of video content 304 on display 308), optionally while causing the presentation location of video content 304 to move upward in environment 300, as described above. For example, as shown in FIGS. 3I-3J, the computing system presents, via display 320, video content 304 with a larger size in environment 300 in FIG. 3J (e.g., at the conclusion of the animation) compared to the size of video content 304 in FIG. 3I (e.g., during the animation).

In FIGS. 3I-3J, the computing system causes output of audio associated with the playback of video content 304 to be transitioned from being output via the one or more second audio output devices of second electronic device 306 to being output via the one or more first audio output devices of first electronic device 301. In some examples, as shown in FIG. 3I, first electronic device 301 outputs audio (represented by sound waves 312*d*) via the one or more first audio output devices while second electronic device 306 concurrently outputs audio (represented by sound waves 312*e*) via the one or more second audio output devices. For example, transitioning the audio associated with the playback of video content 304 from being output by second electronic device 306 to being output by first electronic device 301 includes cross-fading the audio between the one or more second output devices and the one or more first output devices. For example, the cross-fade includes fading out (e.g., reducing the volume of) the audio output by the one or more second audio output devices of second electronic device 306 (e.g., until the second electronic device 306 ceases to output the audio) while concurrently fading in (e.g., increasing the volume of) the audio output by the one or more first audio output devices of first electronic device 301 (e.g., until the audio reaches a pre-set volume and/or a volume at which the audio was output by first electronic device 301 prior to transferring the presentation of video content 304 to second electronic device 306). Additionally, or alternatively, in some examples, transitioning the output of the audio associated with the playback of video content 304 from being output by second electronic device 306 to being output by first electronic device 301 includes spatially expanding the audio via the one or more first audio output devices. For example, the computing system causes the one or more first audio output devices to increase the three-dimensional size and/or sound stage of the audio (e.g., the increase of the three-dimensional size and/or sound stage of the audio corresponds to the increase in size of video content 304 in environment 300 presented during the animation).

Additionally, or alternatively to transitioning the audio from being output via the one or more second audio output device of second electronic device 306 to being output via the one or more first audio output devices of first electronic device 301, the computing system optionally outputs audio feedback to indicate that video content 304 is being transferred from second electronic device 306 to first electronic device 301. For example, the audio feedback is independent and/or separate from the audio associated with the playback of video content 304. For example, the audio feedback is a sound effect that is output via the one or more first audio output devices and/or the one or more second audio output devices whenever content (e.g., video content 304) is transferred between first electronic device 301 and second electronic device 306 (e.g., the audio feedback is optionally different depending on whether the content is transferred from first electronic device 301 to second electronic device 306 or from second electronic device 306 to first electronic device 301). Outputting a sound effect that is separate from the audio that is associated with video content 304 during the transition optionally assists in masking differences in the output of the audio between second electronic device 306 and first electronic device 301 during the transition. Additionally, or alternatively, transferring video content 304 from second electronic device 306 to first electronic device 301 includes providing haptic feedback at second electronic device 306.

In some examples, as shown in FIG. 3J, the computing system causes audio associated with the playback of video content 304 to be output via the one or more first audio output devices of first electronic device 301 when the transfer of the presentation of video content 304 from second electronic device 306 to first electronic device 301 is complete. For example, in FIG. 3J, the output of the audio associated with the playback of video content 304 is schematically represented by sound waves representing audio 312*f*. In some examples, playing the audio associated with the video content 304 in FIG. 3J includes playing spatial audio that sounds like it is coming from the location of the video content 304 in FIG. 3J. Optionally, the first electronic device 301 plays the audio content with a small, medium, or large sound stage as described above.

As shown in FIG. 3J, the first electronic device 301 detects movement of the first electronic device 301 and/or of the user of the first electronic device 306 while the first electronic device 301 is playing video content 304. For example, the user rotates to the right. In response to detecting movement of the first electronic device 301, the first electronic device 306 transitions from presenting the video content 304 at a full size as shown in FIG. 3J to presenting the video content 304 in a picture-in-picture element as shown in FIG. 3K.

Figure 3K:
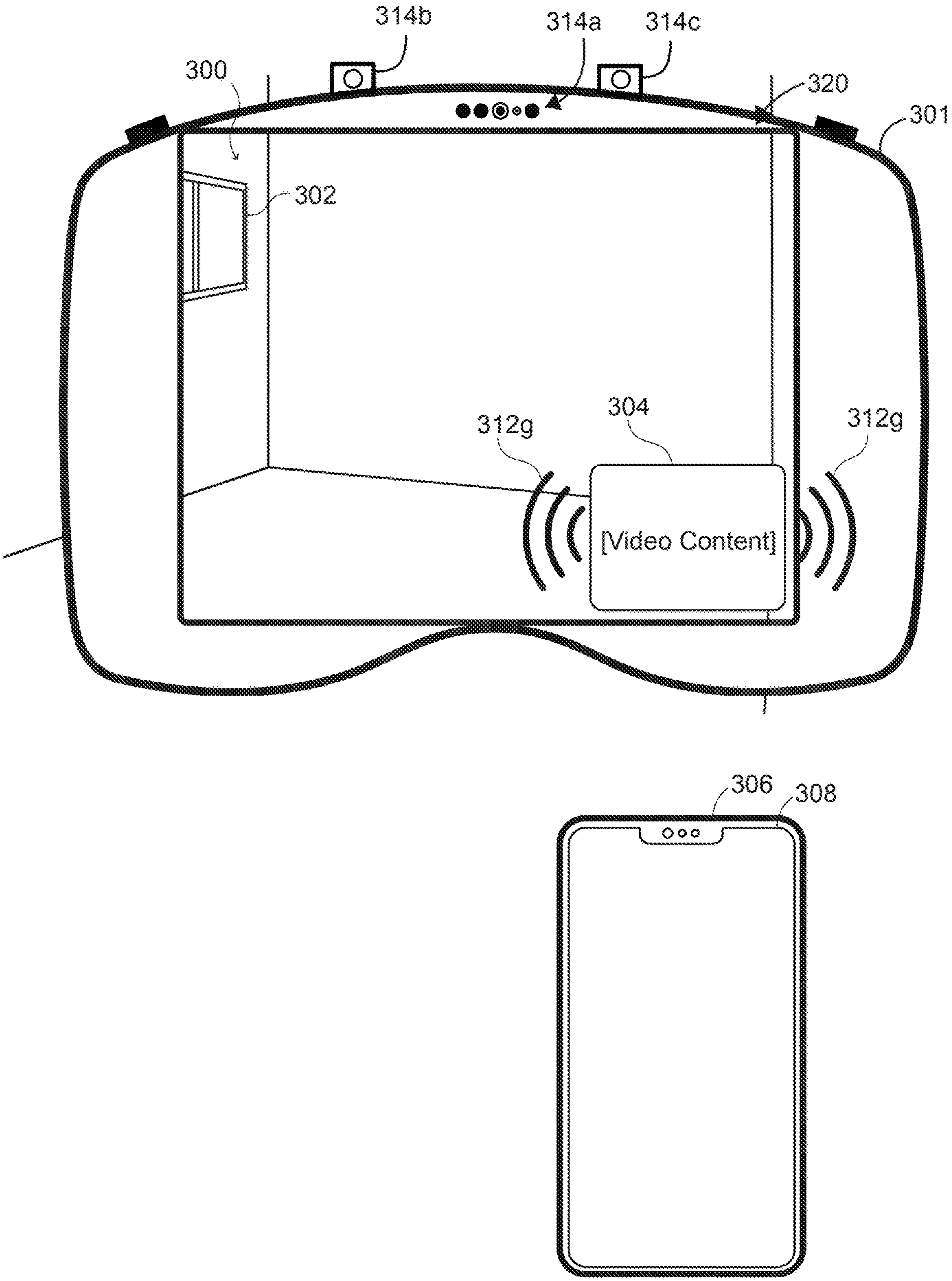

FIG. 3K illustrates the first electronic device 301 presenting the video content 304 in a picture-in-picture element. In some examples, the electronic device 301 presents the video content 304 in the picture-in-picture element in response to detecting the movement described with reference to FIG. 3J. In some examples, while presenting the video content 304 in the picture-in-picture element in FIG. 3K, the first electronic device 301 presents spatial audio corresponding to the audio content of the video content 304. The first electronic device 306 optionally presents the spatial audio with a small sound stage that sounds like the audio is playing from the location corresponding to the visual content of video content 304. For example, the spatial audio is depicted in FIG. 3K as audio 312*g*.

In some examples, in response to detecting movement of the first electronic device 301 and/or the user in FIG. 3J, the first electronic device 301 presents an audio transition from presenting the audio 312*f* illustrated in FIG. 3J to the audio 312*g* illustrated in FIG. 3K. The audio transition optionally includes a cross-fading effect and/or spatial audio that moves from the location of the audio 312*f* to the location of the audio 312*g* according to the examples of these transition effects described above.

In some examples, while displaying the video content 304 in the picture-in-picture element in FIG. 3K in response to detecting the movement of the first electronic device 301 and/or of the user, the first electronic device 301 detects movement to the position associated with displaying the video content 304 as shown in FIG. 3J. For example, the first electronic device 301 detects movement of the first electronic device 301 and/or the user to the position the first electronic device 301 and/or the user were in while the first electronic device 301 presented the video content 304 as shown in FIG. 3J. In some examples, in response to detecting this movement, the first electronic device 301 displays the video content 304 as shown in FIG. 3J, presents audio 312*f*, and presents an audio transition effect, such as cross-fading or moving spatial audio. The audio transition effect transitions the first electronic device 301 from presenting audio 312*g* to presenting audio 312*f* in a manner similar to the manner described above of transitioning from presenting audio 312*f* to presenting audio 312*g*, for example. In some examples, transitioning from presenting audio 312*g* to presenting audio 312*f* includes presenting audio 312*f* with a medium or large sound stage, or presenting audio 312*f* with a small sound stage that sounds like it is playing from the location of video content 304 in FIG. 3J.

It should be understood that the presentation of spatial audio 312*g* associated with the video content 304 presented in the picture-in-picture element shown in FIG. 3K is not limited to situations in which the first electronic device 301 presents the picture-in-picture element in response to detecting movement of the first electronic device 301 and/or the user, such as in FIG. 3J. For example, the first electronic device 301 presents the picture-in-picture element in response to detecting one or more inputs at the first electronic device 301 and/or in response to receiving an indication of one or more inputs detected at the second electronic device 306. For example, the first electronic device 301 presents the spatial audio transition effects described with reference to FIGS. 3J-3K in response to presenting the picture-in-picture element in response to the second electronic device 306 detecting the inputs described above with respect to FIG. 3D.

FIGS. 4A-4I illustrate a computing system modifying the display of virtual content on a first electronic device in response to one or more user inputs detected at a second electronic device according to some examples of the disclosure. In some examples, the computing system includes a first electronic device 401 (e.g., having one or more characteristics of electronic device 101, 201, and/or 301 described above) and a second electronic device 406 (e.g., having one or more characteristics of electronic device 160, 260, and/or 306 described above). In some examples, first electronic device 401 is in communication with second electronic device 406 (e.g., second electronic device 406 is an auxiliary and/or companion device in communication with first electronic device 401).

In some examples, first electronic device 401 includes a display 420 having one or more characteristics of display 320 shown and described with reference to FIGS. 3A-3K. In some examples, first electronic device 401 includes image sensor(s) 414*a*-414*c* having one or more characteristics image sensors 314*a* to 314*c* shown and described with reference to FIGS. 3A-3K. First electronic device 401 optionally does not include image sensors 414*a* to 414*c*. In some examples, second electronic device 406 includes a display 408 having one or more characteristics of display 308 shown and described with reference to FIGS. 3A-3K (e.g., display 408 is a touch-sensitive display).

In FIGS. 4A-4I, an environment 400 is visible via display 420. In some examples, environment 400 is a three-dimensional environment having one or more characteristics of environment 300 shown and described with reference to FIGS. 3A-3K.

Figure 4A:
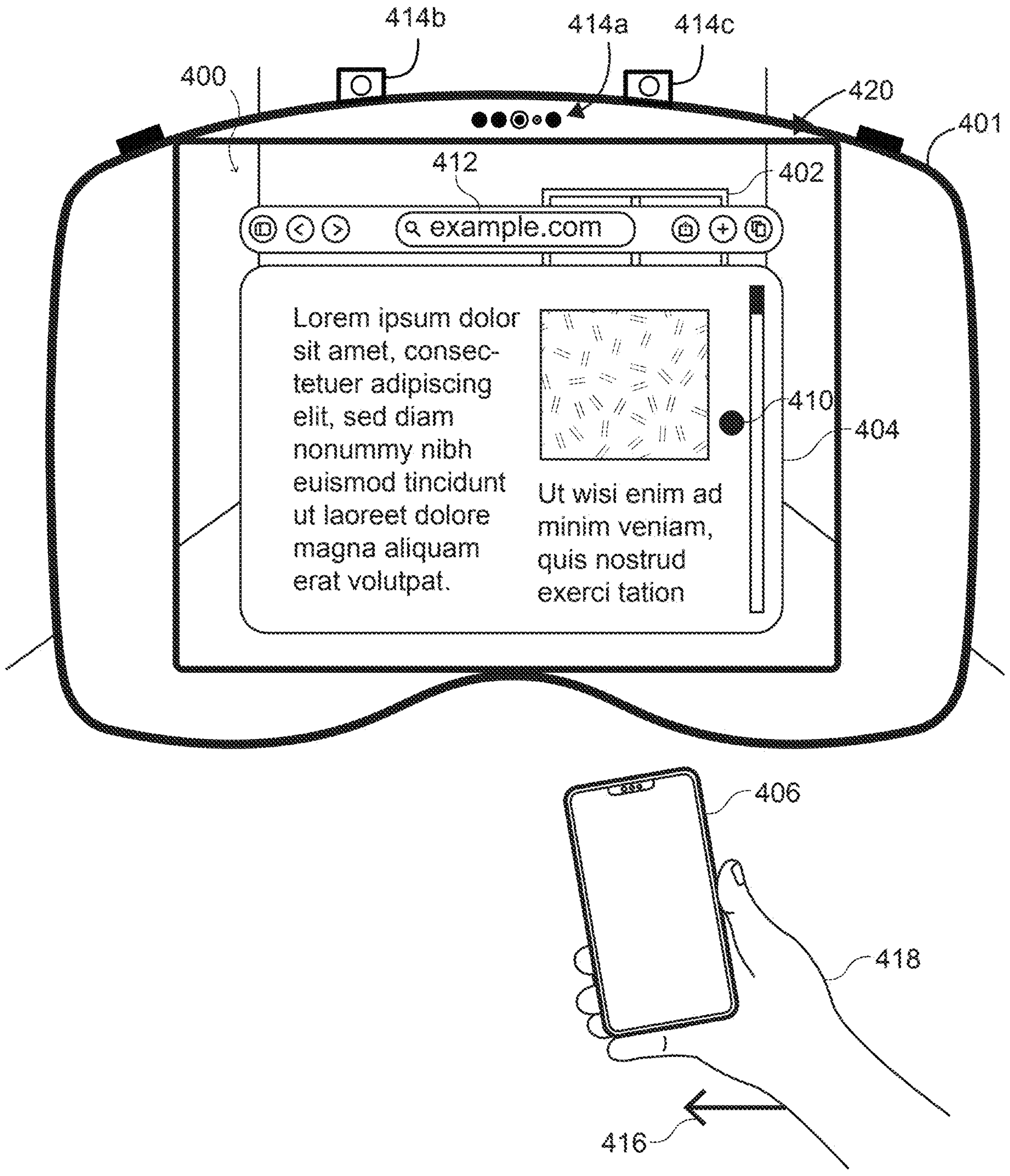
FIGS. 4A-4I illustrate a computing system modifying the display of virtual content on a first electronic device in response to one or more user inputs detected at a second electronic device according to some examples of the disclosure.

FIG. 4A illustrates first electronic device 401 presenting application content 404 in environment 400. In some examples, application content 404 corresponds to website content that is presented within a virtual window and/or virtual object in environment 400. In some examples, application content 404 is associated with a respective application that is accessible via the computing system, such as an internet browsing application. Alternatively, in some examples, the respective application is another type of application, such as a video streaming application, social media application, messaging application, video and/or audio telephonic application, or a video gaming application. As shown in FIG. 4A, application content 404 is presented with an address bar 412. Address bar 412 is optionally displayed within the same virtual object and/or virtual window in environment 400 as application content 404.

In FIG. 4A, first electronic device 401 presents a cursor 410 (a virtual cursor) in environment 400 overlaid on application content 404. As shown in FIG. 4A, cursor 410 is presented as a circle (e.g., with shading). Alternatively, in some examples, cursor 410 includes a different shape and/or appearance (e.g., cursor 410 is presented as an arrow, and/or cursor 410 is presented without shading and/or with a different color).

In some examples, a location of cursor 410 in environment 400 corresponds to a location and/or orientation of second electronic device 406. The computing system optionally uses one or more input devices of second electronic device 406 to determine the presentation location of cursor 410 on first electronic device 401, such as location sensor(s) 204B, image sensor(s) 206B, and/or orientation sensor(s) 210B described with reference to FIG. 2B. For example, in response to detecting movement of second electronic device 406 (e.g., caused by movement of a hand of a user that is holding second electronic device 406) using the one or more input devices, the computing system optionally moves cursor 410 in environment 400 in accordance with the movement of second electronic device 406 (e.g., a user holding second electronic device 406 controls movement of cursor 410 in environment 400 through movement of second electronic device 406). For example, the computing system permits multi-dimensional movement of cursor 410 in environment 400 (e.g., the computing system moves cursor 410 vertically in response to vertical movement of second electronic device 406 and/or horizontally in response to horizontal movement of second electronic device 406). In some examples, the location of cursor 410 in environment 400 is limited to a region defined by application content 404. For example, the computing system presents cursor 410 within the virtual window and/or virtual object in environment 400 that includes application content 404. For example, the computing system permits movement of cursor 410 in two dimensions (e.g., the computing system presents cursor 410 at a depth in environment 400 corresponding to application content 404 and permits horizontal and vertical movement of cursor 410 within application content 404).

The computing system optionally moves cursor 410 in environment 400 using the location and/or orientation of second electronic device 406 in accordance with a determination that one or more criteria are satisfied. In some examples, the one or more criteria include a criterion that is satisfied when movement of second electronic device 406 is detected while second electronic device 406 is held at a respective pose. Holding second electronic device 406 at the respective pose optionally includes holding second electronic device 406 such that a respective portion (e.g., a top portion, such as a top edge and/or surface) of second electronic device 406 is oriented in a direction toward (e.g., pointed toward) the location of application content 404 in environment 400. For example, first electronic device 401 presents cursor 410 as if cursor 410 is casted from the top portion of second electronic device 406 to application content 404 (e.g., cursor 410 is presented along a vector that extends from the top surface of second electronic device 406 to application content 404). In some examples, the one or more criteria include a criterion that is satisfied when second electronic device 406 is operated in a respective mode. For example, the computing system presents a selectable option (e.g., on first electronic device 401 and/or second electronic device 406) that is selectable to operate second electronic device 406 in a respective mode for controlling movement of cursor 410, and in response to detecting selection of the selectable option, the computing system permits cursor 410 to be controlled by the location and/or orientation of second electronic device 406. While operating second electronic device 406 in the respective mode, the computing system optionally presents (e.g., on first electronic device 401 and/or second electronic device 406) a selectable option to cease operating second electronic device 406 in the respective mode (e.g., and the computing system ceases to permit cursor 410 to be controlled by the location and/or orientation of second electronic device 406 in response to detecting selection of the selectable option).

In FIG. 4A, the computing system detects movement of second electronic device 406. For example, as shown in FIG. 4A, second electronic device 406 is held by a hand 440 of a user of the computing system, and the user moves hand 440 horizontally (e.g., leftward), as represented by arrow 416. The movement of second electronic device 406 optionally satisfies the one or more criteria described above (e.g., second electronic device 406 is held in the respective pose and/or second electronic device 406 is operated in the respective mode).

Figure 4B:
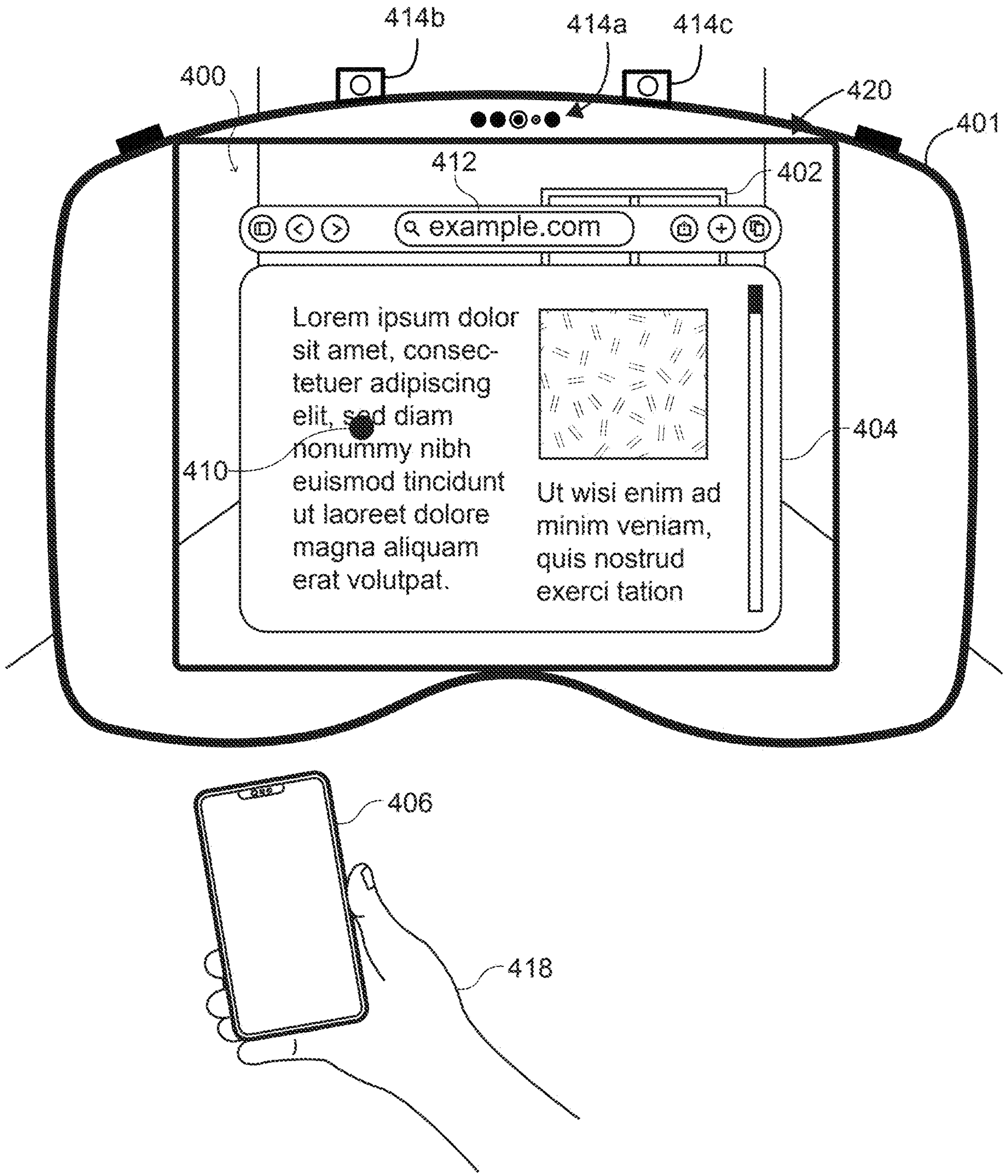

FIG. 4B illustrates the computing system moving cursor 410 in environment 400 in response to the movement of second electronic device 406 detected in FIG. 4A. As shown in FIG. 4B, first electronic device 401 presents cursor 410 at a different location in environment 400 (e.g., within application content 404) compared to as shown in FIG. 4A (e.g., more leftward from the viewpoint of a user of first electronic device 401 based on detected leftward movement of second electronic device 406). In some examples, first electronic device 401 maintains display of cursor 410 while moving cursor 410 in environment 400 (e.g., first electronic device 401 presents the movement of cursor 410 in environment 400 while the movement of second electronic device 406 is detected).

In some examples, while presenting application content 404 in environment 400, the computing system transfers application content from first electronic device 401 to second electronic device 406 in accordance with a determination that a touch gesture detected at second electronic device 406 satisfies one or more criteria (e.g., having one or more characteristics of the one or more criteria for transferring the presentation of video content 304 from first electronic device 301 to second electronic device 306 as described with reference to FIGS. 3A-3K). In some examples, the one or more criteria for transferring the presentation of content from first electronic device 401 to second electronic device 406 (e.g., or optionally from second electronic device 406 to first electronic device 401) are defined by a respective application that the content is associated with. For example, a touch gesture that is assigned to transferring the presentation of content associated with a video streaming application (e.g., video content 304 shown and described with reference to FIGS. 3A-3K) may be different from a touch gesture that is assigned to transferring the presentation of content associated with a web-browsing application (e.g., application content 404). Alternatively, for example, transferring the presentation of content associated with a video streaming application may require a respective touch gesture, and transferring the presentation of content associated with a web-browsing application may require a tap input corresponding to selection of a selectable option (e.g., presented on first electronic device 401 and/or second electronic device 406, such as selectable option 316 shown and described with reference to FIGS. 3B-3C). By establishing one or more criteria that require satisfaction for transferring the presentation of application content 404 from first electronic device 401 to second electronic device 406, the computing system ensures that the user intends to transfer application content 404 to second electronic device 406 prior to performing the transfer, which reduces errors in user interaction and conserves computing resources associated with correcting (e.g., through additional user inputs) the unintended transfer of application content 404.

Additionally, or alternatively, in some examples, a respective application, such as a respective application associated with application content 404, may assign a respective touch gesture (or a respective type of touch gesture, such as a vertical swiping gesture) to different operations. For example, a web-browsing application associated with application content 404 may assign a downward swiping gesture (e.g., the touch gesture shown and described with reference to FIG. 3A) to transferring the presentation of application content 404 from first electronic device 401 to second electronic device 406 when application content 404 is scrolled to the top of a web-page and to scrolling application content 404 upward when application content 404 is not scrolled to the top of the web-page (e.g., the computing system transfers application content 404 from first electronic device 401 to second electronic device 406 in response to a downward swipe gesture detected on second electronic device 406 in accordance with a determination that application content 404 was scrolled to the top of the web-page prior to the detection of the downward swipe gesture). It should be appreciated that alternatively, a downward swiping gesture may be assigned to scrolling application content 404 downward, and the computing system may transfer application content 404 from first electronic device 401 to second electronic device 406 when application content 404 is scrolled to the bottom of the web-page prior to the detection of the downward swipe gesture.

Alternatively, in some examples, application content 404 is not permitted to be transferred from first electronic device 401 to second electronic device 406. In some examples, a respective application may not permit content to be transferred from first electronic device 401 to second electronic device 406. For example, a video streaming application (e.g., associated with video content 304) may permit content to be transferred between first electronic device 401 and second electronic device 406, and a web-browsing application (e.g., associated with application content 404) may not permit content to be transferred between first electronic device 401 and second electronic device 406. In some examples, a respective application may only permit particular content to be transferred between first electronic device 401 and second electronic device 406. For example, a web-browsing application associated with application content 404 may not permit application content 404 to be transferred from first electronic device 401 to second electronic device 406 but may permit a virtual input device for interacting with application content 404 to be transferred from first electronic device 401 to second electronic device 406 (e.g., a virtual keyboard, such as virtual keyboard 422 shown and described with reference to FIGS. 4E-4I). Optionally, a virtual input device, such as virtual keyboard 422 described below, may be permitted to be transferred between first electronic device 401 and second electronic device 406 independent of a respective application that the content presented on first electronic device 401 and/or second electronic device 406 is associated with (e.g., the transferring of the virtual input device is a system-defined setting as opposed to an application-defined setting).

Figure 4C:
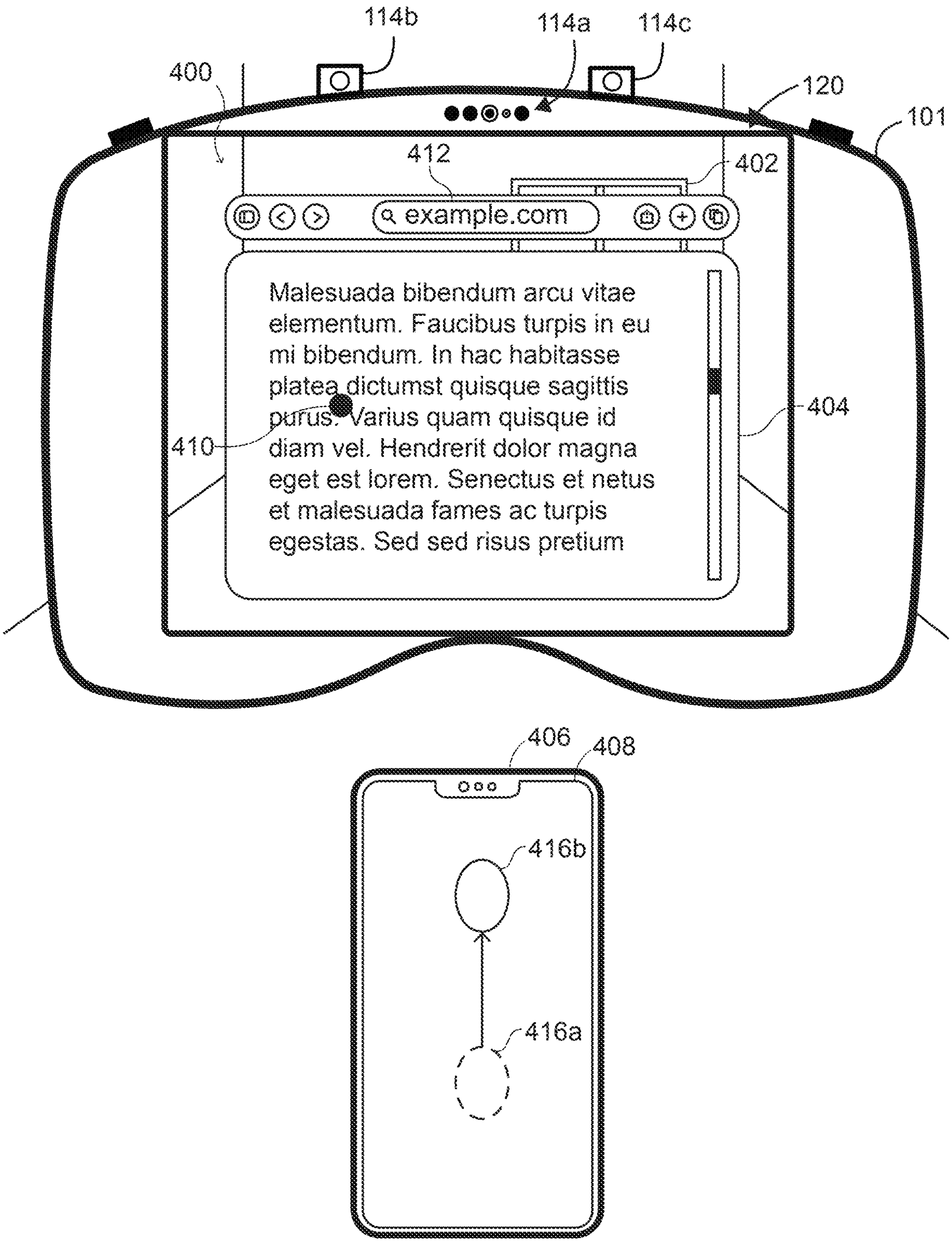

FIG. 4C illustrates the computing system scrolling application content 404 downward in response to detecting a touch gesture (represented by touch positions **416*a* to 416*b*). As shown in FIG. 4C, the touch gesture corresponds to an upward swipe gesture detected on second electronic device 406. The touch gesture shown in FIG. 4C optionally does not satisfy the one or more criteria for transferring the presentation of application content 404 from first electronic device 401 to second electronic device 406 described above. For example, the one or more criteria include a criterion that is satisfied when the computing system detects a downward swipe input optionally when application content 404 is scrolled to the top of a currently presented web-page (e.g., the computing system does not transfer application content 404 from first electronic device 401 to second electronic device 406 in FIG. 4C because the touch input corresponds to an upward swipe input as opposed to a downward swipe input). For example, the one or more criteria include a criterion that is satisfied when the computing system detects a vertical swiping input of a particular length and/or duration (e.g., the computing system does not transfer application content 404 from first electronic device 401 to second electronic device 406 in FIG. 4C because the upward swipe input from touch position 416*a* to touch position 416*b* does not include a length and/or duration that satisfies the criterion). Alternatively, or additionally, the computing system does not transfer application content 404 from first electronic device 401 to second electronic device 406 because a respective application (e.g., a web-browsing application) that application content 404 is associated with does not permit application content 404 to be transferred between first electronic device 401 and second electronic device 406**, as described above.

Figure 4D:
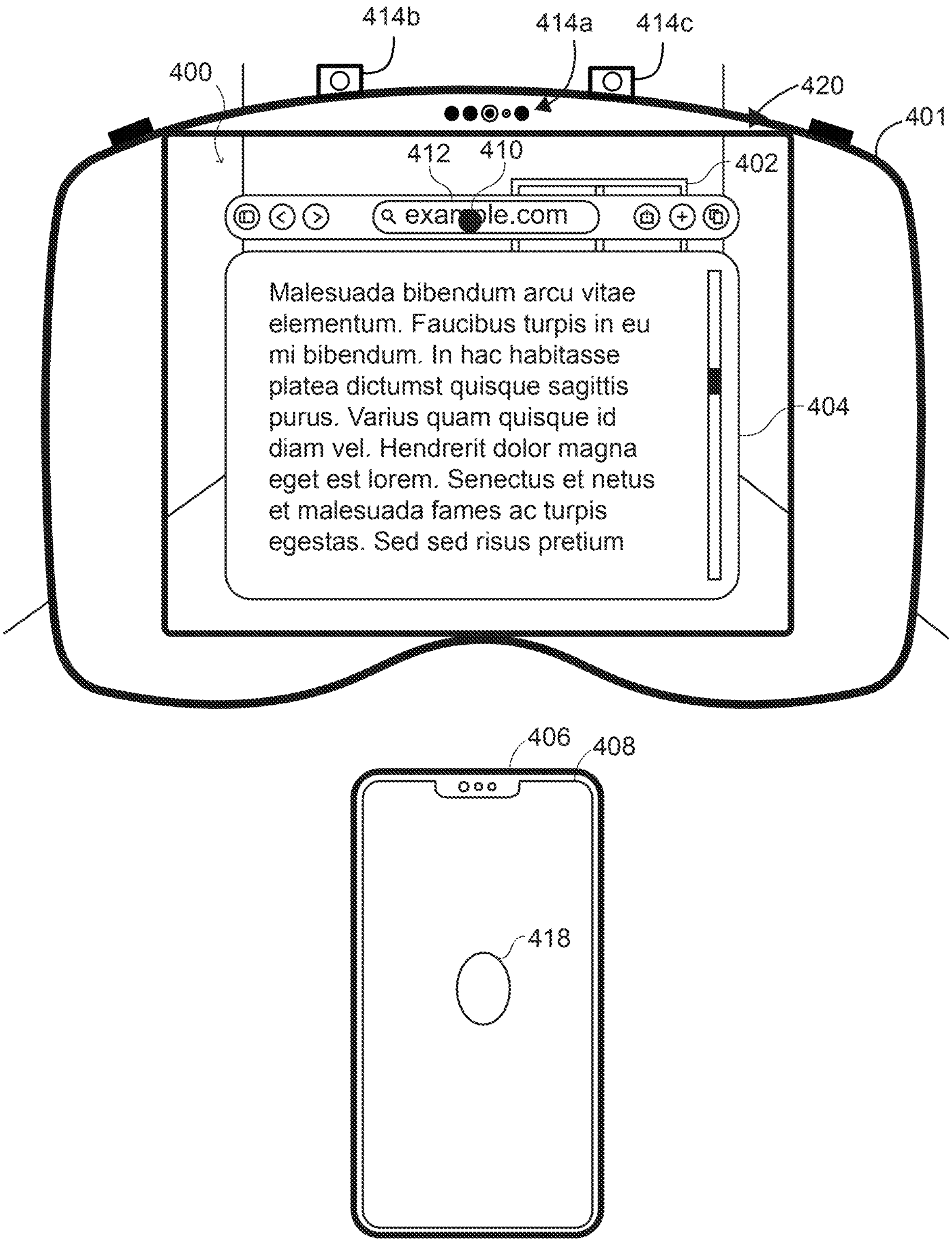

FIG. 4D illustrates the computing system detecting a touch input 418 corresponding to selection of address bar 412. For example, between FIG. 4C and FIG. 4D, the computing system moves cursor 410 from the location in environment 400 shown in FIG. 4C to the location corresponding to address bar 412 shown in FIG. 4D (e.g., based on movement of second electronic device 406 as shown and described with reference to FIGS. 4A-4B). For example, while cursor 410 is presented at the location in environment 400 corresponding to address bar 412, the computing system detects touch input 418 on second electronic device 406. In some examples, touch input 418 corresponds to a tap input, long-touch input (e.g., a touch input that exceeds a threshold duration (e.g., 0.1, 0.2, 0.5, 1, 2, 5, or 10 seconds)), or a multi-tap input (e.g., a double-tap or triple-tap touch input).

In some examples, address bar 412 corresponds to a virtual element that is selectable to input text. For example, after selecting address bar 412, a user of the computing system may input text (e.g., a web address) into address bar 412 using a virtual keyboard to navigate to a different website.

Figure 4E:
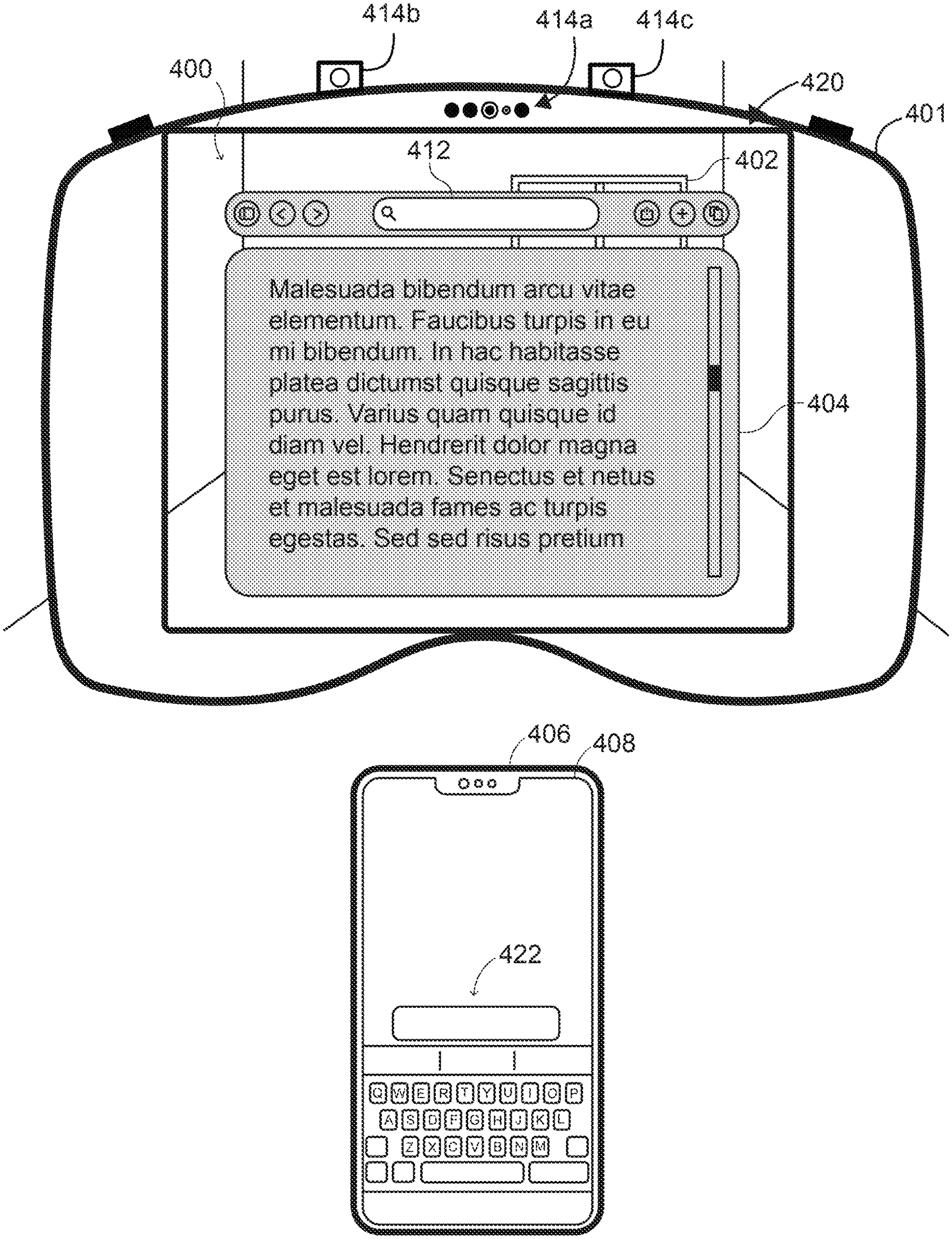

FIG. 4E illustrates the computing system selecting address bar 412 and presenting a virtual keyboard 422 on second electronic device 406 in response to detecting touch input 418 in FIG. 4D. As shown in FIG. 4E, the computing system automatically (e.g., without additional and/or subsequent user input) presents virtual keyboard 422 on second electronic device 406 in response to detecting touch input 418 (e.g., corresponding to the request to select address bar 412). Alternatively, in some examples, the computing system presents virtual keyboard 422 in environment 400 in response to detecting touch input 418 (e.g., and virtual keyboard 422 may be transferred to second electronic device 406 in response to detecting a touch input that satisfies one or more criteria for transferring the presentation of virtual keyboard 422 from first electronic device 401 to second electronic device 406, as described with reference to FIG. 4I).

As shown in FIG. 4E, the computing system changes one or more visual characteristics of application content 404 in environment 400 in response to the selection of address bar 412 (e.g., the change of the one or more visual characteristics of application content 404 is represented by a different shading of application content 404 in FIG. 4E compared to as shown in FIGS. 4A-4D). For example, the computing system modifies the color, saturation, brightness, sharpness, and/or opacity of application content 404 in response to the selection of address bar 412. The computing system optionally does not modify the visual appearance of address bar 412 when modifying the one or more visual characteristics of application content 404 (e.g., address bar 412 is presented with greater brightness than application content 404 (e.g., such that text entered into address bar 412 is visible to a user of first electronic device 401)). Alternatively, in some examples, the computing system maintains the visual appearance of application content 404 in environment 400 in response to the selection of address bar 412 (e.g., the computing system maintains presentation of application content 404 in environment 400 without changing the one or more visual characteristics of application content 404). Alternatively, in some examples, the computing system ceases to present application content 404 (and optionally address bar 412) in environment 400 in response to the selection of address bar 412 (e.g., to conserve computing resources by limiting the presentation of content in environment 400 when attention of the user of the computing system is likely to be directed to virtual keyboard 422 on second electronic device 406). Alternatively, or additionally, in some examples, the computing system transfers application content 404 from first electronic device 401 to second electronic device 406 in response to the selection of address bar 412 (e.g., second electronic device 406 presents application content 404 and/or address bar 412 in the region of display 408 that is above virtual keyboard 422).

Figure 4F:
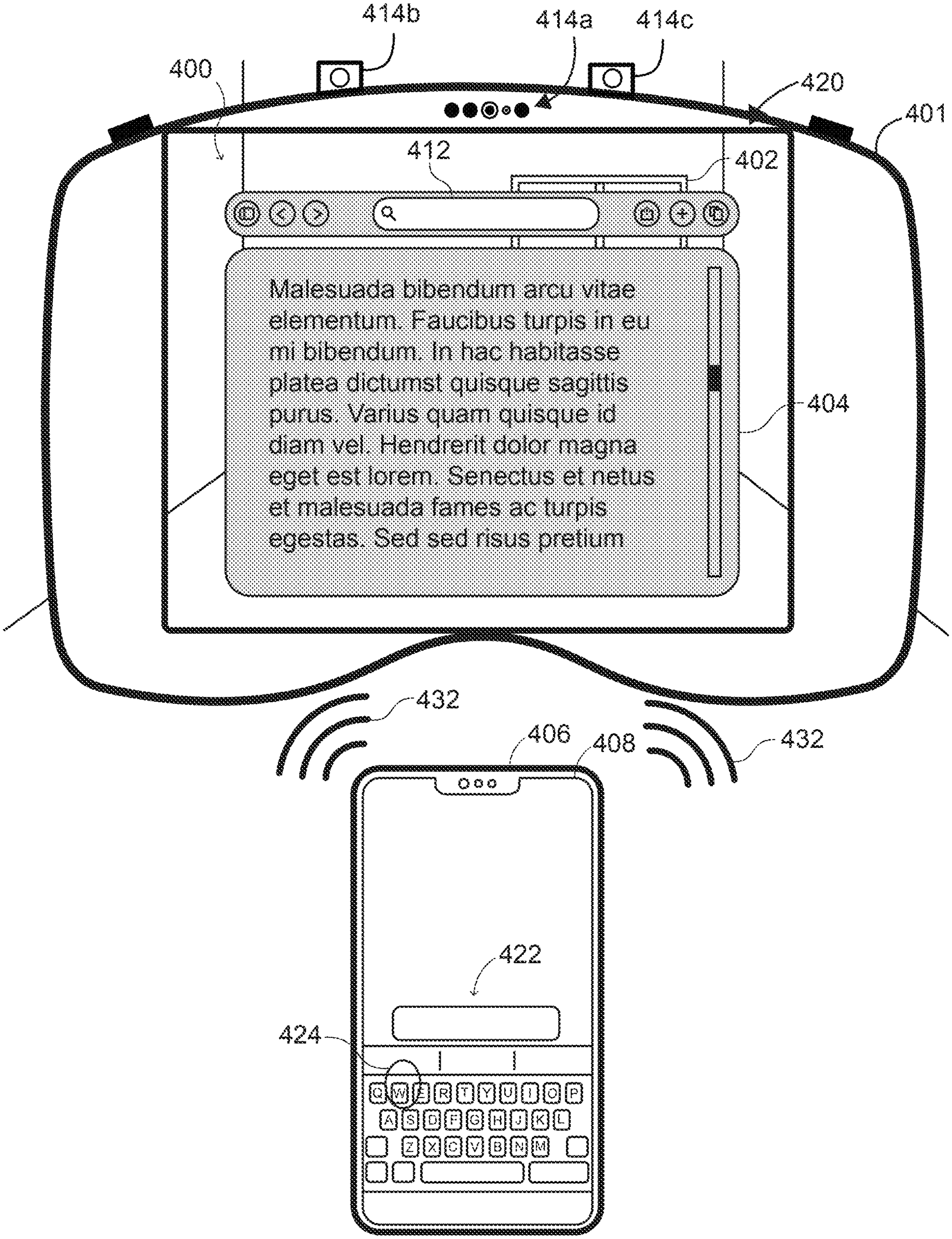

FIG. 4F illustrates the computing system detecting a touch input 424 on second electronic device 406 corresponding to selection of a key (e.g., the "W" key) of virtual keyboard 422. In some examples, interaction with virtual keyboard 422 on second electronic device 406 (e.g., through user input) controls text entry into address bar 412 in environment 400 on first electronic device 401. For example, touch input 424 corresponds to a request to enter a "W" character into address bar 412 in environment 400. In some examples, in response to detecting touch input 424 on second electronic device 406, the computing system causes audio and/or haptic feedback to be output via second electronic device 406. For example, as shown in FIG. 4F, second electronic device 406 outputs, via one or more audio output devices of second electronic device 406, an audio output (represented by sound waves 432) corresponding to a user interface sound effect (e.g., a sound effect associated with typing on virtual keyboard 422). Additionally, or alternatively, in some examples, the computing system causes audio feedback to be output via one or more audio output devices of first electronic device 301 in response to detecting selection of a key of virtual keyboard 422 while virtual keyboard 422 is presented on first electronic device 401 via display 420.

Figure 4G:
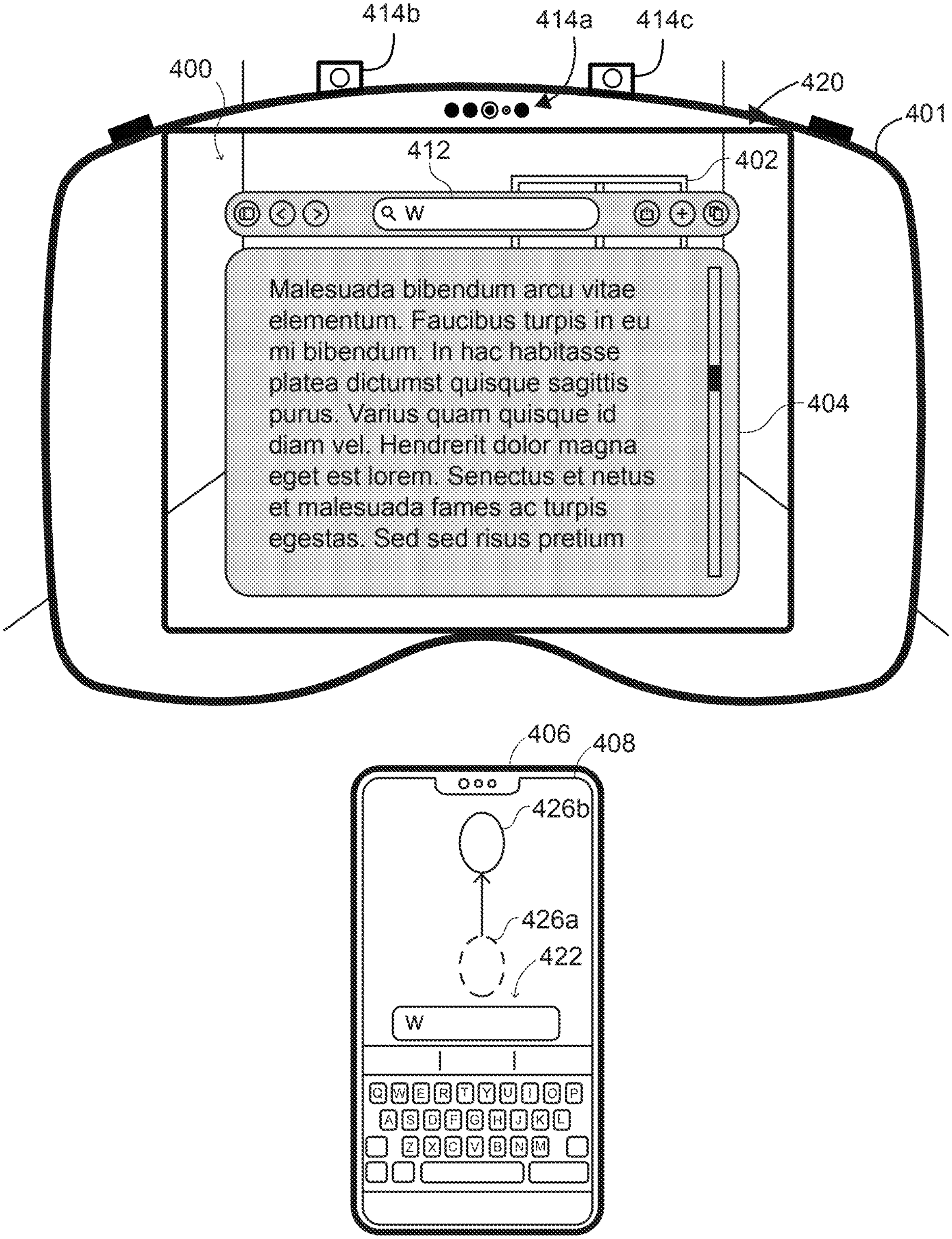

FIG. 4G illustrates the computing system entering text into address bar 412 in environment 400 in response to detecting touch input 424 in FIG. 4F. As shown in FIG. 4G, a "W" character is presented by first electronic device 401 within address bar 412 in environment 400.

In some examples, the computing system transfers virtual keyboard 422 from second electronic device 406 to first electronic device 401 in accordance with a determination that a touch input detected on second electronic device 406 satisfies one or more second criteria (e.g., optionally different from the one or more criteria for transferring the presentation of application content 404 from first electronic device 401 to second electronic device 406). For example, the one or more second criteria include a criterion that is satisfied when a touch gesture is detected on second electronic device 406 that corresponds to a respective type of touch gesture (e.g., an upward swipe). For example, the one or more second criteria include a criterion that is satisfied when a touch gesture is detected on second electronic device 406 in a respective region of display 408 (e.g., in the region of display 408 shown above virtual keyboard 422). In some examples, the one or more second criteria have one or more characteristics of the one or more criteria described above (e.g., including a criterion that is satisfied when the touch gesture includes a respective direction, duration, and/or length). Alternatively, the computing system transfers virtual keyboard 422 from second electronic device 406 to first electronic device 401 in accordance with a determination that an input detected at first electronic device 401 satisfies one or more second criteria (e.g., the input corresponds to an air gesture and/or selection of a selectable option presented in environment 400). By establishing one or more requirements that require satisfaction for transferring the presentation of virtual keyboard 422 from second electronic device 406 to first electronic device 401, the computing system ensures that the user intends to transfer virtual keyboard 422 to first electronic device 401 prior to performing the transfer, which reduces errors in user interaction and conserves computing resources associated with correcting (e.g., through additional user inputs) the unintended transfer of virtual keyboard 422.

As shown in FIG. 4G, the computing system detects a touch gesture (represented by touch positions 426*a* to 426*b*) on second electronic device 406. For example, the touch gesture is an upward swipe gesture detected in the region of display 408 above virtual keyboard 422. The touch gesture shown in FIG. 4G optionally satisfies the one or more second criteria for transferring the presentation of virtual keyboard 422 from second electronic device 406 to first electronic device 401. For example, the touch gesture shown in FIG. 4G corresponds to a request to transfer virtual keyboard 422 from second electronic device 406 to first electronic device 401. Alternatively, in some examples, second electronic device 406 presents a selectable option that is selectable to transfer virtual keyboard 422 from second electronic device 406 to first electronic device 401 (e.g., having one or more characteristics of selectable option 316 shown and described with reference to FIGS. 3B-3C). The selectable option is optionally included in virtual keyboard 422. For example, in response to detecting selection of the selectable option (e.g., a touch input directed to the selectable option), the computing system transfers virtual keyboard 422 from second electronic device 406 to first electronic device 401 (e.g., including one or more characteristics of the transfer of video content 304 shown and described with reference to FIGS. 3C-3D).

Figure 4H:
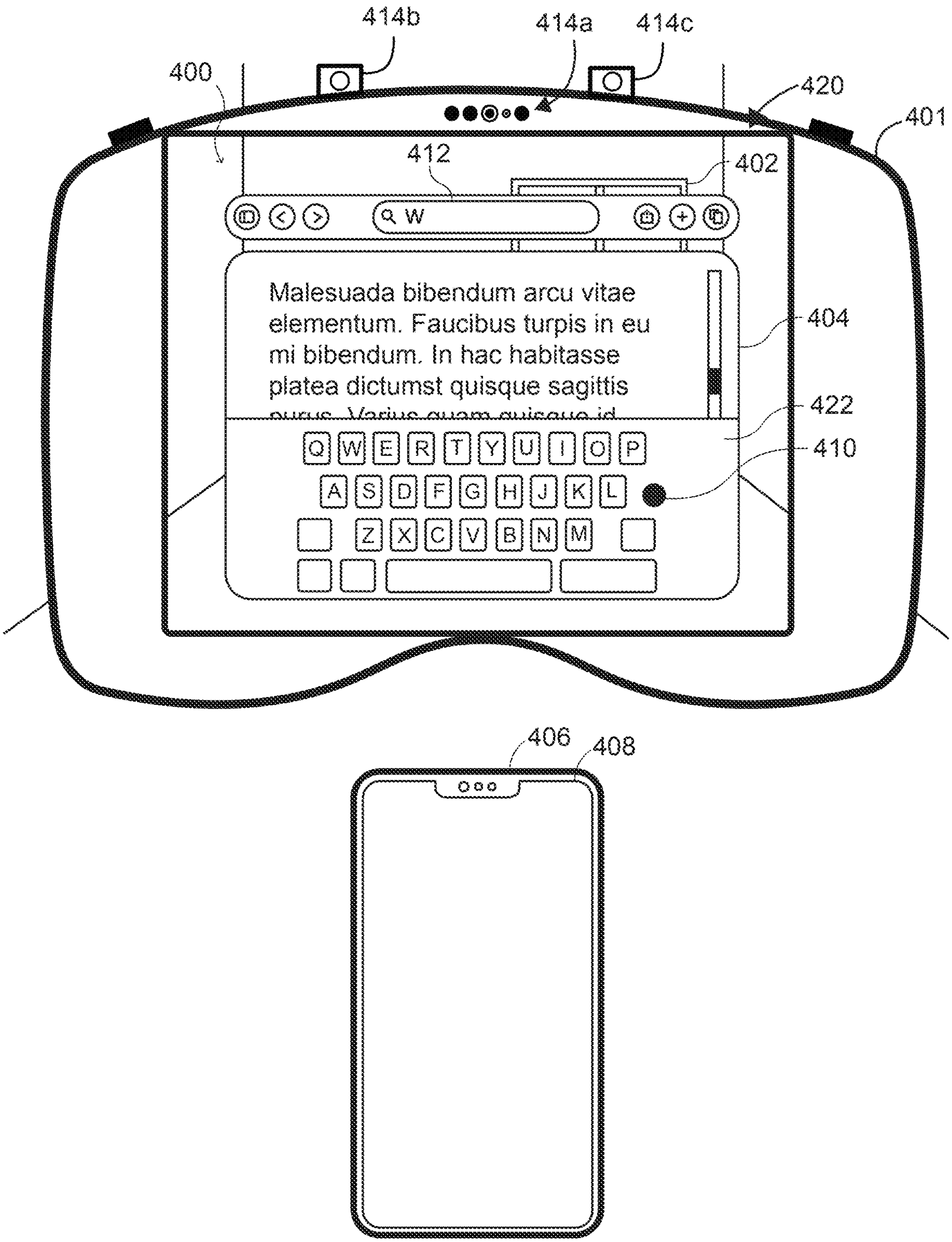

FIG. 4H illustrates first electronic device 401 presenting virtual keyboard 422 in environment 400 in response to the touch input detected in FIG. 4G. For example, the computing system transfers virtual keyboard 422 from second electronic device 406 to first electronic device 401 because the computing system determines that the touch input (represented by touch positions 426*a* to 426*b*) in FIG. 4G satisfies the one or more second criteria for transferring the presentation of virtual keyboard 422 from second electronic device 406 to first electronic device 401.

In some examples, while first electronic device 401 presents virtual keyboard 422 in environment 400, a user of the computing system may use second electronic device 406 to make keyboard inputs. For example, a location of cursor 410 may be controlled through movement of second electronic device 406 (e.g., as shown and described with reference to FIGS. 4A-4B), and a respective key of virtual keyboard 422 may be selected in response to a touch input (e.g., a tap input) that is detected on second electronic device 406 while the location of cursor 410 corresponds to the respective key (e.g., the computing system may enter a character corresponding to the respective key in address bar 412 in response to the touch input). Additionally, or alternatively, in some examples, virtual keyboard 422 may be used as a swipe keyboard using second electronic device 406. For example, the computing system activates a swipe keyboard mode in accordance with a determination that movement of second electronic device 406 is detected (e.g., that satisfies the one or more criteria for using the location and/or orientation of second electronic device 406 to move cursor 410 described above) while a contact is maintained on display 408. The computing system optionally exits the swipe keyboard mode in accordance with a determination that the contact on display 408 is terminated (e.g., and the computing system enters text (e.g., a word) in address bar 412 that corresponds to one or more locations of cursor 410 on virtual keyboard 422 detected during the swipe keyboard mode). Additionally, or alternatively, the computing system optionally enters the swipe keyboard mode in accordance with a determination that movement of second electronic device 406 exceeds a threshold amount (e.g., speed, distance, and/or duration of movement) and optionally exits the swipe keyboard mode in accordance with a determination that movement of second electronic device 406 does not exceed a threshold amount (e.g., within a predetermined period of time (e.g., 0.1, 0.2, 0.5, 1, 2, 5, or 10 seconds)).

Figure 4I:
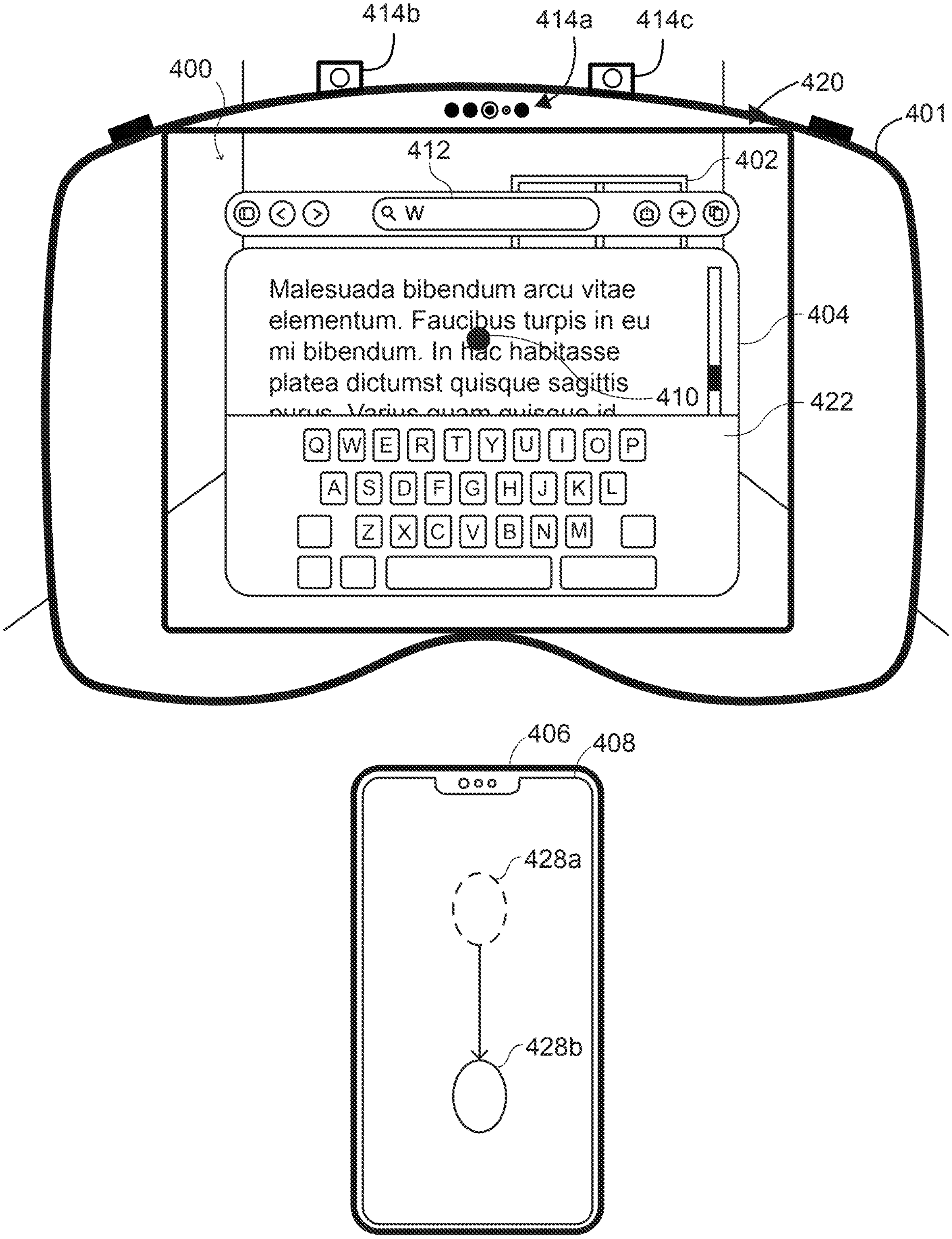

FIG. 4I illustrates the computing system detecting a touch input (represented by touch positions 428*a* to 428*b*) corresponding to a request to transfer virtual keyboard 422 from first electronic device 401 to second electronic device 406. In some examples, the computing system transfers virtual keyboard 422 from first electronic device 401 to second electronic device 406 in accordance with a determination that the touch input detected in FIG. 4I satisfies one or more criteria. For example, the one or more criteria for transferring the presentation of virtual keyboard 422 from first electronic device 401 to second electronic device 406 have one or more characteristics of the one or more criteria for transferring the presentation of video content 304 from first electronic device 301 to second electronic device 306 as described with reference to FIGS. 3A-3B. Optionally, the respective application (e.g., a web-browsing application) that application content 404 is associated with permits virtual keyboard 422 to be transferred between first electronic device 401 and second electronic device 406. Alternatively, or additionally, the computing system permits virtual keyboard 422 to be transferred between first electronic device 401 and second electronic device 406 independent of a respective application that application content 404 is associated with (e.g., the transferring the presentation of virtual keyboard 422 between first electronic device 401 and second electronic device 406 is a system-defined setting as opposed to an application-defined setting).

In some examples, the one or more criteria for transferring the presentation of virtual keyboard 422 from first electronic device 401 to second electronic device 406 includes a criterion that is satisfied when cursor 410 is presented outside of a region of environment 400 corresponding to virtual keyboard 422 when the touch input (e.g., the downward swipe input) is detected. For example, from FIG. 4H to FIG. 4I, the computing system moves cursor 410 from the location in environment 400 within virtual keyboard 422 shown in FIG. 4H to the location in environment 400 outside virtual keyboard 422 shown in FIG. 4I (e.g., based on movement of second electronic device 406 as shown and described with reference to FIGS. 4A-4B). For example, cursor 410 is presented at the location in environment 400 outside of virtual keyboard 422 when the touch input on display 408 shown in FIG. 4I is detected by the computing system.

In some examples, the computing system determines that the touch input detected on display 408 shown in FIG. 4I satisfies the one or more criteria for transferring the presentation of virtual keyboard 422 from first electronic device 401 to second electronic device 406. In some examples, in accordance with the determination that the touch input detected on display 408 in FIG. 4I satisfies the one or more criteria, the computing system transfers virtual keyboard 422 from first electronic device 401 to second electronic device 406, as is shown and described with reference to FIG. 4E.

FIGS. 5A-5D illustrate a computing system modifying the display of virtual content in response to one or more user inputs detected at one or more touch regions according to some examples of the disclosure. In some examples, the computing system includes a first electronic device 501

(e.g., having one or more characteristics of electronic device 101, 201, 301, and/or 401 described above) and a second electronic device 506 (e.g., having one or more characteristics of electronic device 160, 260, 306, and/or 406 described above). In some examples, first electronic device 501 is in communication with second electronic device 506 (e.g., second electronic device 506 is an auxiliary and/or companion device in communication with first electronic device 501).

In some examples, first electronic device 501 includes a display 520 having one or more characteristics of displays 320 and/or 420 described above. In some examples, first electronic device 501 includes image sensor(s) 514*a*-514*c* having one or more characteristics image sensors 314*a* to 314*c* and/or 414*a* to 414*c* described above. First electronic device 501 optionally does not include image sensors 514*a* to 514*c*. In some examples, second electronic device 506 includes a display 508 having one or more characteristics of display 308 and/or 408 described above (e.g., display 508 is a touch-sensitive display).

Figure 5A:
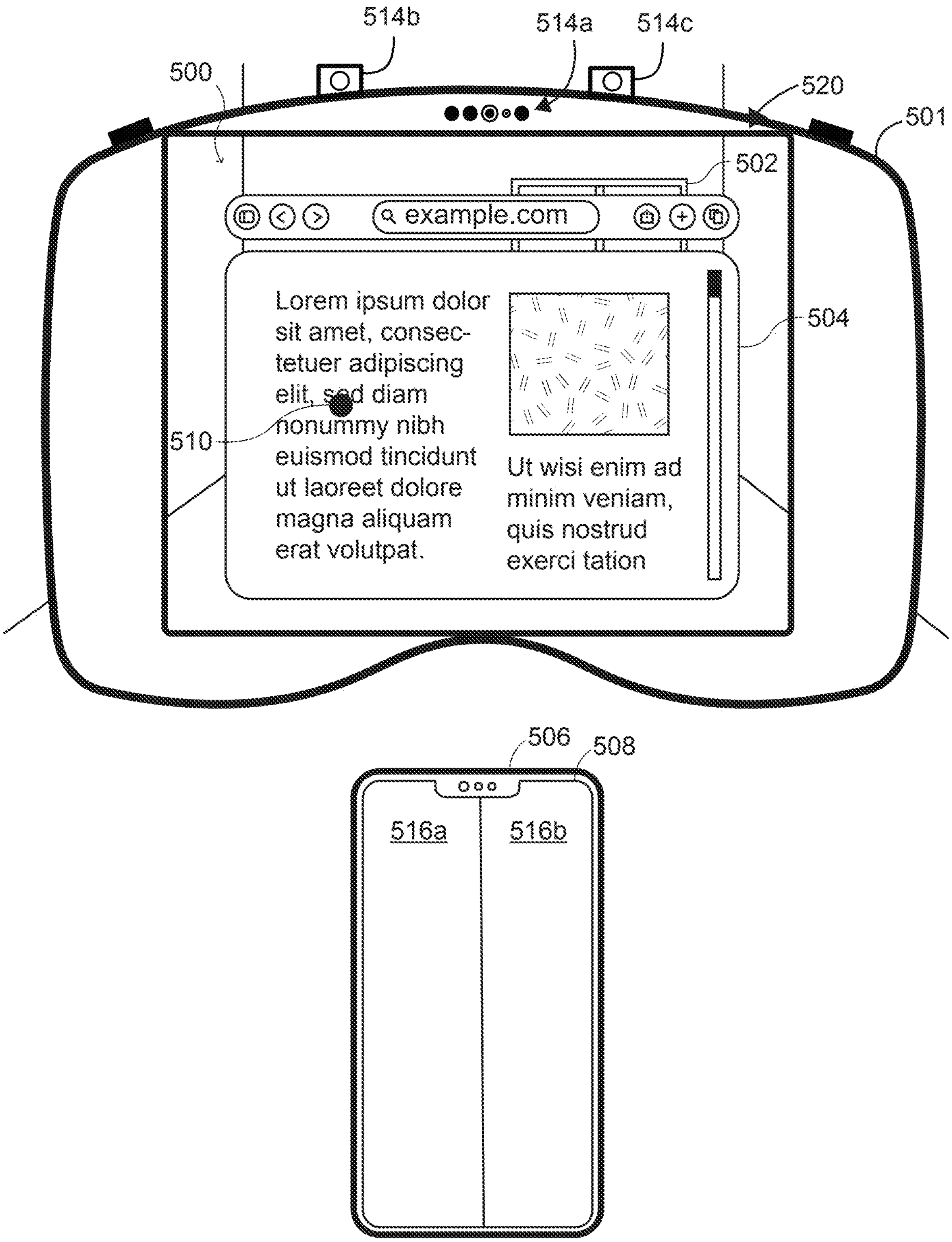
FIGS. 5A-5D illustrate a computing system modifying the display of virtual content response to one or more user inputs detected relative to one or more touch regions according to some examples of the disclosure.

FIG. 5A illustrates first electronic device 501 presenting virtual content in environment 500. In some examples, environment 500 has one or more characteristics of environments 300 and/or 400 described above. As shown in FIG. 5A, first electronic device 501 presents application content 504 and cursor 510 in environment 500. Application content 504 and cursor 510 optionally have one or more characteristics of application content 404 and cursor 410 shown and described with reference to FIGS. 4A-4I. Cursor 510 is optionally moveable in environment 500 based on movement of second electronic device 506 (e.g., as shown and described with reference to cursor 410 and second electronic device 406 in FIGS. 4A-4B).

In some examples, the computing system performs one or more operations in environment 500 in response to detecting touch inputs at one or more touch regions of second electronic device 506. For example, as shown in FIG. 5A, second electronic device 506 presents, using display 508, a first touch region 516*a* and a second touch region 516*b*. In some examples, in response to detecting a respective touch gesture on first touch region 516*a*, the computing system performs a first operation in environment 500, and in response to detecting the respective type of touch gesture on second touch region 516, the computing system performs a second operation, different from the first operation, in environment 500. Additionally, in some examples, the computing system performs different operations based on a respective type of touch gesture and the respective touch region the respective type of touch gesture is detected on. For example, the computing system performs a first operation in environment 500 in response to detecting a first type of touch gesture (e.g., a swipe gesture) on first touch region 516*a*, and performs a second operation, different from the first operation, in environment 500 in response to detecting a second type of touch gesture (e.g., a tap gesture) on first touch region 516*a*. Additionally, for example, the computing system performs a third operation in environment 500 in response to detecting a third type of touch gesture on second touch region 516*b*, and performs a fourth operation, different from the third operation, in environment 500 in response to detecting a fourth type of gesture on second touch region 516*b*. Examples of operations performed by the computing system optionally include user interface operations (e.g., scrolling, selecting a selectable option, moving a cursor, or moving a window), transferring the presentation of content between first electronic device 501 and second electronic device 506, and/or system operations (e.g., controlling volume, display brightness and/or display color). Assigning different operations to different touch regions and/or types of touch gestures ensures a user intends to perform a respective operation prior to performing the respective operation, which reduce errors in interaction and conserves computing resources associated with correcting errors.

Although a border is shown in FIGS. 5A-5D on display 508 between first touch region 516*a* and second touch region 516*b*, first touch region 516*a* and second touch region 516*b* are optionally distinguished in other manners. For example, second electronic device 506 presents first touch region 516*a* with one or more first visual characteristics (e.g., color, brightness, shading, and/or pattern) and presents second touch region 516*b* with one or more second visual characteristics different from the one or more first visual characteristics. Alternatively, or additionally, in some examples, second electronic device 506 operates in a power-saving state (e.g., as described above), and does not present first touch region 516*a* and/or second touch region 516*b* on display 508 (e.g., the computing system performs different operations based on whether a respective touch gesture is detected on a portion of display 508 corresponding to first touch region 516*a* or a portion of display 508 corresponding to second touch region 516*b* without displaying content on display 508).

Although FIGS. 5A-5D illustrate display 508 with two touch regions (first touch region 516*a* and second touch region 516*b*), it should be appreciated that display 508 may include a different number of touch regions (e.g., 1, 3, 4, 5, or 10 touch regions). For example, the computing system may perform different operations in environment 500 based on which respective touch region of display 508 a touch input is detected on (e.g., and optionally based on the respective type of touch gesture that is detected).

Figure 5B:
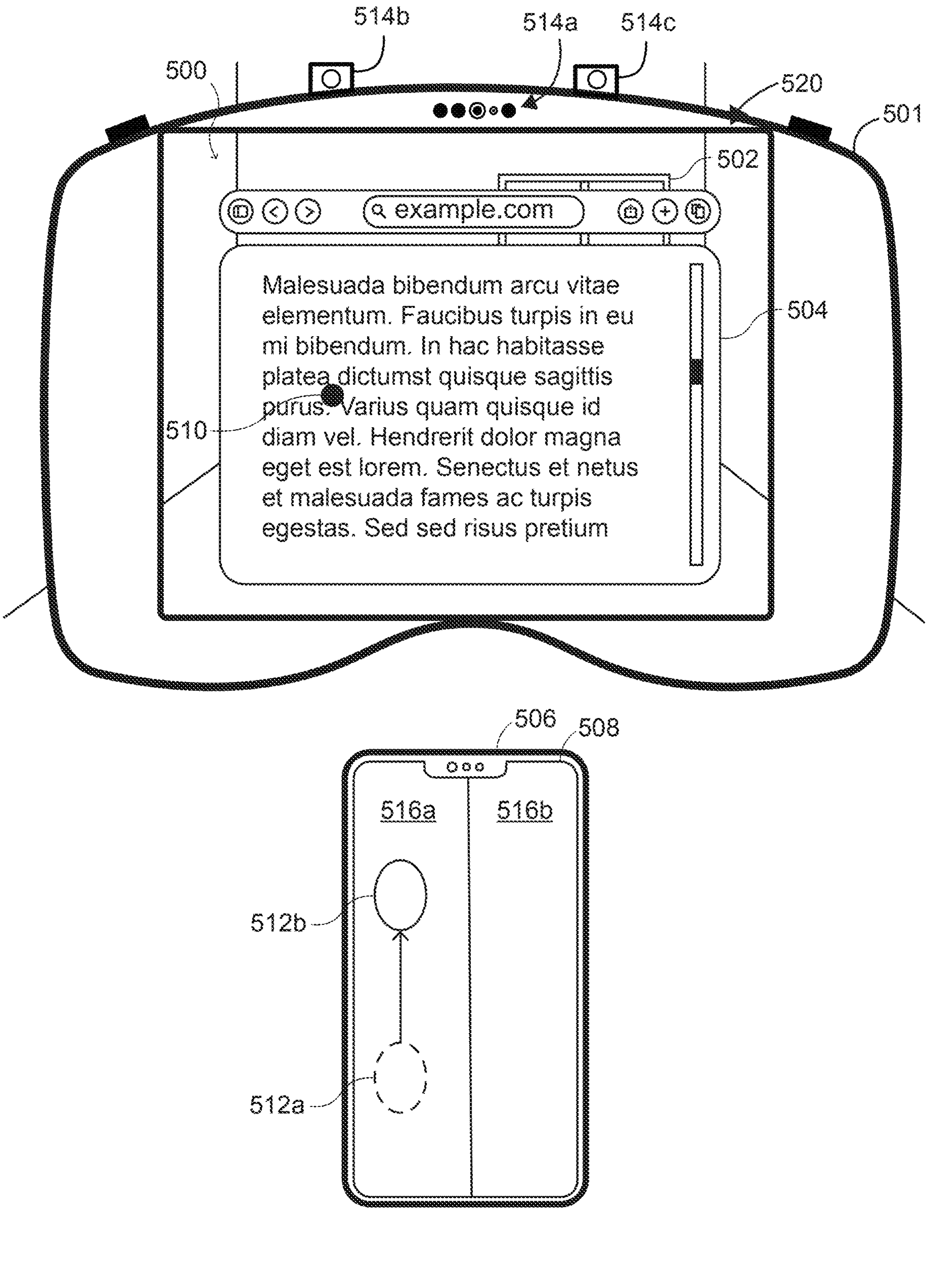

FIG. 5B illustrates a touch gesture (represented by touch positions 512*a* to 512*b*) detected on first touch region 516*a*. In some examples, the touch gesture shown in FIG. 5B corresponds to an upward swipe gesture. In some examples, vertical swipe gestures (e.g., upward or downward) performed on first touch region 516*a* are assigned to scrolling application content 504 (e.g., as defined by a respective application associated with application content 504, by the computing system (e.g., in one or more system settings), and/or by the user of the computing system (e.g., in one or more user settings (e.g., associated with a user profile))). As shown in FIG. 5B, in response to detecting the touch gesture, the computing system scrolls application content 504 downward (e.g., compared to as shown in FIG. 5A). The computing system optionally performs a different type of operation in response to detecting a touch gesture on first touch region 516*a* different from the touch gesture shown in FIG. 5B. For example, in response to detecting a tap gesture on first touch region 516*a*, the computing system performs a user interface operation (e.g., within application content 504) corresponding to selection of a selectable option (e.g., in accordance with a location of cursor 510 corresponding to the selectable option)).

Figure 5C:
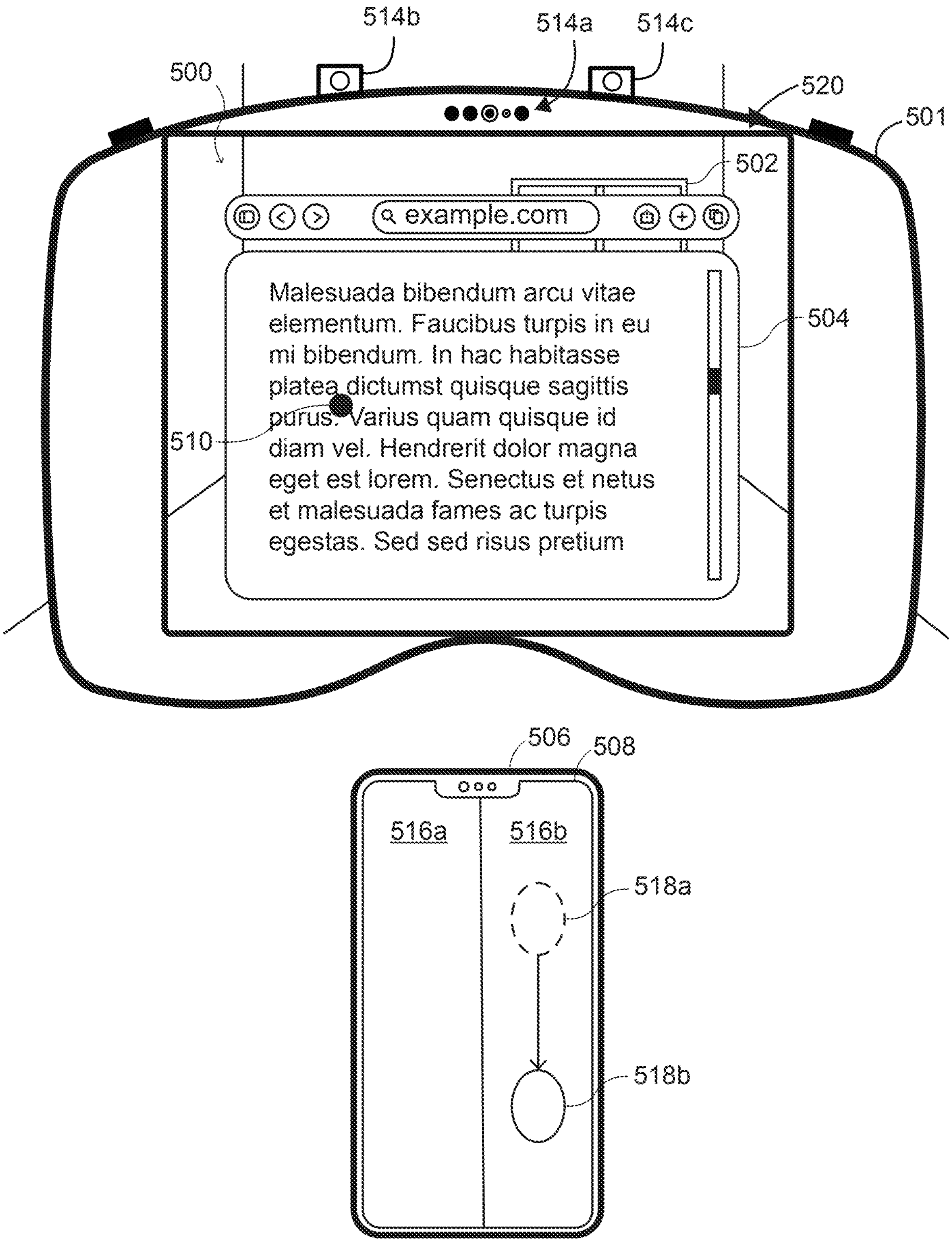

FIG. 5C illustrates a touch gesture (represented by touch position 512*a* to 512*b*) detected on second touch region 516*b*. In some examples, the touch gesture shown in FIG. 5B corresponds to a downward swipe gesture. In some examples, a downward swipe gesture performed on second touch region 516*b* is assigned to transferring the presentation of application content 504 from first electronic device 501 to second electronic device 506.

In some examples, the computing system transfers application content 504 from first electronic device 501 to second electronic device 506 in accordance with a determination that one or more criteria are satisfied (e.g., having one or more characteristics of the one or more criteria described above). In some examples, the one or more criteria for transferring the presentation of application content 504 from first electronic device 501 to second electronic device 506 includes a criterion that is satisfied when a respective type of touch gesture (e.g., a downward swipe as shown in FIG. 5C) is detected on second touch region 516*b* of display 508. The touch input shown in FIG. 5C optionally satisfies the one or more criteria for transferring the presentation of application content 504 from first electronic device 501 to second electronic device 506.

Figure 5D:
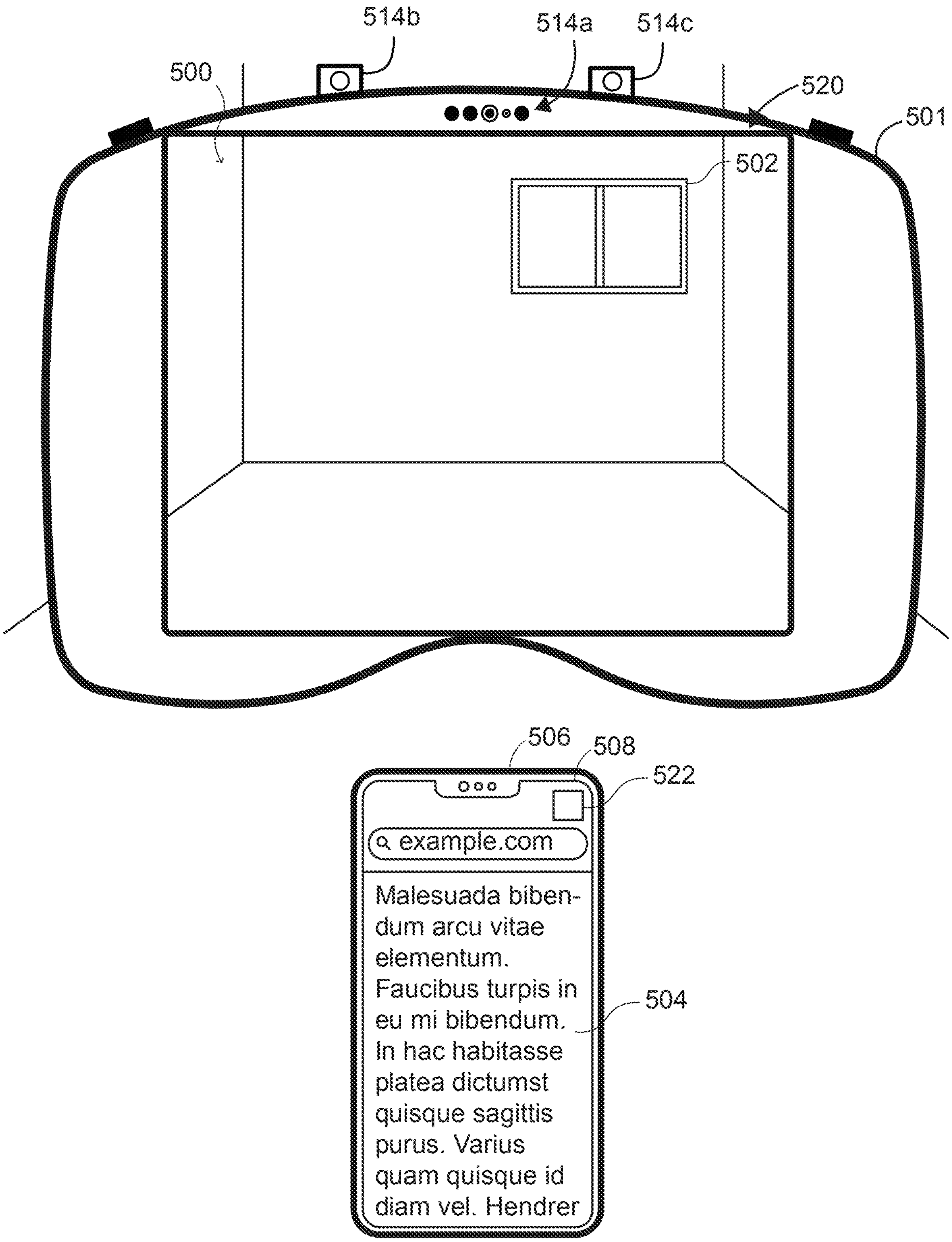

FIG. 5D illustrates the computing system transferring the presentation of application content 504 from first electronic device 501 to second electronic device 506 in response to the touch input shown in FIG. 5C (represented by touch position 512*a* to 512*b*). As shown in FIG. 5D, in response to detecting the touch input in FIG. 5C (e.g., and in accordance with a determination that the touch input satisfies the one or more criteria for transferring the presentation of application content 504 from first electronic device 501 to second electronic device 506), the computing system presents, using display 508, application content 504 on second electronic device 506.

As shown in FIG. 5D, second electronic device 506 presents, using display 508, a selectable option 522. Second electronic device 506 optionally includes selectable option 522 within application content 504 (e.g., the computing system adds selectable option 522 to application content 504 in accordance with a determination that application content 504 is being transferred from first electronic device 501 to second electronic device 506). In some examples, selectable option 522 is selectable to transfer application content 504 from second electronic device 506 to first electronic device 501. For example, selectable option 522 has one or more characteristics of selectable option 316 shown and described with reference to FIGS. 3B-3C. In some examples, in response to detecting selection of selectable option 316 (e.g., a touch input having one or more characteristics of touch input 322 shown and described with reference to FIG. 3C), the computing system transfers application content 504 from second electronic device 506 to first electronic device 501 (e.g., as shown and described with reference to video content 304 in FIG. 3D). Alternatively, or additionally, in some examples, the computing system transfers application content 504 from second electronic device 506 to first electronic device 501 in response to detecting a touch gesture that satisfies one or more second criteria for transferring the presentation of respective content from second electronic device 506 to first electronic device 501 (e.g., a touch gesture that includes a respective type of gesture (e.g., an upward swipe, such as the touch gesture shown and described with reference to FIG. 4G)).

FIGS. 6A-6D illustrate a computing system displaying video content in a three-dimensional environment according to some examples of the disclosure. In some examples, the computing system includes a first electronic device 601 (e.g., having one or more characteristics of electronic device 101, 201, 301, 401, and/or 501 described above) and a second electronic device 606 (e.g., having one or more characteristics of electronic device 160, 260, 306, 406, and/or 506 described above). In some examples, first electronic device 601 is in communication with second electronic device 606 (e.g., second electronic device 606 is an auxiliary and/or companion device in communication with first electronic device 601).

In some examples, first electronic device 601 includes a display 620 having one or more characteristics of displays 320, 420, and/or 520 described above. In some examples, first electronic device 601 includes image sensor(s) 614*a* to 614*c* having one or more characteristics of image sensors 314*a* to 314*c*, 414*a* to 414*c*, and/or 514*a* to 514*c* described above. First electronic device 601 optionally does not include image sensor(s) 614*a* to 614*c*. In some examples, second electronic device 606 includes a display 608 having one or more characteristics of display 308, 408, and/or 508 described above (e.g., display 608 is a touch-sensitive display).

In FIGS. 6A-6D, an environment 600 is visible via display 620. In some examples, environment 600 has one or more characteristics of environments 300, 400, and/or 500 described above. As shown in FIGS. 6A-6D, environment 600 includes real-world objects 602*a* to 602*c*. For example, real-world objects 602*a* to 602*e* are visible via display 620 through video passthrough or optical see-through.

Figure 6A:
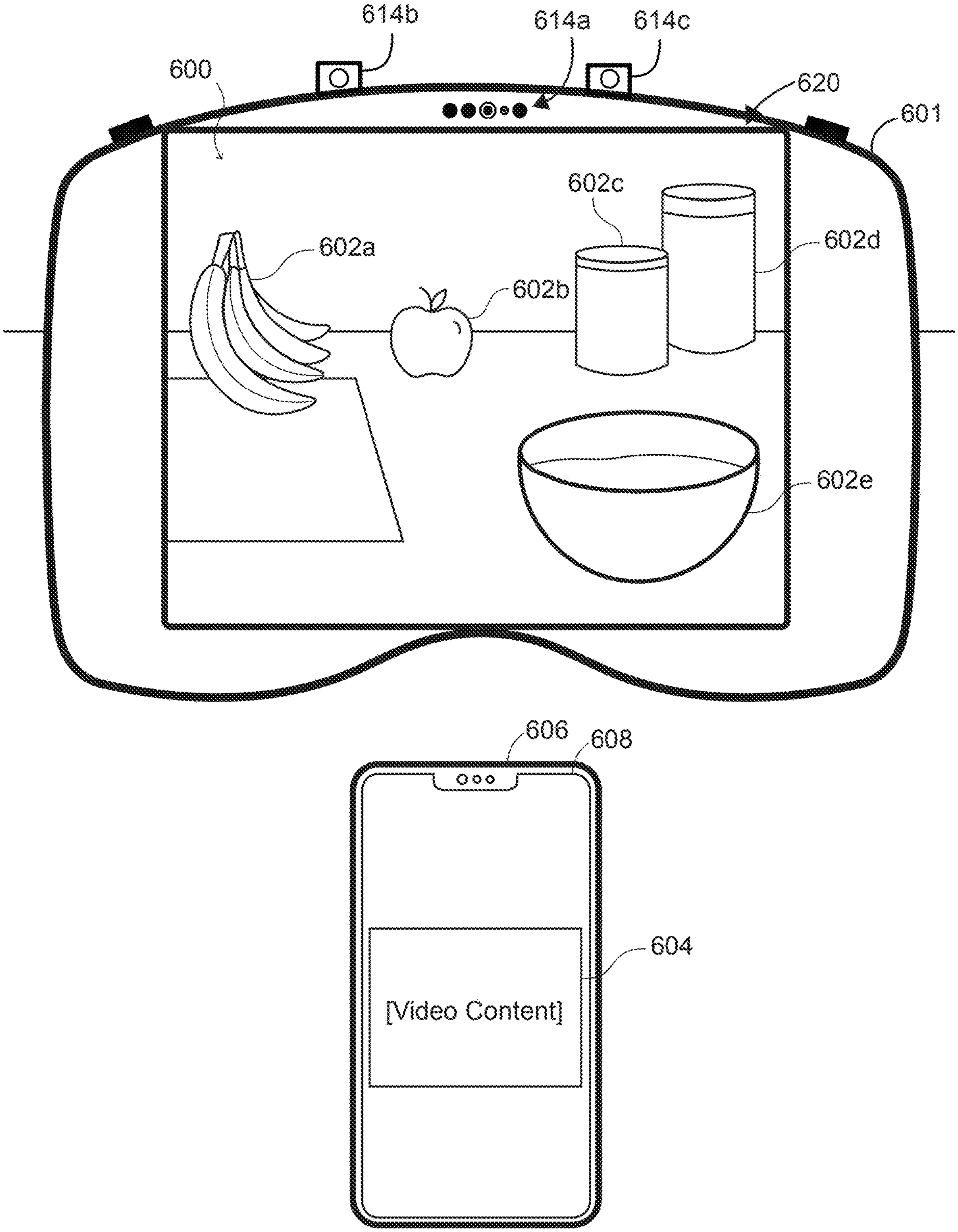
FIGS. 6A-6D illustrate a computing system displaying video content in a three-dimensional environment according to some examples of the disclosure.

FIG. 6A illustrates second electronic device 606 presenting, using display 608, video content 604. Video content 604 optionally has one or more characteristics of video content 304 shown and described with reference to FIGS. 3A-3K. In some examples, prior to presenting video content 604 on second electronic device 606, the computing system transferred video content 604 from first electronic device 601 to second electronic device 606 (e.g., in accordance with a determination that one or more criteria are satisfied for transferring the presentation of video content from first electronic device 601 to second electronic device 606, such as the one or more criteria described with reference to FIGS. 3A-3B).

In some examples, video content 604 corresponds to an instructional video (e.g., for cooking using one or more of real-world objects 602*a* to 602*e*). For example, while a user of the computing system is performing a physical (e.g., real-world) task that requires use of one or more of their hands, it may be difficult for the user to control playback of video content 604 on second electronic device 606. Accordingly, the user may desire to control playback of video content 604 through first electronic device 601 (e.g., such that playback of video content 604 may be controlled without the user's hands). Further, viewing video content 604 on second electronic device 606 may be inconvenient for the user while performing the physical task (e.g., as it would require the user to physically place second electronic device 606 in their field of view (e.g., on a physical stand and/or tilted against a physical object), thus occupying their physical cooking space). Accordingly, the user may desire to transfer the presentation of video content 604 from second electronic device 606 to first electronic device 601 to avoid placing second electronic device 606 withing their field of view, which improves user interaction with the computing system.

Figure 6B:
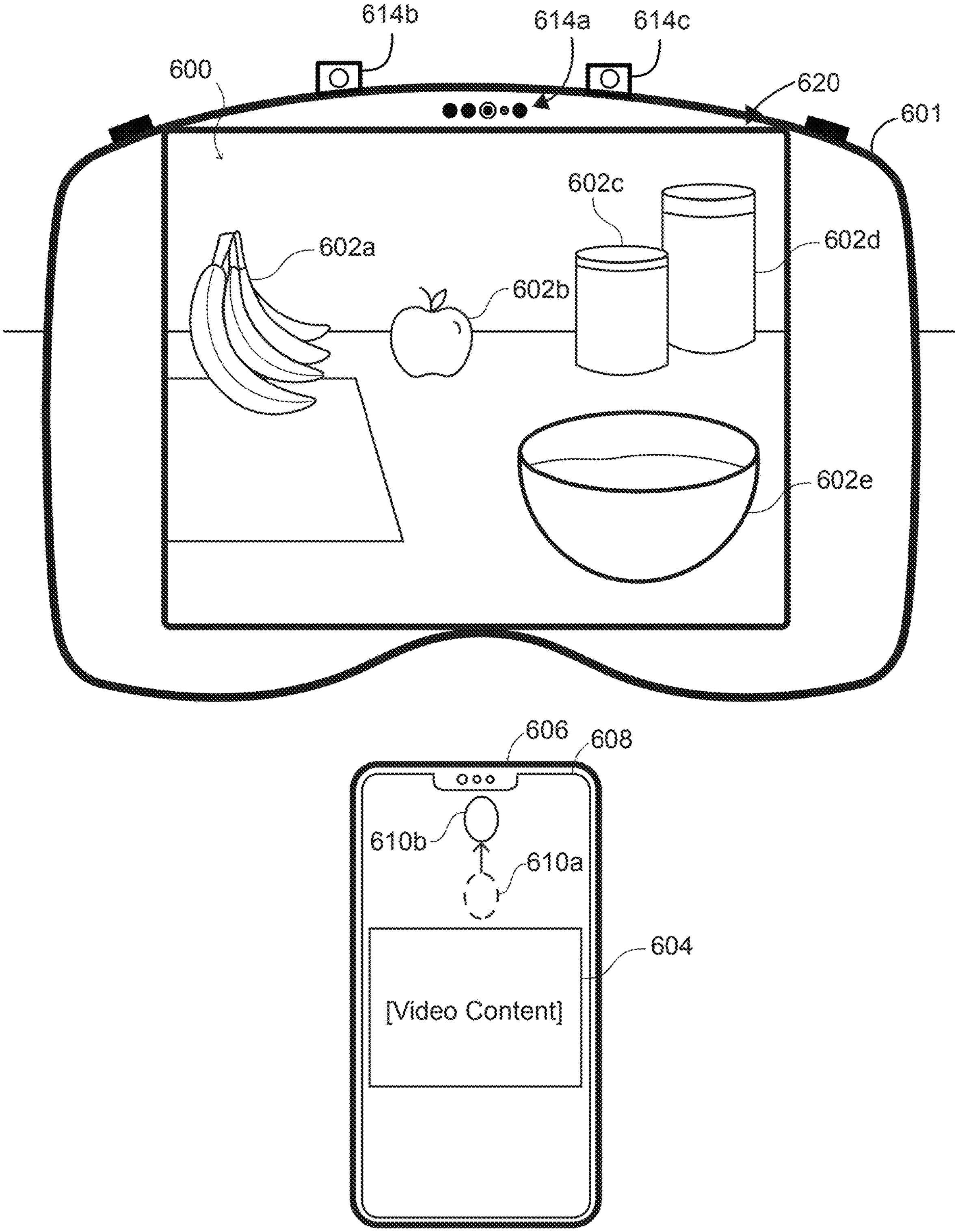

FIG. 6B illustrates the computing system detecting a touch input (represented by touch positions 610*a* to 610*b*) on second electronic device 606. In some examples, the touch input shown in FIG. 6B satisfies one or more second criteria for transferring the presentation of video content 604 from second electronic device 606 to first electronic device 601 (e.g., having one or more characteristics of the one or more second criteria described with reference to FIG. 4G). Alternatively, in some examples, second electronic device 606 presents a selectable option that is selectable to transfer video content 604 from second electronic device 606 to first electronic device 601 (e.g., having one or more characteristics of selectable option 316 shown and described with reference to FIGS. 3B-3C).

Figure 6C:
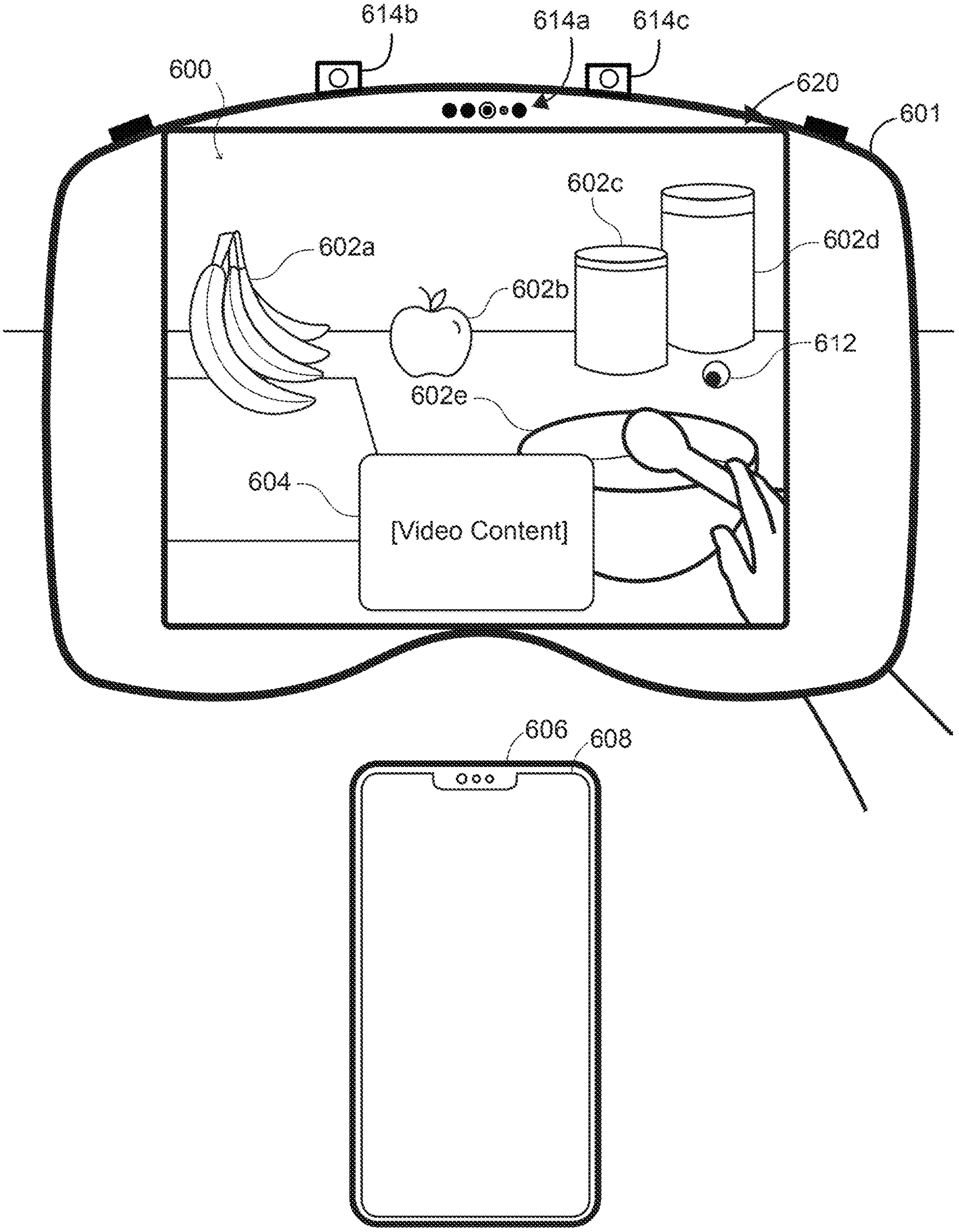

FIG. 6C illustrates the computing system transferring the presentation of video content 604 from second electronic device 606 to first electronic device 601 in response to the touch input detected in FIG. 6B (represented by touch position 610*a* to 610*b*). In some examples, transferring the presentation of video content 604 from second electronic device 606 to first electronic device 601 has one or more characteristics of transferring the presentation of video content 304 from second electronic device 306 to first electronic device 301 shown and described with reference to FIG. 3D. As shown in FIG. 6C, first electronic device 601 presents video content 604 in environment 600. In some examples, as shown in FIG. 6C, video content 604 is presented in a picture-in-picture presentation (e.g., as described with reference to FIG. 3E). For example, prior to the computing system presenting video content 604 on second electronic device 606, first electronic device 601 presented video content 604 in environment 600 in the picture-in-picture presentation shown in FIG. 6C (e.g., transferring the presentation of video content 604 from second electronic device 606 to first electronic device 601 includes presenting video content 604 in environment 600 at the same position first electronic device 601 presented video content 604 from prior to transferring the presentation of video content 604 to second electronic device 606). Alternatively, or additionally, in some examples, the computing system presents video content 604 in the picture-in-picture presentation based on one or more settings associated with presenting video content 604 in environment 600 (e.g., defined by an application video content 604 is associated with, by a user of the computing system (e.g., in a user profile), and/or by the computing system). For example, a user-defined setting (e.g., associated with an application and/or the computing system) includes a status that presents video content, such as video content 604, in environment 600 in a picture-in-picture presentation by default (e.g., such that the video content does not overly obstruct the view of the user (e.g., while performing physical tasks)). Alternatively, or additionally, in some examples, the computing system presents video content 604 in the picture-in-picture presentation in accordance with a determination that a touch input is detected on second electronic device 606 that satisfies one or more second criteria for modifying the presentation of video content 604 (e.g., as shown and described with reference to video content 304 in FIGS. 3D-3E).

In some examples, in FIG. 6C, first electronic device 601 detects, via one or more input devices (e.g., eye tracking sensor(s) 212 shown and described with reference to FIG. 2A), attention (e.g., gaze 612) of the user of the computing system. For example, first electronic device 601 detects gaze 612 directed to a location in environment 600 that does not correspond to video content 604 (e.g., the user of the computing system is currently looking at a location in environment 600 where a physical task (e.g., stirring ingredients in real-world object 602*c*) is being performed).

In some examples, in accordance with a determination that attention of the user of the computing system (e.g., the user wearing first electronic device 601) corresponds to a location of video content 604 in environment 600, first electronic device 601 presents, using display 620, one or more playback controls in environment 600 for controlling playback of video content 604 (e.g., as shown and described with reference to FIG. 6D). In some examples, in accordance with a determination that attention of the user of the computing system corresponds to a location different from the location of video content 604, first electronic device 601 forgoes presenting one or more playback controls in environment 600 for controlling playback of video content 604 (e.g., as shown in FIG. 6C). Presenting playback controls in environment 600 in response to detecting attention of the user of the computing system directed to a location of video content 604 limits the amount of user input required for controlling playback of video content 604 (e.g., by not requiring the user to perform inputs on second electronic device 606), which conserves computing resources and battery life of the computing system, and improves user device interaction (e.g., by not requiring the user to perform hand-based inputs while performing physical tasks that require hand use).

Figure 6D:
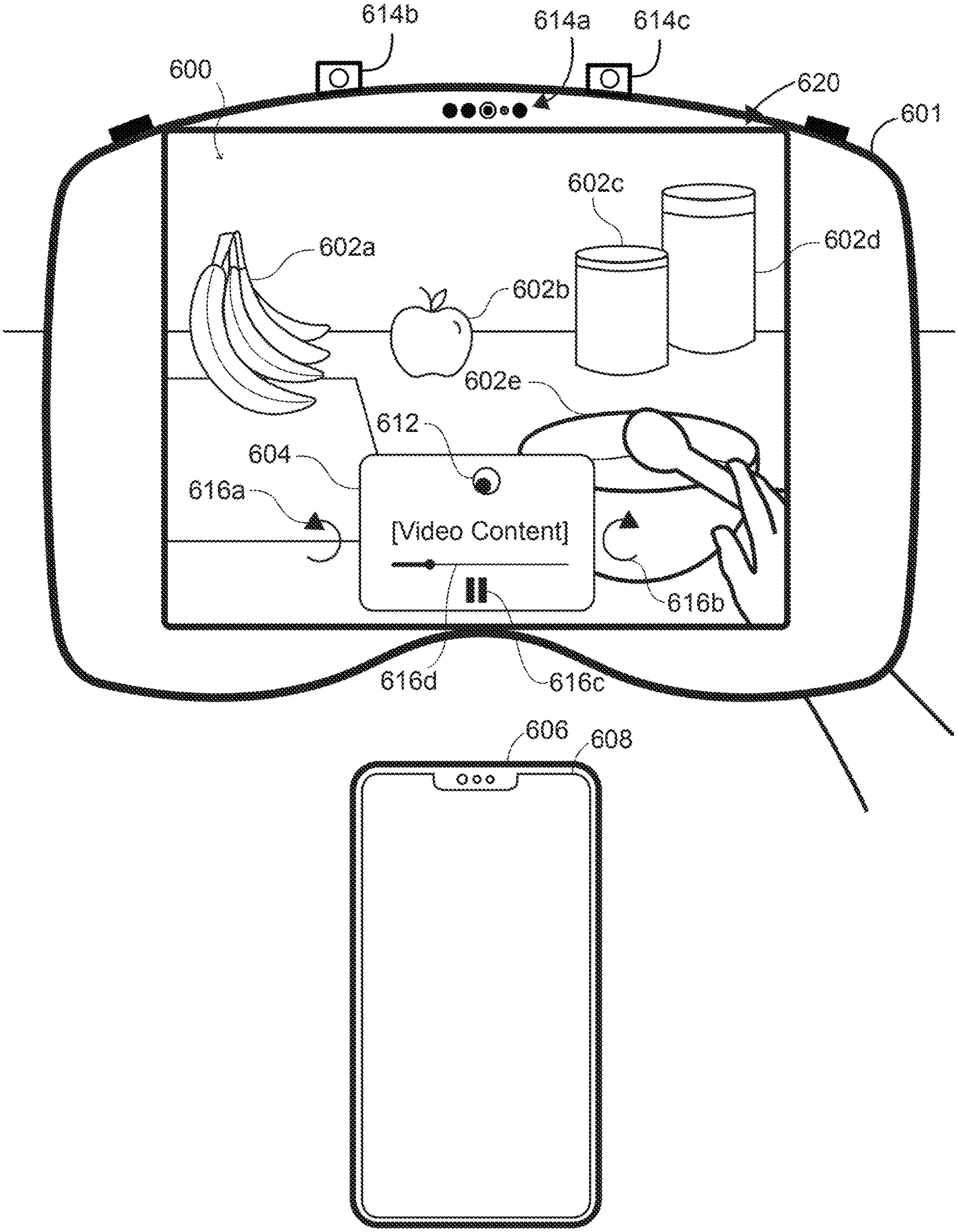

FIG. 6D illustrates first electronic device 601 presenting, using display 620, playback controls 616*a* to 616*d* in environment 600 in response to detecting gaze 612 directed toward a location corresponding to video content 604. As shown in FIG. 6D, the user of the computing system has moved their gaze 612 from the location in environment 600 that does not correspond to video content 604 (shown in FIG. 6C) to the location in environment 600 corresponding to video content 604. In response to detecting attention (e.g., gaze 612) of the user directed toward the location corresponding to video content 604, first electronic device 601 optionally presents one or more playback controls outside (e.g., and/or adjacent to) video content 604. For example, as shown in FIG. 6D, first electronic device 601 presents playback controls 616*a* and 616*b* (e.g., selectable to fast-forward and/or re-wind (e.g., scrub) video content 604 (e.g., optionally by a predetermined about of time (e.g., 1, 2, 5, 10, 15, 30, or 60 seconds)) adjacent to (e.g., on either side of) video content 604 (e.g., from the current viewpoint of the user of the computing system). Additionally, or alternatively, in response to detecting attention (e.g., gaze 612) of the user directed toward the location corresponding to video content 604, first electronic device 601 optionally presents one or more playback controls within video content 604. For example, as shown in FIG. 6D, first electronic device 601 presents pause affordance 616*c* and playback bar 616*d* within video content 604. In some examples, while presenting playback controls 616*a* to 616*d*, in response to detecting attention (e.g., gaze) of the user of the computing system directed to a location that does not correspond to video content 604, first electronic device 601 ceases to present playback controls 616*a* to 616*d* in environment 600.

In some examples, one or more of playback controls 616*a* to 616*d* are selectable through a user input that satisfies one or more criteria. For example, the one or more criteria include a criterion that is satisfied when attention (e.g., gaze 612) is directed toward a location of a respective playback control for at least a threshold amount of time (e.g., 0.1, 0.2, 0.5, 1, 2, 5, or 10 seconds). Additionally, or alternatively, for example, the one or more criteria include a criterion that is satisfied when a respective air gesture is detected (e.g., an air pinch or an air tap) (e.g., the respective air gesture is detected via hand tracking sensor(s) 202 and/or image sensor(s) 206A described above with reference to FIG. 2A). Additionally, or alternatively, for example, the one or more criteria include a criterion that is satisfied when a respective type of touch gesture is detected on display 608 (e.g., a tap input, multi-tap input, or a swipe input). In some examples, in response to detecting an input that satisfies the one or more criteria for selection of a respective playback control, first electronic device 601 (e.g., and/or the computing system) performs an operation corresponding to the respective playback control (e.g., in accordance with a determination that gaze 612 is directed to pause affordance 616*c* for more than the threshold amount of time, the computing system pauses playback of video content 604 in environment 600).

Figure 7A:
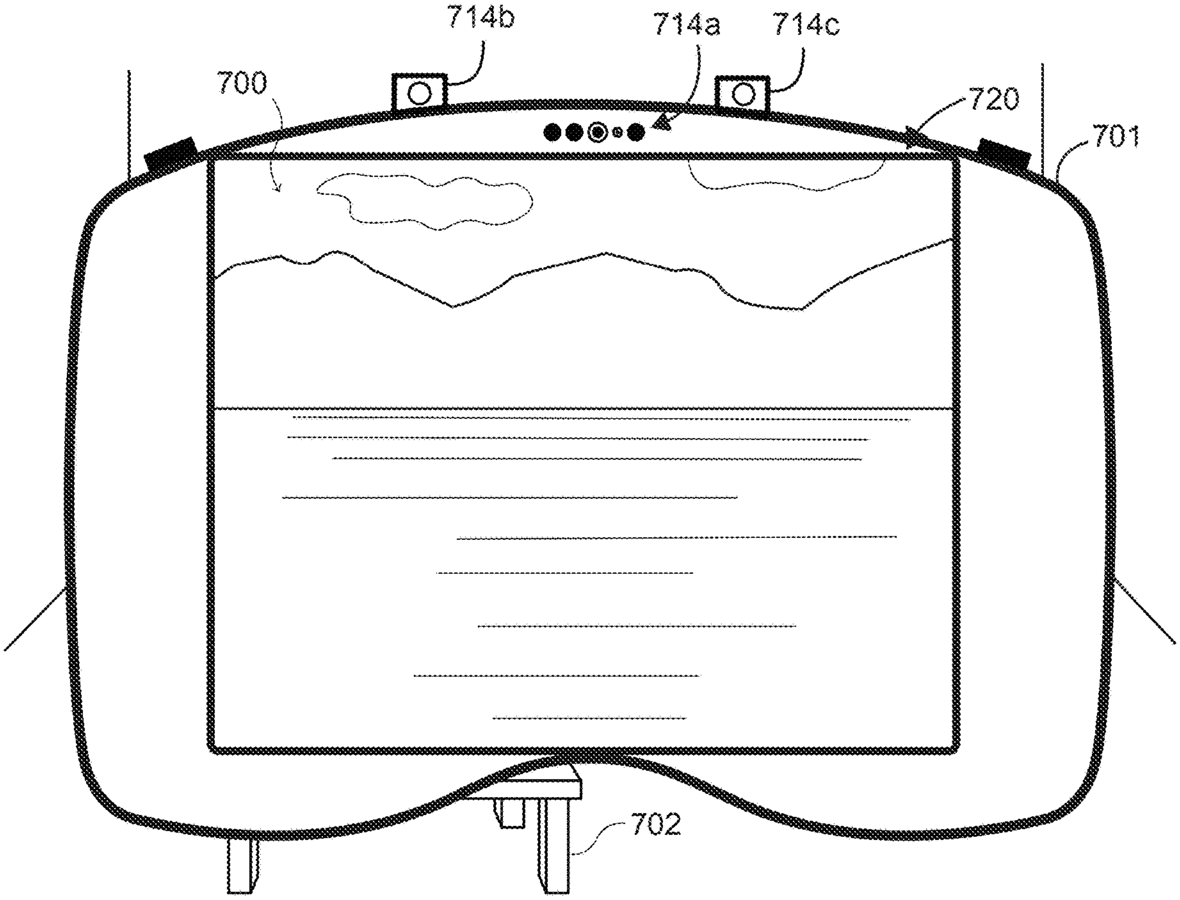
FIGS. 7A-7C illustrate a computing system displaying a notification in a three-dimensional environment according to some examples of the disclosure.
Figure 7B:
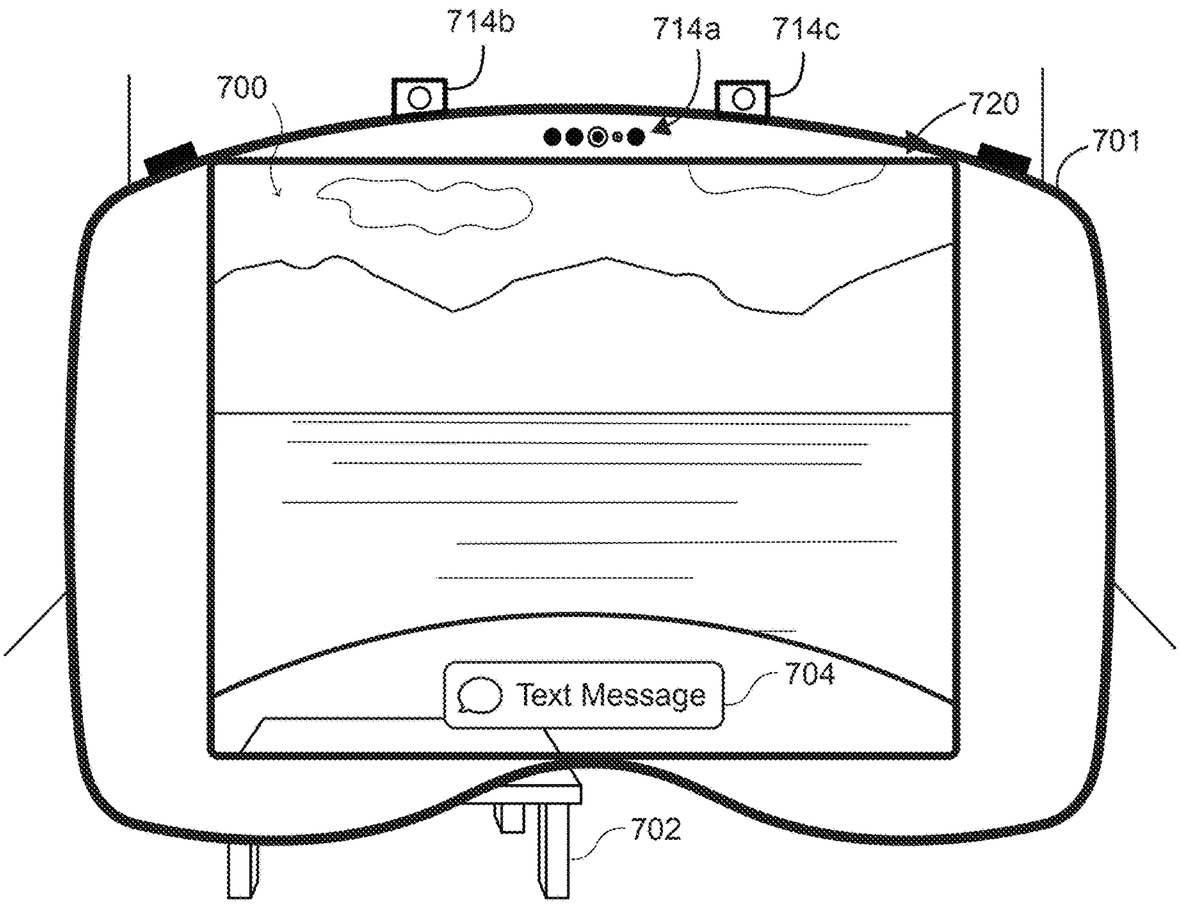
Figure 7C:
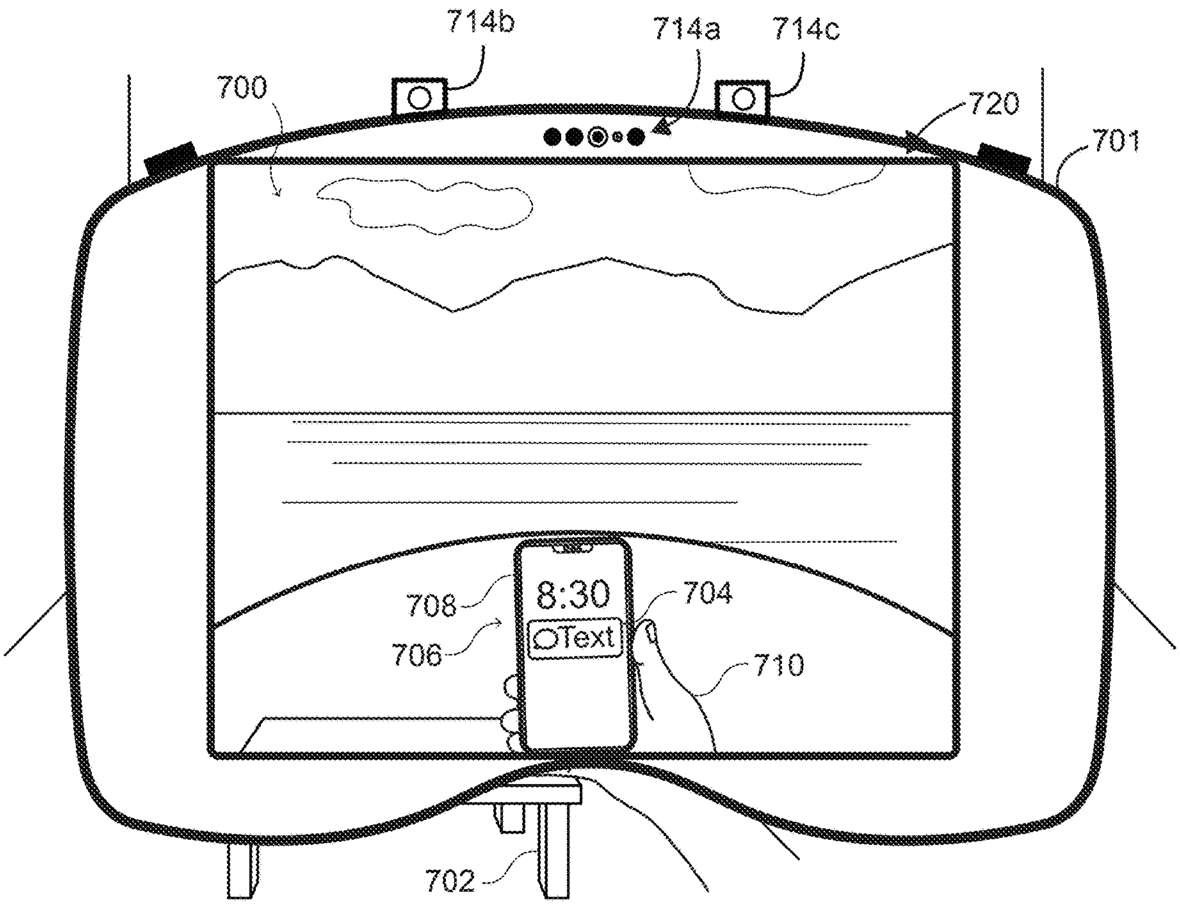

FIGS. 7A-7C illustrate a computing system displaying a notification in a three-dimensional environment according to some examples of the disclosure. In some examples, the computing system includes a first electronic device 701 (e.g., having one or more characteristics of electronic device 101, 201, 301, 401, 501, and/or 601) and a second electronic device 706 (shown in FIG. 7C) (e.g., having one or more characteristics of electronic device 160, 260, 306, 406, 506, and/or 606 described above). In some examples, first electronic device 701 is in communication with second electronic device 706 (e.g., second electronic device 706 is an auxiliary and/or companion device in communication with first electronic device 701).

In some examples, first electronic device 701 includes a display 720 having one or more characteristics of displays 320, 420, 520, and/or 620. In some examples, first electronic device 701 includes image sensors 714*a* to 714*c* having one or more characteristics of image sensors 314*a* to 314*c*, 414*a* to 414*c*, 514*a* to 514*c*, and/or 614*a* to 614*c* described above. First electronic device 701 optionally does not include image sensors 714*a* to 714*c*. In some examples, second electronic device 706 includes a display 708 having one or more characteristics of display 308, 408, 508, and/or 608 described above (e.g., display 708 is a touch-sensitive display).

In FIGS. 7A-7C, an environment 700 is visible via display 720. In some examples environment 700 has one or more characteristics of environments 300, 400, 500, and/or 600 described above. As shown in FIGS. 7A-7C, environment 700 includes a representation of a virtual environment 740. For example, the representation of virtual environment 740 includes a virtual representation of a scene (e.g., a representation of an outdoor environment and/or geographical landmark). As shown in FIGS. 7A-7C, the representation of virtual environment 740 includes a virtual representation of a body of water (e.g., lake), mountain, and a sky. The representation of virtual environment 740 is optionally immersive (e.g., such that at least a portion of the physical environment of the user of first electronic device 701 is not visible through display 720 (e.g., in video passthrough or optical see-through)).

FIG. 7A illustrates first electronic device 701 presenting the representation of virtual environment 740 as fully immersive. For example, as shown in FIG. 7A, real-world table 702 (e.g., a physical object in the physical environment) is not visible to the user within display 720.

While presenting immersive virtual content, such as the representation of the virtual environment 740, it may be uncomfortable and/or disorienting to a user for additional virtual content (e.g., virtual notifications) to be presented in environment 700 concurrently with (e.g., overlaid on) the immersive virtual content. Accordingly, in some examples, the computing system modifies the presentation of the representation of virtual environment 740 when concurrently presenting additional virtual content in environment 700 (e.g., as shown and described with reference to FIG. 7B). The computing system optionally presents one or more virtual notifications while presenting the representation of virtual environment 740 in accordance with a determination that a respective notification source (e.g., the computing system, and/or a respective application that is accessible via the computing system) is permitted to present virtual notifications in environment 700 (e.g., while immersive virtual content is presented). In some examples, the user of the computing system restricts the presentation of virtual notifications in environment 700 (e.g., through one or more user settings (e.g., associated with a user profile)). For example, the user of the computing system only permits virtual notifications to be presented from certain applications while immersive virtual content is presented (e.g., a messaging application). For example, the user of the computing system only permits certain types of notifications to be presented while immersive virtual content is presented (e.g., messages, such as text messages or social networking messages).

FIG. 7B illustrates first electronic device 701 presenting a virtual notification 704 in environment 700. For example, virtual notification 704 is associated with a respective application that is permitted to present notifications in environment 700 (e.g., as described above). As shown in FIG. 7B, first electronic device 701 modifies an appearance of a portion 742*a* of environment 700. In some examples, first electronic device 701 applies a visual effect to portion 742*a* of environment 700. For example, as shown in FIG. 7B, the visual effect includes increasing a transparency of portion 742*a* of environment 700 (e.g., such that a portion of the physical environment is visible through the representation of virtual environment 740). In examples where first electronic device 701 includes one or more tinting layers that are activated when displaying virtual content, the visual effect may further include deactivating or reducing a tinting level at portion 742*a*. Alternatively, or additionally, in some examples, the visual effect includes changing a color, saturation, sharpness, and/or clarity of virtual content presented within portion 742*a* of environment 700. In some examples, the visual effect is presented gradually between the representation of virtual environment 740 to portion 742*a* (e.g., the magnitude of the visual effect gradually increases from the region of environment 700 corresponding to the representation of virtual environment 740 to the region of environment 700 corresponding to virtual notification 704). Presenting a visual effect (e.g., automatically) in environment 700 when virtual notification 704 is presented concurrently with the representation of virtual environment 740 prevents user discomfort, disorientation, and/or motion sickness (e.g., from overlaying virtual content on other virtual content), which improves user device interaction.

In some examples, portion 742*a* corresponds to a predetermined region of environment 700 that first electronic device 701 presents virtual notifications within when concurrently presenting immersive virtual content (e.g., defined by one or more system settings and/or one or more user settings). In some examples, portion 742*a* corresponds to a region of environment 700 within a threshold distance (e.g., 0.01, 0.02, 0.05, 0.1, 0.2, 0.5, or 1 meter) of first electronic device 701 (e.g., the threshold distance is measured relative to a dimension of depth from first electronic device 701). In some examples, the visual effect is presented at a predetermined height (e.g., relative to the current viewpoint of the user of first electronic device 701). For example, as shown in FIG. 7B, portion 742*a* corresponds to a lower region of environment 700 (e.g., from the current viewpoint of the user of first electronic device 701). Optionally, the visual effect occupies a larger portion of a field of view of the user of first electronic device 701 when the user looks downward (e.g., because portion 742*a* of environment 700 occupies a larger portion of the field of view of the user). Although FIG. 7B illustrates portion 742*a* with a curved boundary (e.g., a spherical boundary), the visual effect may be displayed with different geometric boundaries (e.g., rectangular, planar, or other boundaries that divide the immersive virtual content (e.g., the representation of virtual environment 740) from the portion of environment 700 that the visual effect is applied to (e.g., portion 742*a*)). Presenting a visual effect and a virtual notification in a predetermined region of environment 700 when concurrently presenting immersive virtual content makes the presentation location of the visual effect and the virtual notification predictable to the user, which improves user comfort and prevents errors in interaction.

In some examples, the computing system transfers virtual notification 704 from first electronic device 701 to second electronic device 706 in accordance with a determination that one or more criteria are met (e.g., having one or more characteristics of the one or more criteria for transferring the presentation of video content 304 from first electronic device 301 to second electronic device 306 as described with reference to FIGS. 3A-3K). In some examples, the one or more criteria include a criterion that is satisfied when at least a portion of second electronic device 706 is within the field of view of first electronic device 701. For example, the computing system determines at least a portion of second electronic device 706 is within the field of view of first electronic device 701 using image sensors 714*a* to 714*c* (e.g., first electronic device 701 detects second electronic device 706 using image sensors 714*a* to 714*c*). Additionally, or alternatively, for example, the computing system determines at least a portion of second electronic device 706 is within the field of view of first electronic device 701 using image sensor(s) 206B shown and described with reference to FIG. 2B (e.g., first electronic device 701 does not include image sensors 714*a* to 714*c*). Additionally, or alternatively, for example, the computing system determines at least a portion of second electronic device 706 is within the field of view of first electronic device 701 using orientation sensors (e.g., orientation sensor(s) 210A and 210B).

FIG. 7C illustrates the computing system transferring the presentation of virtual notification 704 from first electronic device 701 to second electronic device 706 in accordance with a determination (e.g., by the computing system) that second electronic device 706 is within the field of view of first electronic device 701. As shown in FIG. 7C, second electronic device 706 is visible in environment 700 via display 720 (e.g., a user holds second electronic device 706 with hand 710 within the field of view of first electronic device 701), and virtual notification 704 is presented on display 708. Transferring the presentation of virtual notification 704 to second electronic device 706 when second electronic device 706 is within the field of view of first electronic device 701 conserves computing resources by avoiding presentation of virtual notification 704 on first electronic device 701 when the user of the computing system intends to interact with virtual notification 704 on second electronic device 706.

In some examples, transferring the presentation of virtual notification 704 from first electronic device 701 to second electronic device 706 includes presenting a portion 742*b* of environment 700 surrounding second electronic device 706 with a visual effect. For example, the visual effect has one or more characteristics of the visual effect shown and described with reference to FIG. 7C. In some examples, the computing system changes the portion of environment 700 that is presented with the visual effect as a location of second electronic device 706 changes within the field of view of first electronic device 701. For example, the computing system maintains presentation of the visual effect within a fixed region relative to second electronic device 706 (e.g., within a threshold distance of second electronic device 706, such as 0.01, 0.02, 0.05, 0.1, 0.2, 0.5, or 1 meter). The visual effect presented in FIG. 7C is optionally presented within a different region of environment 700 than the visual effect presented in FIG. 7B. For example, first electronic device 701 presents the visual effect in FIG. 7B at a predetermined region (e.g., portion 742*a*) of environment 700 for presenting virtual notifications, while first electronic device 701 presents the visual effect in FIG. 7C in a region (e.g., portion 742*b*) of environment 700 corresponding to the location of second electronic device 706 (e.g., when second electronic device 706 is within the field of view of first electronic device 701, the computing system dynamically updates (e.g., automatically) the region of environment 700 the visual effect is presented in to correspond to the location of second electronic device 706).

FIGS. 8A-8G illustrate a computing system presenting content on a first electronic device and presenting a user interface element associated with the content on a second electronic device according to some examples of the disclosure. In some examples, the computing system includes a first electronic device 801 (e.g., having one or more characteristics of electronic device 101, 201, 301, 401, 501, 601, and/or 701) and a second electronic device 806 (e.g., having one or more characteristics of electronic device 160, 260, 306, 406, 605, 606, and/or 706 described above). In some examples, first electronic device 801 is in communication with second electronic device 806 (e.g., second electronic device 806 is an auxiliary and/or companion device in communication with first electronic device 801). In some examples, as shown in FIGS. 8A-8G, second electronic device 806 is a mobile device held by a hand 803 of a user of the computing system (e.g., the user holds second electronic device 806 while wearing first electronic device 801).

In some examples, first electronic device 801 includes a display 820 having one or more characteristics of displays 320, 420, 520, 620, and/or 720. In some examples, first electronic device 801 includes image sensors 814*a* to 814*c* having one or more characteristics of image sensors 314*a* to 314*c*, 414*a* to 414*c*, 514*a* to 514*c*, 614*a* to 614*c*, and/or 714*a* to 714*c* described above. First electronic device 801 optionally does not include image sensors 814*a* to 814*c*. In some examples, second electronic device 806 includes a display 808 having one or more characteristics of display 308, 408, 508, 608, and/or 708 described above (e.g., display 808 is a touch-sensitive display). In FIGS. 8A-8G, an environment 800 is visible via display 820. In some examples environment 800 has one or more characteristics of environments 300, 400, 500, 600, and/or 700 described above.

Figure 8A:
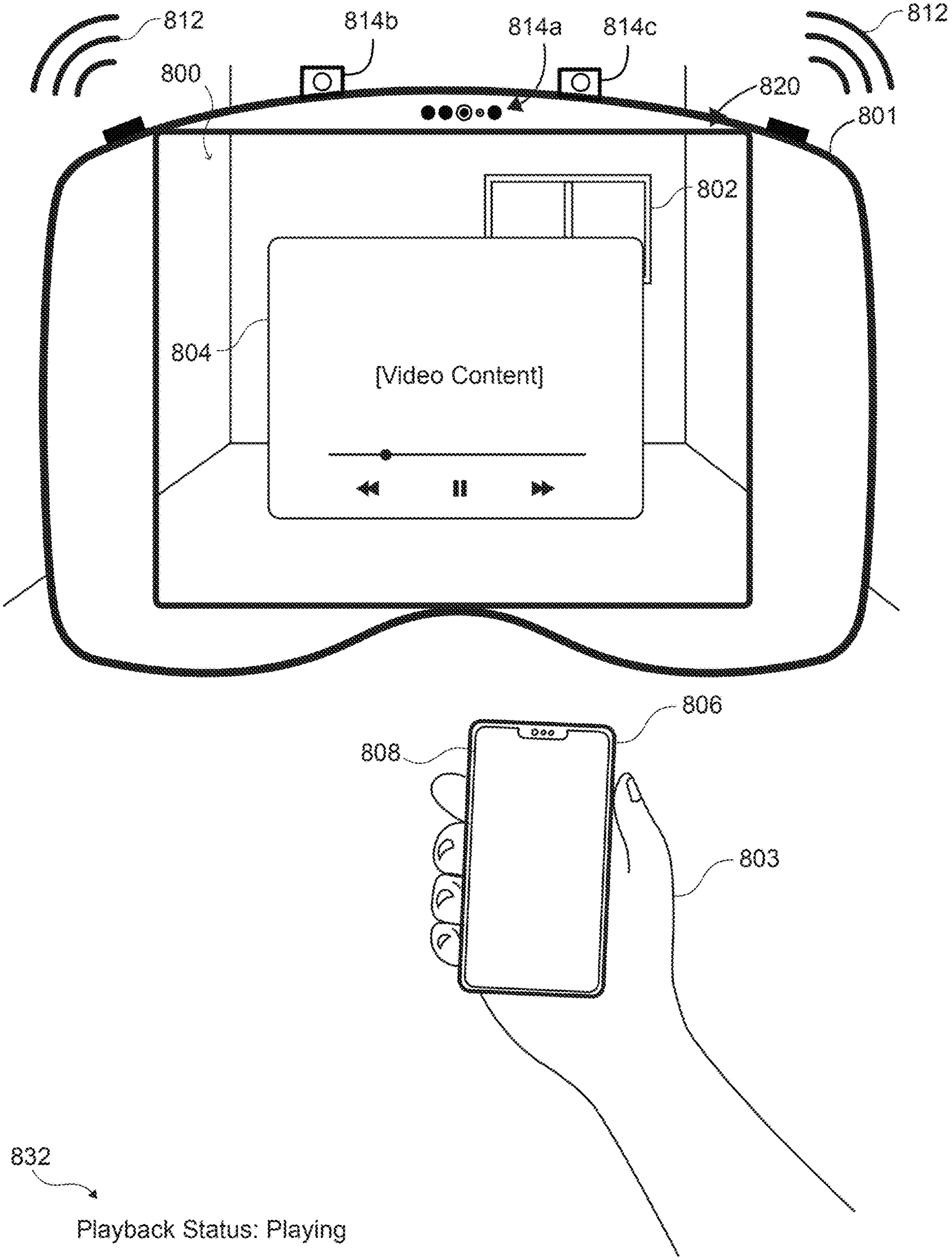
FIGS. 8A-8G illustrate a computing system presenting content on a first electronic device and presenting a user interface element associated with the content on a second electronic device according to some examples of the disclosure.

FIG. 8A illustrates the computing system presenting video content 804 on first electronic device 801. In some examples, video content 804 has one or more characteristics of video content 304 shown and described with reference to FIGS. 3A-3K. For example, the computing system causes video content 804 to be transferred between first electronic device 801 and second electronic device 806 in response to detecting touch gestures on second electronic device 806 that satisfy the one or more criteria described with reference to FIGS. 3A-3K.

FIGS. 8A-8F include playback status indication 832. In some examples, playback status indication 832 provides a current playback status of video content 804 (e.g., shown in FIG. 8A) in environment 800. For example, when textual indication 832 is a "playing" status, video content 804 is currently being played back in environment 800 (e.g., audio associated with the playback of video content 804 is output via one or more audio output devices of first electronic device 801). For example, when textual indication is a "paused" status, video content 804 is not currently being played back in environment 800 (e.g., audio associated with the playback of video content 804 is not output via the one or more audio output devices of first electronic device 801).

In FIG. 8A, video content 804 is being played back in environment 800 (e.g., as shown by playback status indication 832). For example, as shown in FIG. 8A, the computing system causes audio to be output via one or more audio output devices (e.g., speaker(s) 216A) of first electronic device 801 (the audio output is schematically represented by sound waves 812). For example, the audio output is associated with the playback of video content 804 in environment 800. The computing system optionally presents video content 804 in a body-locked orientation in environment 800 (e.g., including one or more characteristics of displaying the three-dimensional object in the body-locked orientation described above with reference to FIG. 1).

In some examples, in response to the computing system detecting user interaction with second electronic device 806, the computing system causes the playback of video content 804 to be paused (e.g., automatically and/or without user input) in environment 800. For example, determining that the user of the computing system is interacting with second electronic device 806 includes detecting attention (e.g., gaze) of the user of the computing system directed to second electronic device 806 (e.g., the attention of the user of the computing system is detected via one or more input devices of second electronic device 806, such as image sensor(s) 206B). For example, determining that the user of the computing system is interacting with second electronic device 806 includes detecting a touch input on second electronic device 806 (e.g., on display 808, which is optionally a touch-sensitive display). For example, determining that the user of the computing system is interacting with second electronic device 806 includes detecting use of a respective application accessible via second electronic device 806 (e.g., determining that the user is using a messaging app, or that the user has received and/or answered a phone call). Additionally, or alternatively, in some examples, the computing system causes the playback of video content 804 to be paused (e.g., automatically and/or without user input) in environment 800 in response to detecting a change in viewpoint of the user of the computing system that exceeds a threshold amount of rotation (e.g., 15, 20, 25, 30, 45, 70, or 90 degrees). For example, the computing system causes the playback of video content 804 to be paused in accordance with a determination that a change in viewpoint of the user has exceeded the threshold amount of rotation, and that the user has remained at a viewpoint that exceeds the threshold amount of rotation for more than a threshold amount of time (e.g., 0.1, 0.2, 0.5, 1, 2, 5, or 10 seconds).

Additionally, or alternatively to causing playback of video content 804 to pause in environment 800 in response to detecting user interaction with second electronic device 806, the computing system causes a user interface element associated with video content 804 to be presented on second electronic device 806 via display 808 (e.g., user interface element 810 shown and described with reference to FIG. 8B). For example, in response to detecting user interaction with second electronic device 806, the computing system presents the user interface element associated with video content 804 on second electronic device 806 without pausing playback of video content 804 in environment 800.

Figure 8B:
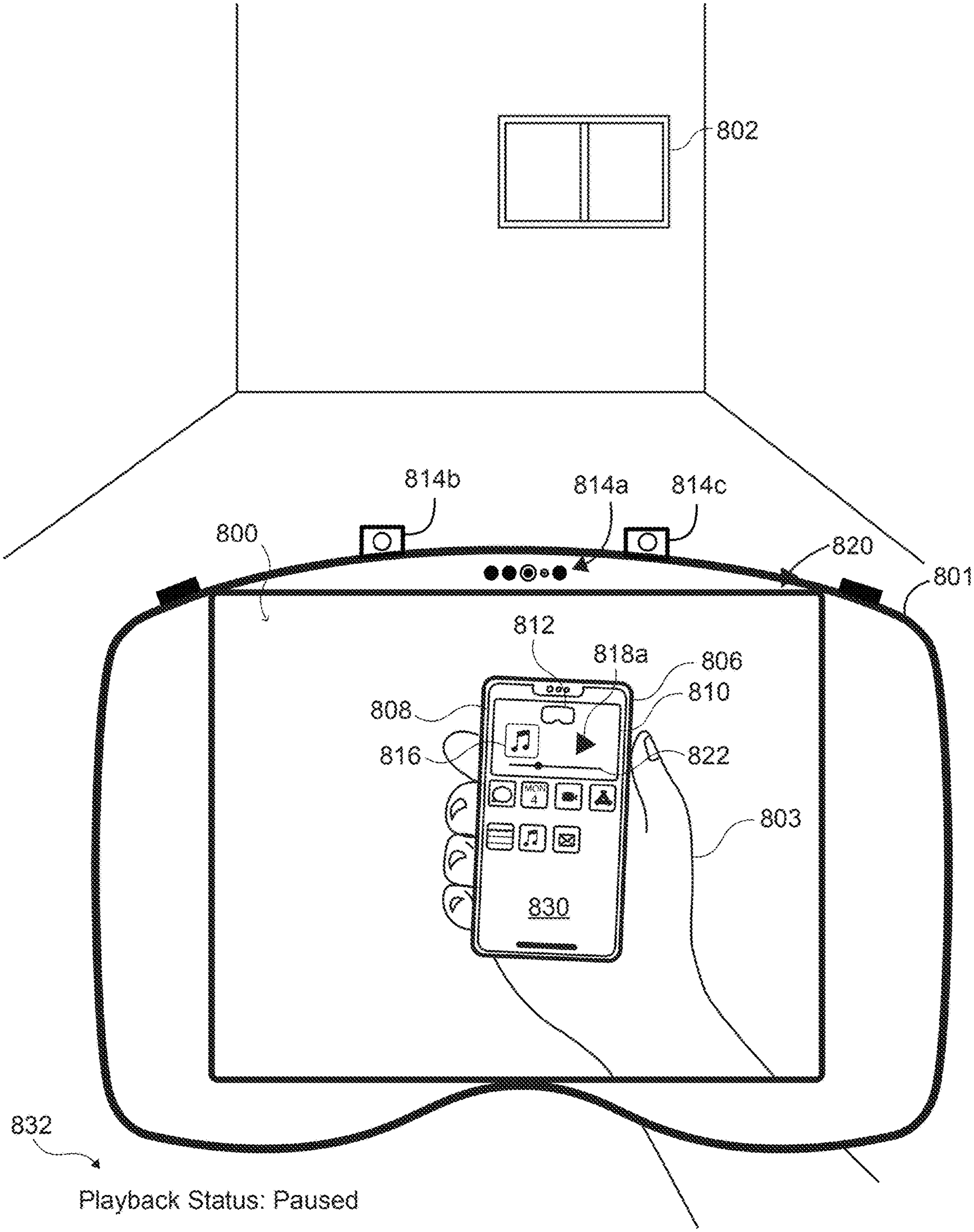

From FIG. 8A to FIG. 8B, a user of the computing system (e.g., wearing first electronic device 801 and holding second electronic device 806 with hand 803) changes their viewpoint relative to environment 800. For example, the user looks downward (e.g., by rotating their head and first electronic device 801) away from a location corresponding to video content 804 and toward second electronic device 806 (e.g., first electronic device 801 ceases to present video content 804 via display 820 because the change in viewpoint of the user causes the location corresponding to video content 804 to no longer be within the field of view of the user). For example, as shown in FIG. 8B, second electronic device 806 is visible to the user via display 820 (e.g., in video passthrough or optical sec-through).

In some examples, in FIG. 8B, the computing system detects, via one or more input devices of second electronic device 806 (e.g., image sensor(s) 206B), that the user of the computing system is interacting with second electronic device 806 (e.g., attention of the user is directed toward display 808 optionally for more than a threshold amount of time, such as 0.1, 0.2, 0.5, 1, 2, 5, or 10 seconds). In some examples, in FIG. 8B, in response to detecting the user interaction with second electronic device 806, the computing system causes playback of video content 804 to be paused (e.g., automatically) in environment 800 (e.g., as indicated by playback status indicator 832). For example, as shown in FIG. 8B, the computing system causes first electronic device 801 to cease output of the audio associated with video content 804.

As shown in FIG. 8B, in response to detecting that the user of the computing system is interacting with second electronic device 806, the computing system causes presentation of user interface element 810 on second electronic device 806. For example, as shown in FIG. 8B, second electronic device 806 presents user interface element 810 overlaid on a home user interface 830 (e.g., a user interface including one or more selectable icons for accessing one or more respective applications on second electronic device 806). User interface element 810 is optionally a banner displayed on a top portion of display 808 to track background content (e.g., content that is not being actively interacted with or played back in environment 800, such as video content 804). Although user interface element 810 is shown as a banner in FIG. 8B, it should be appreciated that second electronic device 806 may present user interface element 810 in different display locations on display 808 (e.g., on a side of display 808 or at a bottom portion of display 808). Presenting user interface element 810 on second electronic device 806 when playback of video content 804 is paused in environment 800 enables a user to keep track of video content 804 despite video content 804 being in the background, which reduces errors in interaction.

In some examples, as shown in FIG. 8B, user interface element 810 includes one or more visual indications. For example, user interface element 810 includes a first visual indication 816, which is optionally a logo indicating that user interface element 810 is associated with content presented in environment 800 via first electronic device 801 (e.g., video content 804). For example, user interface element 810 includes a second visual indication 816, which is optionally a representation associated with video content 804 (e.g., an album cover, or a thumbnail for a television series or movie).

In some examples, user interface element 810 includes one or more selectable options for controlling playback of video content 804 in environment 800. For example, as shown in FIG. 8B, user interface element 810 includes a selectable option 818_a_ that is selectable to change the current playback status of video content 804 in environment 800 (e.g., to resume playback of video content 804 in environment 800). In some examples, after pausing the playback of video content 804 (e.g., automatically, as described with reference to FIG. 8B), the computing system maintains the paused status of video content 804 until the computing system detects selection of selectable option 818*a* (e.g., a touch and/or tap input directed to selectable option 818*a* on display 808). Further, for example, as shown in FIG. 8B, user interface element 810 includes a playback location bar 822 that is selectable to change a current playback location of video content 804 (e.g., to scrub video content 804).

Figure 8C:
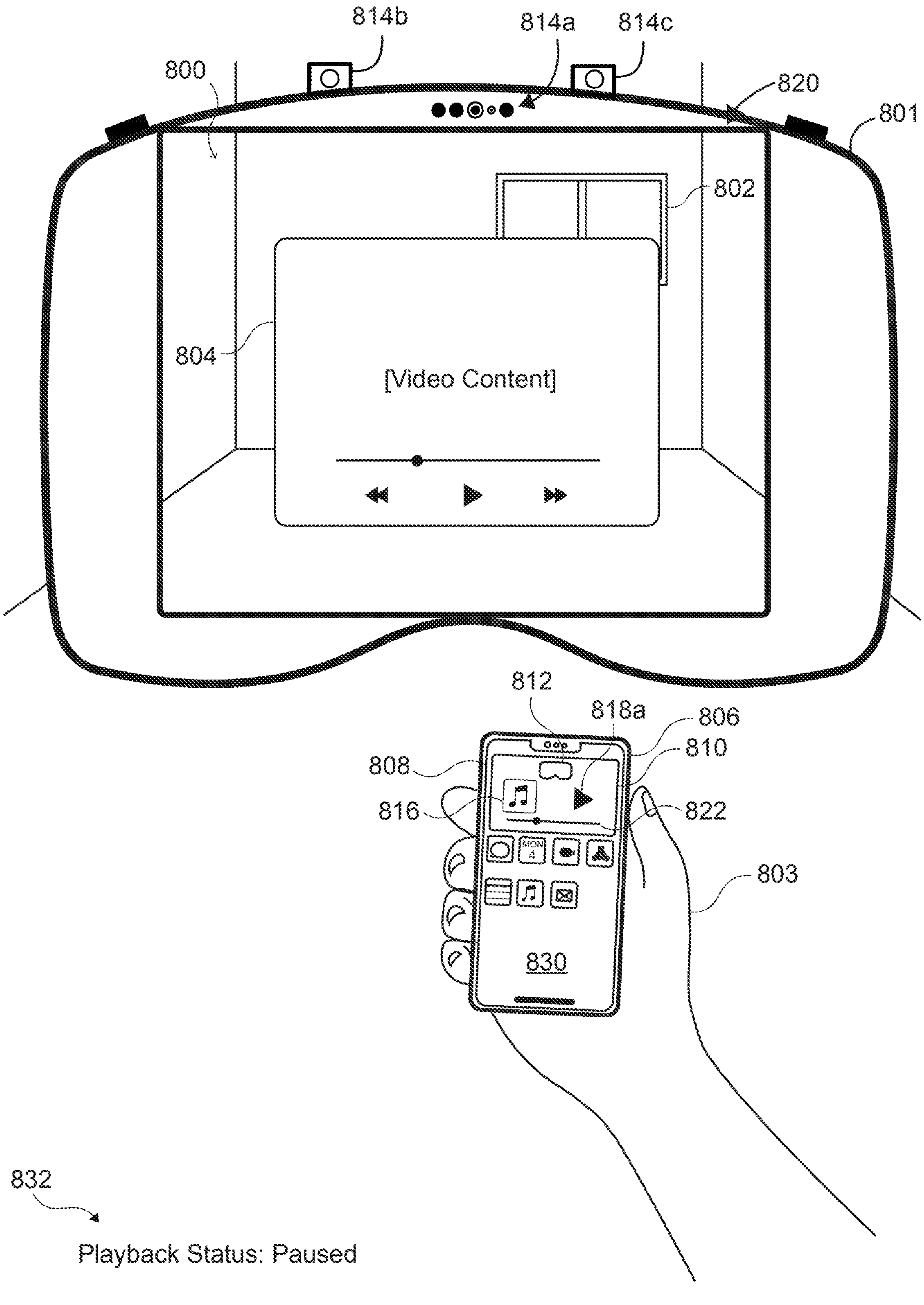

From FIG. 8B to FIG. 8C, the user of the computing system changes their viewpoint relative to environment 800. For example, the user looks upward (e.g., by rotating their head and first electronic device 801) away from second electronic device 806 and/or hand 803 toward the location corresponding to video content 804 in environment 800 (e.g., first electronic device 801 presents video content 804 via display 820 because the change in viewpoint of the user causes the location corresponding to video content 804 to be within the field of view of the user). In some examples, in response to detecting the change in viewpoint of the user, the computing system maintains the current playback status of video content 804 in environment 800. For example, as shown in FIG. 8C, the playback status of video content 804 remains paused (e.g., as shown by playback status indication 832). For example, the computing system maintains the paused playback status of video content 804 because the computing system has not detected selection of selectable option 818*a*. Alternatively, in some examples, in response to detecting the change in viewpoint of the user shown from FIG. 8B to FIG. 8C, the computing system resumes playback of video content 804 in environment 800 (e.g., automatically and/or without user input).

Figure 8D:
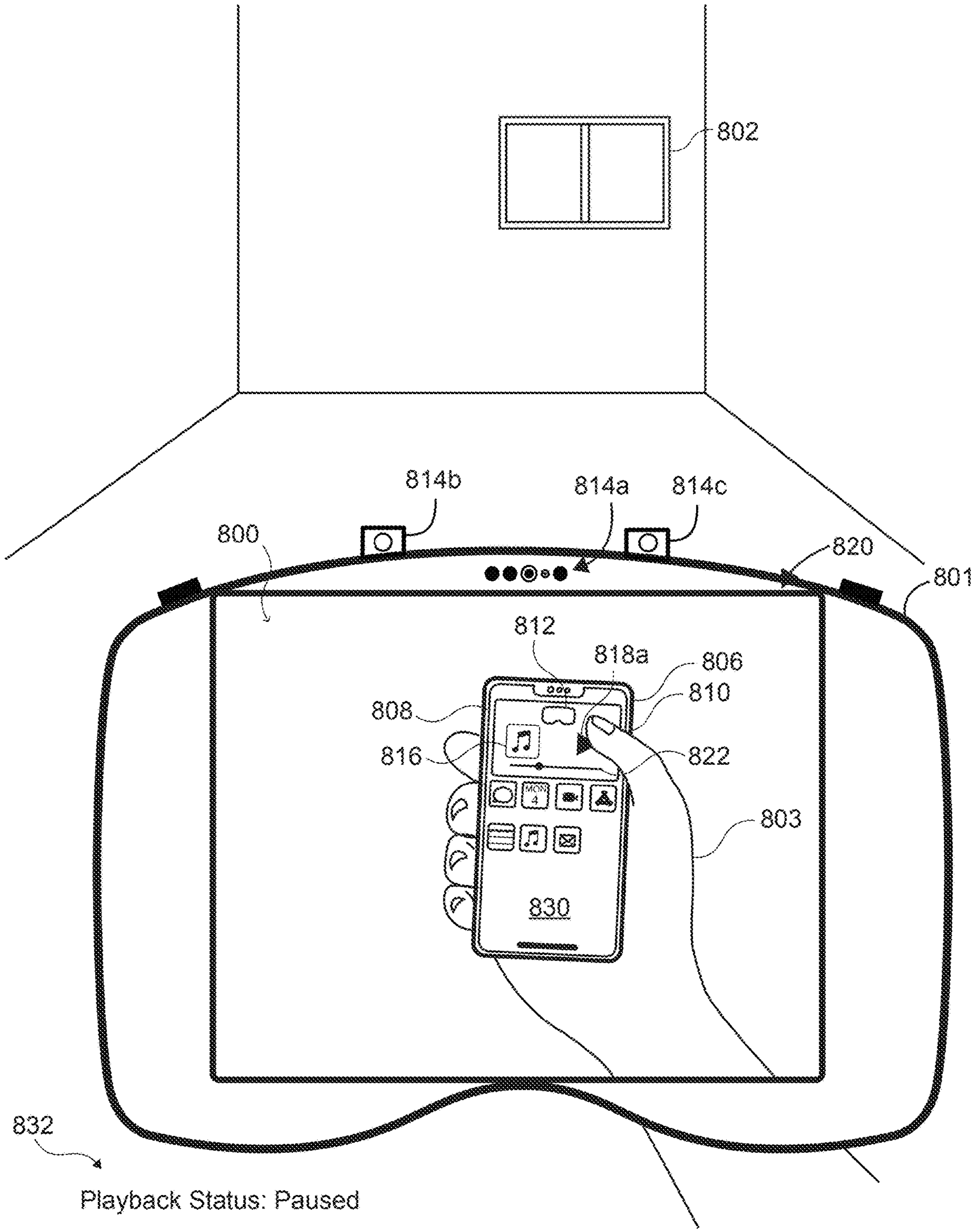
Figure 8E:
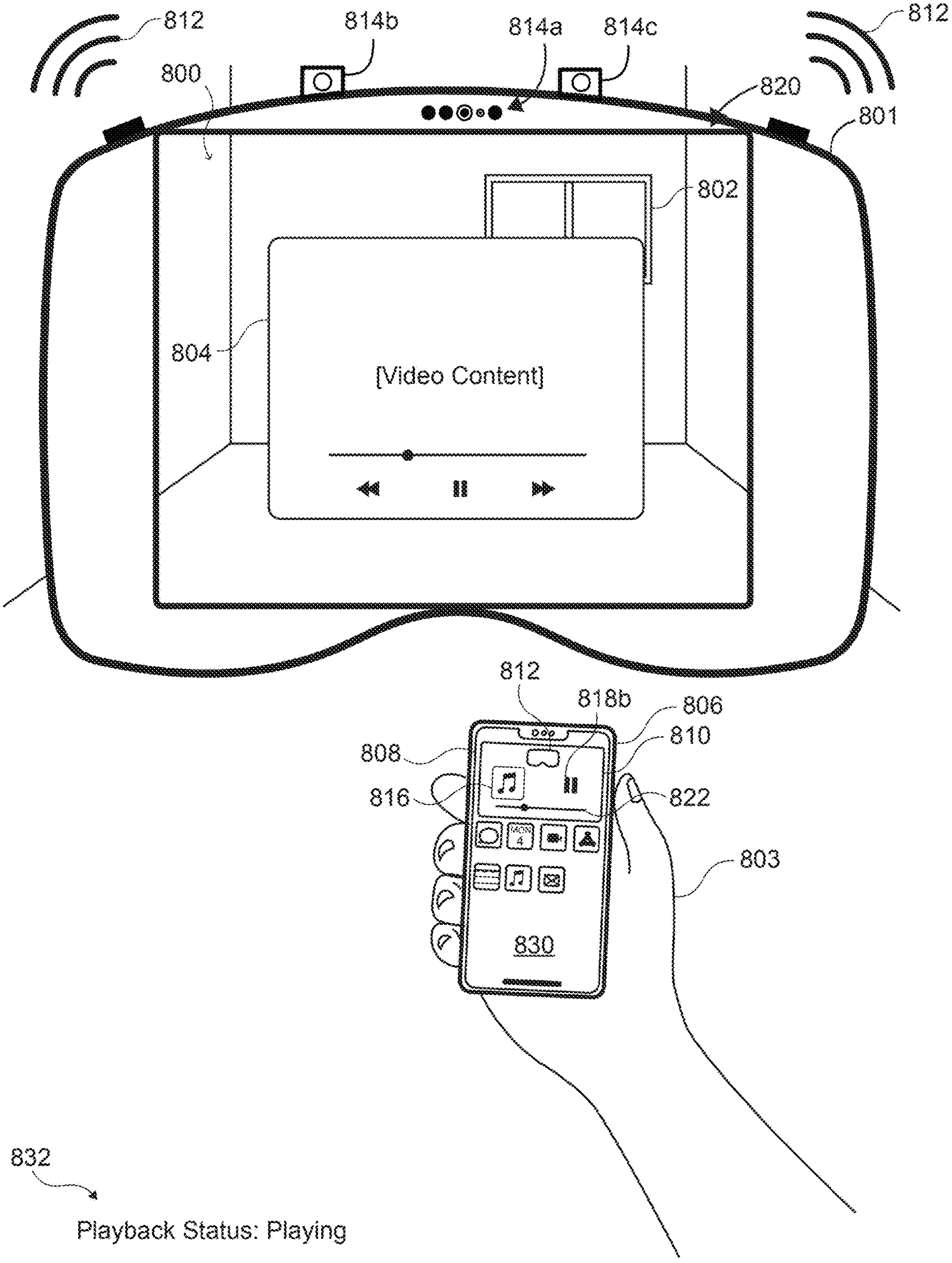

FIG. 8D illustrates the computing system detecting, via one or more input devices of second electronic device 806, selection of selectable option 818*a*. For example, the computing system detects a touch input (e.g., performed by the thumb of hand 803) directed to a location on display 808 corresponding to selectable option 818*a*. In some examples, in response to detecting selection of selectable option 818*a* in FIG. 8D, the computing system resumes playback of video content 804 in environment 800 in FIG. 8E (as shown by playback status indication 832). For example, as shown in FIG. 8E, the computing system causes audio to be output (schematically represented by sound waves 812) associated with the playback of video content 804 in environment 800 via the one or more audio output devices of first electronic device 801. Further, for example, as shown in FIG. 8E, second electronic device 806 updates the presentation of user interface element 810 to replace selectable option 818*a* with selectable option 818*b*. For example, selectable option 818*b* is selectable to pause the playback of video content 804 in environment 800.

In FIG. 8E, second electronic device 806 maintains presentation of user interface element 810 on display 808. Alternatively, in some examples, the computing system ceases to present user interface element 810 on display 808 in response to detecting selection of selectable option 818*a* in FIG. 8D and/or in response to detecting that the user is no longer interacting with second electronic device 806 (e.g., attention has not been directed to second electronic device 806 for more than a threshold amount of time, such as 0.1, 0.2, 0.5, 1, 2, 5, or 10 seconds).

In some examples, from FIG. 8E to FIG. 8F, the computing system detects user interaction with second electronic device 806 (e.g., as shown and described with reference to FIGS. 8A-8B). In some examples, in response to detecting the user interaction with second electronic device 806, the computing system causes playback of video content 804 to be paused in environment 800 (as shown in FIG. 8F by playback status indication 832) and presents user interface element 310 on second electronic device 806 via display 808.

Figure 8F:
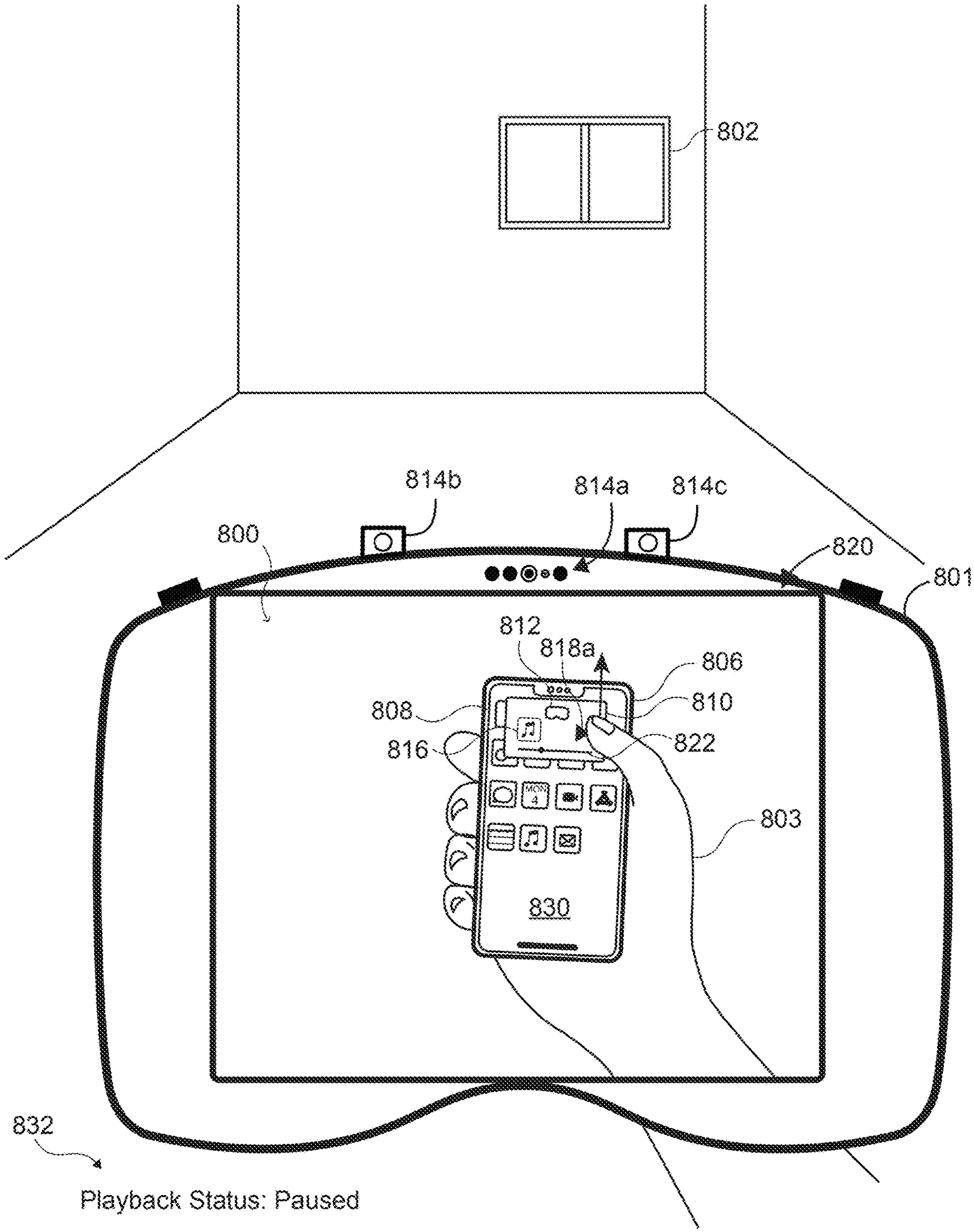

FIG. 8F illustrates the computing system detecting a touch gesture on second electronic device 806 while the playback of video content 804 is paused in environment 800. For example, the touch gesture is performed by the thumb of hand 803. In some examples, the touch gesture is an upward swipe gesture (e.g., performed on a top portion of display 808 and/or over the location of user interface element 810). In some examples, the touch gesture corresponds to a request to cease presentation of user interface element 810 (e.g., to dismiss user interface element 810 on second electronic device 806). For example, while the touch gesture is detected, second electronic device 806 moves the presentation location of user interface element 810 upward while concurrently reducing the presentation size of user interface element 810.

Figure 8G:
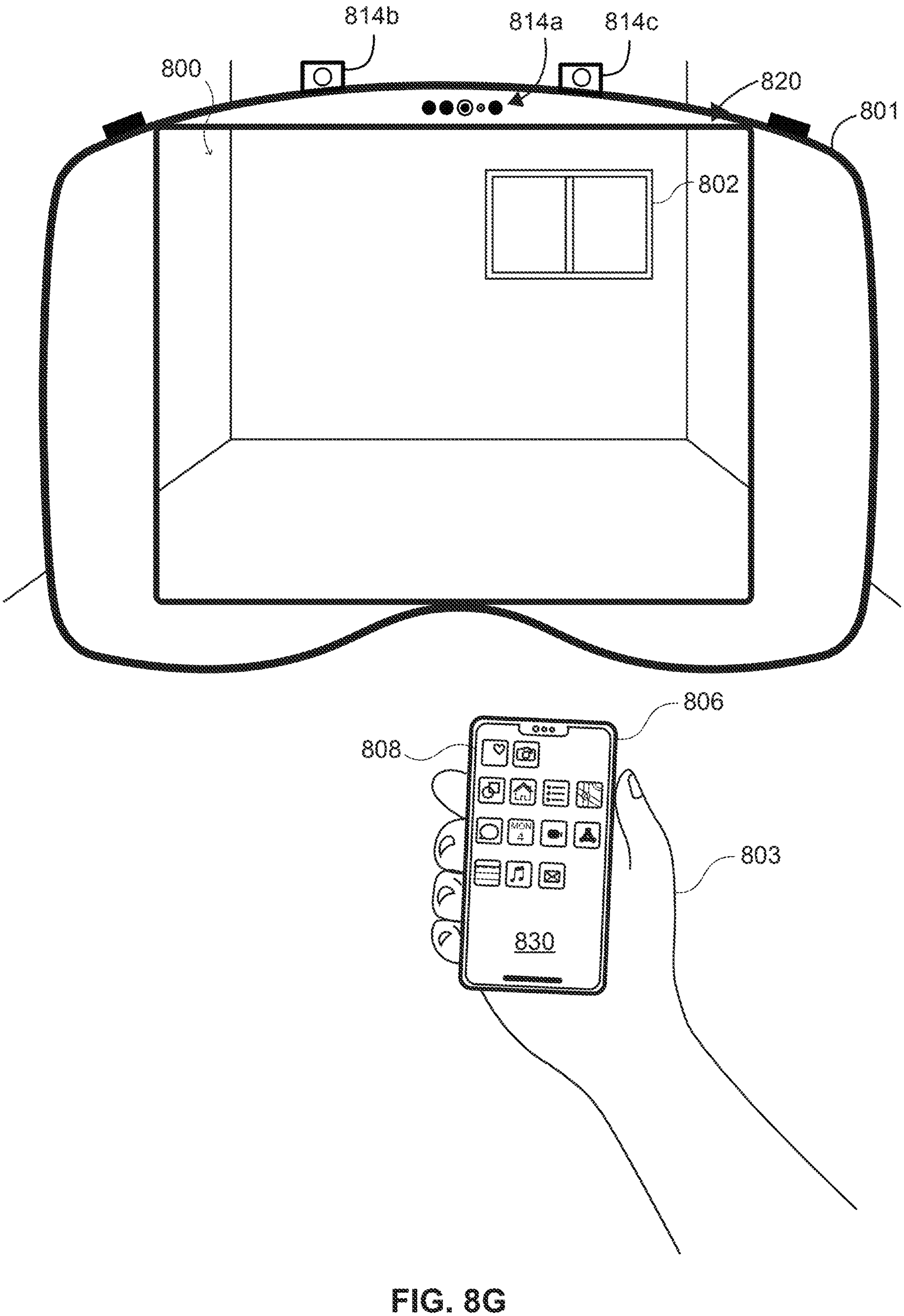

In some examples, ceasing presentation of user interface element 810 on second electronic device 806 causes the computing system to cease presentation of video content 804 in environment 800. For example, as shown in FIG. 8G, in response to detecting the touch gesture in FIG. 8F, the computing system causes first electronic device 801 to cease presentation of video content 804 in environment 800. Alternatively, in some examples, in response to detecting the touch gesture in FIG. 8F, the computing system ceases to present user interface element 810 on second electronic device 806 while maintaining presentation of video content 804 in environment 800 (e.g., in the paused playback state).

Figure 9:
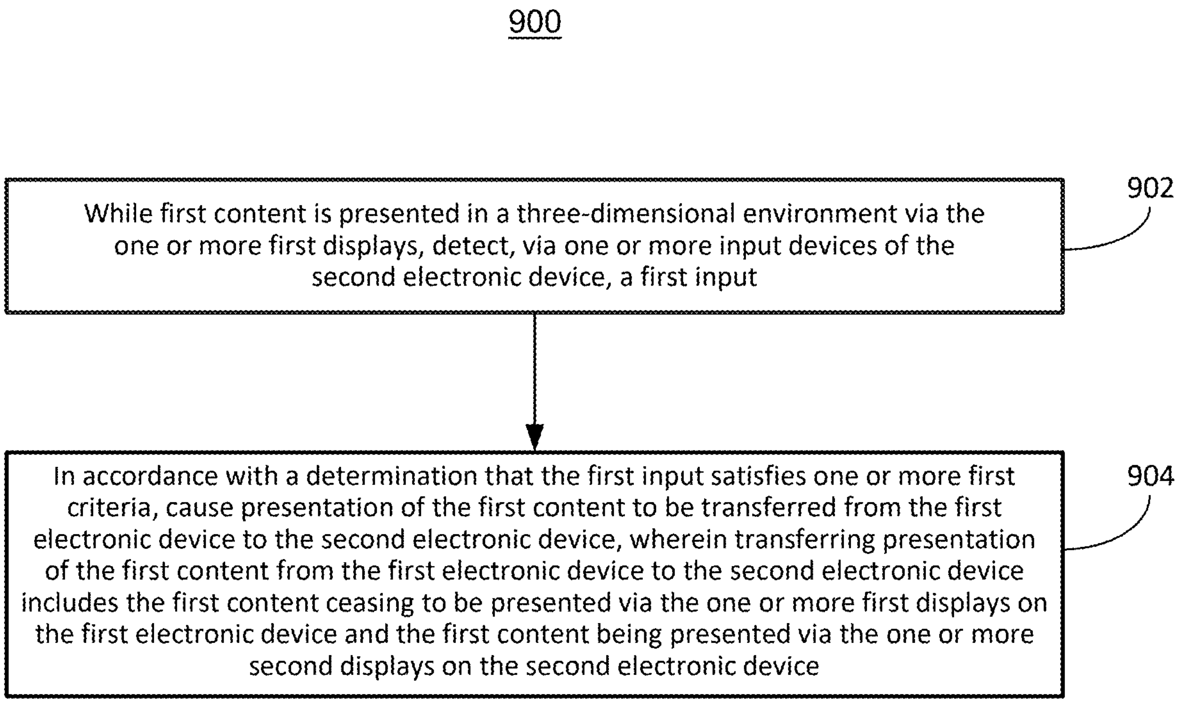
FIG. 9 illustrates a flow diagram of an example process for transferring the presentation of content from a first electronic device to a second electronic device according to some examples of the disclosure.

FIG. 9 illustrates a flow diagram of an example process for transferring the presentation of content from a first electronic device to a second electronic device according to some examples of the disclosure. In some examples, process 900 begins at a computing system including a first electronic device and a second electronic device, wherein the first electronic device includes one or more first displays and the second electronic device includes one or more second displays. In some examples, the first electronic device is optionally a head-mounted display similar or corresponding to electronic device 201 of FIG. 2A, and second electronic device is optionally a mobile electronic device similar or corresponding to electronic device 260 of FIG. 2B.

As shown in FIG. 9, in some examples, at 902, while first content is presented in a three-dimensional environment via the one or more first displays, the computing system detects, via one or more input devices of the second electronic device, a first input. For example, as shown in FIG. 3A, the computing system detects a touch input (represented by touch positions 310*a* to 310*b*) on display 308 of second electronic device 306. For example, as shown in FIG. 4I, the computing system detects a touch input (represented by touch positions 428*a* to 428*b*) on display 408 of second electronic device 406 (e.g., as a current location of cursor 410 to a location outside of virtual keyboard 422). For example, as shown in FIG. 5C, the computing system detects a touch input (represented by touch positions 518*a* to 518*b*) on second touch region 516*b* of display 508 of second electronic device 506. For example, as shown in FIG. 7C, the computing system detects that second electronic device 706 is at least partially within a field of view of first electronic device 701 (e.g., using image sensor(s) 206B shown and described with reference to FIG. 2B).

In some examples, at 904, in accordance with a determination that the first input satisfies one or more first criteria, the computing system causes presentation of the first content to be transferred from the first electronic device to the second electronic device. In some examples, transferring presentation of the first content from the first electronic device to the second electronic device includes the first content ceasing to be displayed via the one or more first displays on the first electronic device and the first content being presented via the one or more second displays on the second electronic device. For example, as shown in FIG. 3B, the computing system ceases to present video content 304 on first electronic device 301 and presents video content 304 on second electronic device 306 in accordance with a determination that the touch input detected in FIG. 3A on second electronic device 306 corresponds to a respective type of touch gesture (e.g., a downward swipe gesture). For example, in accordance with a determination that the touch input detected on second electronic device 406 in FIG. 4I corresponds to a respective type of touch gesture (e.g., a downward swipe) and that the touch input is detected while cursor 410 is at a location in environment 400 outside of virtual keyboard 422, the computing system ceases to present virtual keyboard 422 on first electronic device 401 and presents virtual keyboard 422 on second electronic device 406 (e.g., as shown in FIG. 4E). For example, as shown in FIG. 5D, the computing system ceases to present application content 504 on first electronic device 501 and presents application content 504 on second electronic device 506 in accordance with a determination that the touch input detected in FIG. 5C corresponds to a respective type of touch gesture (e.g., a downward swipe gesture) detected on second touch region 516*b* of display 508 of second electronic device 506.

It is understood that process 900 is an example and that more, fewer, or different operations can be performed in the same or in a different order. Additionally, the operations in process 900 described above are, optionally, implemented by running one or more functional modules in an information processing apparatus such as general-purpose processors (e.g., as described with respect to FIGS. 2A-2B) or application specific chips, and/or by other components of FIGS. 2A-2B.

Therefore, according to the above, some examples of the disclosure are directed to a method performed at a computing system including a first electronic device in communication with a second electronic device, wherein the first electronic device includes one or more first displays and the second electronic device includes one or more second displays. In some examples, the method comprises, while first content is presented in a three-dimensional environment via the one or more first displays, detecting, via one or more input devices of the second electronic device, a first input. In some examples, the method further comprises, in accordance with a determination that the first input satisfies one or more first criteria, causing presentation of the first content to be transferred from the first electronic device to the second electronic device, wherein transferring presentation of the first content from the first electronic device to the second electronic device includes the first content ceasing to be presented via the one or more first displays on the first electronic device and the first content being presented via the one or more second displays on the second electronic device. In some embodiments, in accordance with a determination that the input satisfies one or more second criteria, different from the one or more first criteria, causing the presentation of the first content in the three-dimensional environment to be updated via the one or more first displays. In some embodiments, updating the presentation of the first content in the three-dimensional environment via the one or more first displays includes changing an appearance of the content or a container of the content without modifying playback of the content. For example, updating the presentation of the first content includes moving and/or resizing the container (e.g., window) of the first content in the three-dimensional environment. For example, updating the presentation of the first content without modifying playback of the content includes updating as described herein without pausing or resuming playback or skipping forward or backwards in the content (apart from continuing playback). In some embodiments, satisfying the one or more first criteria and satisfying the one or more second criteria are possible irrespective of a user interface presented at the second electronic device. In some embodiments, satisfying the one or more first criteria and satisfying the one or more second criteria are possible while displaying a same user interface at the second electronic device: the one or more first criteria and one or more second criteria are associated with interactions with the same user interface or user interface elements.

Additionally, or alternatively, in some examples, the method further comprises, in accordance with a determination that the first input does not satisfy the one or more first criteria, forgoing causing the presentation of the first content to be transferred from the first electronic device to the second electronic device.

Additionally, or alternatively, in some examples, the one or more first criteria include a criterion that is satisfied when the first input includes a first gesture performed at the second electronic device.

Additionally, or alternatively, in some examples, the one or more input devices of the second electronic device is a touch-sensitive surface, and the first gesture includes a touch gesture detected at the touch-sensitive surface.

Additionally, or alternatively, in some examples, the method further comprises, in accordance with a determination that the first input satisfies one or more second criteria, different from the one or more first criteria, causing the presentation of the first content in the three-dimensional environment to be updated via the one or more first displays.

Additionally, or alternatively, in some examples, the one or more first criteria include a first criterion that is satisfied when the first input includes movement in a first direction at the second electronic device, and the one or more second criteria includes a second criterion that is satisfied when the first input includes movement in a second direction, different from the first direction, at the second electronic device.

Additionally, or alternatively, in some examples, causing the presentation of the first content in the three-dimensional environment to be updated includes causing a size of the presentation of the first content in the three-dimensional environment to be decreased.

Additionally, or alternatively, in some examples, causing the presentation of the first content in the three-dimensional environment to be updated includes causing a user interface operation within the first content in the three-dimensional environment to be performed.

Additionally, or alternatively, in some examples, the method further comprises, while detecting the first input, causing presentation, via the one or more first displays, a virtual cursor at a first location in the three-dimensional environment, wherein the first content corresponds to a virtual keyboard presented in a first region of the three-dimensional environment and the one or more first criteria include a criterion that is satisfied when the first location of the virtual cursor is outside of the first region of the three-dimensional environment.

Additionally, or alternatively, in some examples, the method further comprises, in accordance with a determination that the first input satisfies one or more second criteria, the one or more second criteria including a criterion that is satisfied when the first input corresponds to selection of a virtual element presented within the first content, causing presentation, via the one or more second displays, a virtual keyboard on the second electronic device.

Additionally, or alternatively, in some examples, the method further comprises, while the first content is presented in the three-dimensional environment, operating the second electronic device in a power-saving state.

Additionally, or alternatively, in some examples, operating the second electronic device in the power-saving state includes operating the one or more second displays of the second electronic device in an inactive state.

Additionally, or alternatively, in some examples, the method further comprises, while the first content is presented in the three-dimensional environment, causing presentation, via the one or more second displays, a representation of a plurality of touch regions on the second electronic device. In some examples, the method further comprises, detecting, via the one or more input devices of the second electronic device, a second input. In some examples, the method further comprises, in accordance with a determination that the second input is detected relative to a first touch region of the plurality of touch regions, performing a first operation. In some examples, the method further comprises, in accordance with a determination that the second input is detected relative to a second touch region, different from the first touch region, of the plurality of touch regions, performing a second operation different from the first operation.

Additionally, or alternatively, in some examples, transferring the first content from the first electronic device to the second electronic device includes causing a first audio output indicative of the transfer to be output via one or more audio output devices of the first electronic device.

Additionally, or alternatively, in some examples, transferring the first content from the first electronic device to the second electronic device includes causing audio output associated with the first content to transition from being output via one or more audio output devices of the first electronic device to being output via one or more audio output devices of the second electronic device.

Additionally, or alternatively, in some examples, the method further comprises, after the first content is transferred from the first electronic device to the second electronic device, detecting, via the one or more input devices of the second electronic device, a second input. In some examples, the method further comprises, in accordance with a determination that the second input satisfies one or more second criteria, causing presentation of the first content to be transferred from the second electronic device to the first electronic device, wherein transferring presentation of the first content from the second electronic device to the first electronic device includes the first content ceasing to be displayed via the one or more second displays on the second electronic device and the first content being presented via the one or more first displays on the first electronic device.

Additionally, or alternatively, in some examples, the one or more first criteria include a first criterion that is satisfied when the first input includes a first gesture performed at the second electronic device, and the one or more second criteria include a second criterion that is satisfied when the second input includes a second gesture, different from the first gesture, performed at the second electronic device.

Additionally, or alternatively, in some examples, the one or more second criteria include a criterion that is satisfied when the second input corresponds to selection of a virtual element presented, via the one or more second displays, at the second electronic device.

Additionally, or alternatively, in some examples, the method further comprises, while presenting, via the one or more first displays, the first content, detecting, via one or more input devices of the first electronic device, attention of a user of the first electronic device directed toward the first content. In some examples, the method further comprises, in response to detecting the attention of the user of the first electronic device directed toward the first content, presenting, via the one or more first displays, the first content with one or more playback controls.

Additionally, or alternatively, in some examples, the one or more first criteria include a criterion that is satisfied when the first input includes at least a portion of the second electronic device being within a field of view of the first electronic device.

Additionally, or alternatively, in some examples, the first content includes a notification of a respective application accessible on the second electronic device.

Additionally, or alternatively, in some examples, the method further comprises, while the first content is presented in the three-dimensional environment via the one or more first displays, detecting, via the one or more input devices of the second electronic device, user interaction with the second electronic device that satisfies one or more second criteria. In some examples, the method further comprises, in response to detecting the user interaction, causing presentation of a user interface element associated with the first content on the second electronic device.

Additionally, or alternatively, in some examples, the first content is video content, and the first content is being played back in the three-dimensional environment while the user interaction with the second electronic device is detected. In some examples, the method further comprises, in response to detecting the user interaction, causing playback of the first content to be paused in the three-dimensional environment.

Additionally, or alternatively, in some examples, the method further comprises, while the user interface element is presented on the second electronic device, wherein the user interface element includes a selectable option that is selectable to change a playback state of the first content in the three-dimensional environment, detecting, via the one or more input devices of the second electronic device, selection of the selectable option. In some examples, the method further comprises, in response to detecting the selection of the selectable option, causing playback of the first content to continue in the three-dimensional environment.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a computing system, comprising: one or more processors; memory; and one or more programs stored in the memory and configured to executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method, comprising:

at a computing system including a first electronic device in communication with a second electronic device, wherein the first electronic device includes one or more first displays and the second electronic device includes one or more second displays:

while first content is presented in a three-dimensional environment via the one or more first displays, detecting, via one or more input devices of the second electronic device, a first input; and in accordance with a determination that the first input satisfies one or more first criteria, causing presentation of the first content to be transferred from the first electronic device to the second electronic device, wherein transferring presentation of the first content from the first electronic device to the second electronic device includes the first content ceasing to be presented via the one or more first displays on the first electronic device and the first content being presented via the one or more second displays on the second electronic device and transferring the first content from the first electronic device to the second electronic device includes causing spatial audio output associated with the first content to transition from being associated with a location corresponding to the first content being presented with the first electronic device via one or more audio output devices of the first electronic device to being associated with a location corresponding to the first content being presented with the second electronic device via one or more audio output devices of the first electronic device; and in accordance with a determination that the input satisfies one or more second criteria, different from the one or more first criteria, causing the presentation of the first content in the three-dimensional environment to be updated via the one or more first displays.

2. The method of claim 1, further comprising:

while detecting the first input, causing presentation, via the one or more first displays, of a virtual cursor at a first location in the three-dimensional environment, wherein:

the first content corresponds to a virtual keyboard presented in a first region of the three-dimensional environment; and the one or more first criteria include a criterion that is satisfied when the first location of the virtual cursor is outside of the first region of the three-dimensional environment.

3. The method of claim 1, further comprising:

while the first content is presented in the three-dimensional environment, operating the second electronic device in a power-saving state.

4. The method of claim 1, further comprising:

while the first content is presented in the three-dimensional environment, causing presentation, via the one or more second displays, of a representation of a plurality of touch regions on the second electronic device;

detecting, via the one or more input devices of the second electronic device, a second input;

in accordance with a determination that the second input is detected relative to a first touch region of the plurality of touch regions, performing a first operation; and in accordance with a determination that the second input is detected relative to a second touch region, different from the first touch region, of the plurality of touch regions, performing a second operation different from the first operation.

5. The method of claim 1, further comprising:

while presenting, via the one or more first displays, the first content, detecting, via one or more input devices of the first electronic device, attention of a user of the first electronic device directed toward the first content; and in response to detecting the attention of the user of the first electronic device directed toward the first content, presenting, via the one or more first displays, the first content with one or more playback controls.

6. The method of claim 1, wherein the one or more first criteria include a criterion that is satisfied when the first input includes at least a portion of the second electronic device being within a field of view of the first electronic device.

7. An electronic device comprising:

one or more processors;

memory; and one or more programs stored in the memory and configured to be executed by the one or more processors, the one or more programs including instructions for:

while first content is presented in a three-dimensional environment via one or more first displays, detecting, via one or more input devices of a second electronic device in communication with the electronic device, a first input; and in accordance with a determination that the first input satisfies one or more first criteria, causing presentation of the first content to be transferred from the electronic device to the second electronic device, wherein transferring presentation of the first content from the electronic device to the second electronic device includes the first content ceasing to be presented via the one or more first displays on the electronic device and the first content being presented via one or more second displays on the second electronic device and transferring the first content from the electronic device to the second electronic device includes causing spatial audio output associated with the first content to transition from being associated with a location corresponding to the first content being presented with the electronic device via one or more audio output devices of the electronic device to being associated with a location corresponding to the first content being presented with the second electronic device via one or more audio output devices of the electronic device; and in accordance with a determination that the input satisfies one or more second criteria, different from the one or more first criteria, causing the presentation of the first content in the three-dimensional environment to be updated via the one or more first displays.

8. The electronic device of claim 7, wherein the one or more programs further include instructions for:

while detecting the first input, causing presentation, via the one or more first displays, of a virtual cursor at a first location in the three-dimensional environment, wherein:

the first content corresponds to a virtual keyboard presented in a first region of the three-dimensional environment; and the one or more first criteria include a criterion that is satisfied when the first location of the virtual cursor is outside of the first region of the three-dimensional environment.

9. The electronic device of claim 7, wherein the one or more programs further include instructions for:

while the first content is presented in the three-dimensional environment, operating the second electronic device in a power-saving state.

10. The electronic device of claim 7, wherein the one or more programs further include instructions for:

while the first content is presented in the three-dimensional environment, causing presentation, via the one or more second displays, of a representation of a plurality of touch regions on the second electronic device;

detecting, via the one or more input devices of the second electronic device, a second input;

in accordance with a determination that the second input is detected relative to a first touch region of the plurality of touch regions, performing a first operation; and in accordance with a determination that the second input is detected relative to a second touch region, different from the first touch region, of the plurality of touch regions, performing a second operation different from the first operation.

11. The electronic device of claim 7, wherein the one or more programs further include instructions for:

while presenting, via the one or more first displays, the first content, detecting, via one or more input devices of the electronic device, attention of a user of the electronic device directed toward the first content; and in response to detecting the attention of the user of the electronic device directed toward the first content, presenting, via the one or more first displays, the first content with one or more playback controls.

12. The electronic device of claim 7, wherein the one or more first criteria include a criterion that is satisfied when the first input includes at least a portion of the second electronic device being within a field of view of the electronic device.

13. A non-transitory computer readable storage medium storing one or more programs, the one or more programs comprising instructions, which when executed by one or more processors of an electronic device, cause the electronic device to perform a method comprising:

while first content is presented in a three-dimensional environment via one or more first displays, detecting, via one or more input devices of a second electronic device in communication with the electronic device, a first input; and in accordance with a determination that the first input satisfies one or more first criteria, causing presentation of the first content to be transferred from the electronic device to the second electronic device, wherein transferring presentation of the first content from the electronic device to the second electronic device includes the first content ceasing to be presented via the one or more first displays on the electronic device and the first content being presented via one or more second displays on the second electronic device and transferring the first content from the electronic device to the second electronic device includes causing spatial audio output associated with the first content to transition from being associated with a location corresponding to the first content being presented with the electronic device via one or more audio output devices of the electronic device to being associated with a location corresponding to the first content being presented with the second electronic device via one or more audio output devices of the electronic device; and in accordance with a determination that the input satisfies one or more second criteria, different from the one or more first criteria, causing the presentation of the first content in the three-dimensional environment to be updated via the one or more first displays.

14. The non-transitory compute readable storage medium of claim 13, wherein the method further comprises:

while detecting the first input, causing presentation, via the one or more first displays, of a virtual cursor at a first location in the three-dimensional environment, wherein:

the first content corresponds to a virtual keyboard presented in a first region of the three-dimensional environment; and the one or more first criteria include a criterion that is satisfied when the first location of the virtual cursor is outside of the first region of the three-dimensional environment.

15. The non-transitory compute readable storage medium of claim 13, wherein the method further comprises:

while the first content is presented in the three-dimensional environment, operating the second electronic device in a power-saving state.

16. The non-transitory compute readable storage medium of claim 13, wherein the method further comprises:

while the first content is presented in the three-dimensional environment, causing presentation, via the one or more second displays, of a representation of a plurality of touch regions on the second electronic device;

detecting, via the one or more input devices of the second electronic device, a second input;

in accordance with a determination that the second input is detected relative to a first touch region of the plurality of touch regions, performing a first operation; and in accordance with a determination that the second input is detected relative to a second touch region, different from the first touch region, of the plurality of touch regions, performing a second operation different from the first operation.

17. The non-transitory compute readable storage medium of claim 13, wherein the method further comprises:

while presenting, via the one or more first displays, the first content, detecting, via one or more input devices of the electronic device, attention of a user of the electronic device directed toward the first content; and in response to detecting the attention of the user of the electronic device directed toward the first content, presenting, via the one or more first displays, the first content with one or more playback controls.

18. The non-transitory compute readable storage medium of claim 13, wherein the one or more first criteria include a criterion that is satisfied when the first input includes at least a portion of the second electronic device being within a field of view of the electronic device.

* * * * *